(12) United States Patent
Takano et al.

(10) Patent No.: US 12,235,206 B2
(45) Date of Patent: *Feb. 25, 2025

(54) FIRE DETECTION APPARATUS

(71) Applicant: HOCHIKI Corporation, Tokyo (JP)

(72) Inventors: Hideki Takano, Shibata-gun (JP);
Yasuharu Fujiwara, Iwanuma (JP);
Isao Saeki, Kakuda (JP)

(73) Assignee: HOCHIKI Corporation, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 18/170,279

(22) Filed: Feb. 16, 2023

(65) Prior Publication Data

US 2023/0228670 A1 Jul. 20, 2023

Related U.S. Application Data

(63) Continuation of application No. 17/078,154, filed on Oct. 23, 2020, now Pat. No. 11,614,396, which is a
(Continued)

(30) Foreign Application Priority Data

Jun. 25, 2018 (JP) ................................ 2018-119710
Jul. 19, 2018 (JP) ................................ 2018-136052
(Continued)

(51) Int. Cl.
G01N 21/03 (2006.01)
G01N 21/53 (2006.01)

(52) U.S. Cl.
CPC ......... *G01N 21/0303* (2013.01); *G01N 21/53* (2013.01)

(58) Field of Classification Search
CPC ............... G01N 21/0303; G01N 21/53; G01N 33/0027; G08B 17/107; G08B 17/113;
(Continued)

(56) References Cited

U.S. PATENT DOCUMENTS 7,697,140 B2 4/2010 Iguchi et al.
7,948,627 B2 5/2011 Iguchi et al.
(Continued)

FOREIGN PATENT DOCUMENTS

CN 101147053 A 3/2008
CN 105931416 B 3/2018
(Continued)

OTHER PUBLICATIONS

Communication pursuant to Article 94(3) EPC corresponding to European Patent Application No. 19825259.5 (8 pages) (dated Mar. 9, 2022).
(Continued)

*Primary Examiner* — Tri T Ton
(74) *Attorney, Agent, or Firm* — Myers Bigel, P.A.

(57) ABSTRACT

A fire detection apparatus 1F for detecting a fire in a monitored area, the fire detection apparatus 1F being attached to an installation surface of an installation object, the fire detection apparatus 1F comprises a detection space 60F in which detection of a detection target is performed; an incidence suppressing unit that inhibits ambient light from entering the detection space 60F, the incidence suppressing unit being able to allow a gas containing the detection target to flow into and out of the incidence suppressing unit; an accommodating unit that accommodates the incidence suppressing unit, the accommodating unit being able to allow the gas to flow into and out of the accommodating unit; and a light shielding wall 140F provided to surround the incidence suppressing unit on an inside of the accommodating unit, wherein the incidence suppressing unit includes a first incidence suppressing unit that covers a part of the detection space 60F, and a second incidence suppressing unit provided on an installation surface side of the first incidence suppressing unit, the second incidence suppressing unit cover-
(Continued)

ing another part of the detection space 60F, and the light shielding wall 140F is configured such that the light shielding wall overlaps a boundary between the first incidence suppressing unit and the second incidence suppressing unit when viewed in a direction orthogonal to the installation surface.

9 Claims, 25 Drawing Sheets

Related U.S. Application Data continuation-in-part of application No. PCT/JP2019/017008, filed on Apr. 22, 2019.

(30) Foreign Application Priority Data

| | | |
|---|---|---|
| Jul. 24, 2018 | (JP) | 2018-138200 |
| Oct. 24, 2018 | (JP) | 2018-200276 |
| Dec. 21, 2018 | (JP) | 2018-240136 |
| Jan. 11, 2019 | (JP) | 2019-003212 |

(58) Field of Classification Search
CPC .... A47L 15/0015; A47L 15/4242; A61L 2/07; A61L 2/08; A61L 2/10; A61L 2202/122; A61L 2202/15; A61L 2202/17; A61L 2202/23
USPC .................................................. 356/335–343
See application file for complete search history.

(56) References Cited

U.S. PATENT DOCUMENTS

| | | | | |
|---|---|---|---|---|
| 11,614,396 | B2* | 3/2023 | Takano | G01N 21/53 356/338 |
| 2011/0068936 | A1* | 3/2011 | Shimada | G08B 17/10 73/204.22 |
| 2016/0305874 | A1 | 10/2016 | Iguchi et al. | |

FOREIGN PATENT DOCUMENTS

| | | |
|---|---|---|
| JP | H08171685 A | 7/1996 |
| JP | 2001216578 A | 8/2001 |
| JP | 2004220225 A | 8/2004 |
| JP | 2005352932 A | 12/2005 |
| JP | 2006267128 A | 10/2006 |
| JP | 2011215705 A | 10/2011 |
| JP | 2012048766 A | 3/2012 |
| JP | 2017228190 A | 12/2017 |
| JP | 2018010444 A | 1/2018 |
| JP | 2018081521 A | 5/2018 |
| WO | 2016009460 A1 | 1/2016 |

OTHER PUBLICATIONS

English translation of International Search Report corresponding to International Patent Application No. PCT/JP2019/017008 (8 pages) (mailed Jul. 16, 2019).

Office Action & English translation thereof corresponding to Chinese Application No. 201980043033.5 (23 pages) (dated Mar. 30, 2022).

* cited by examiner

[Fig. 1]
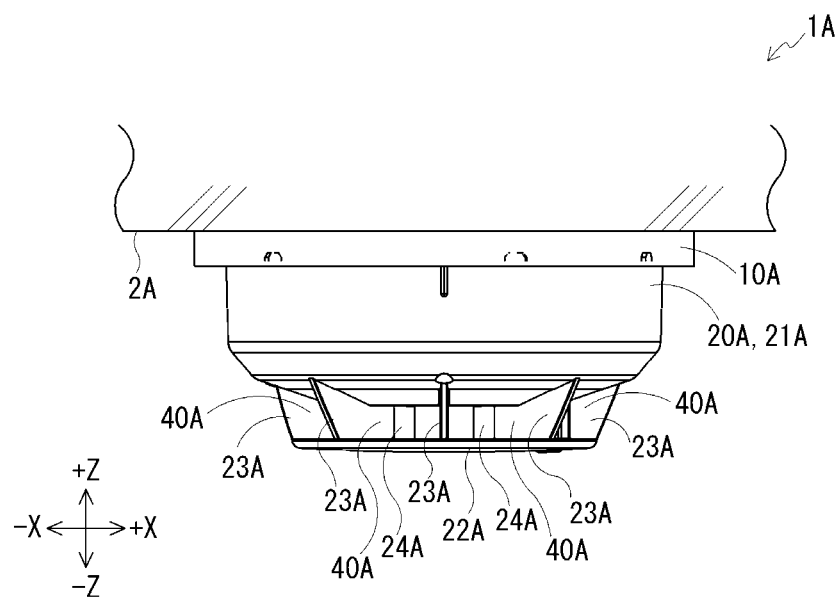
[Fig. 2]
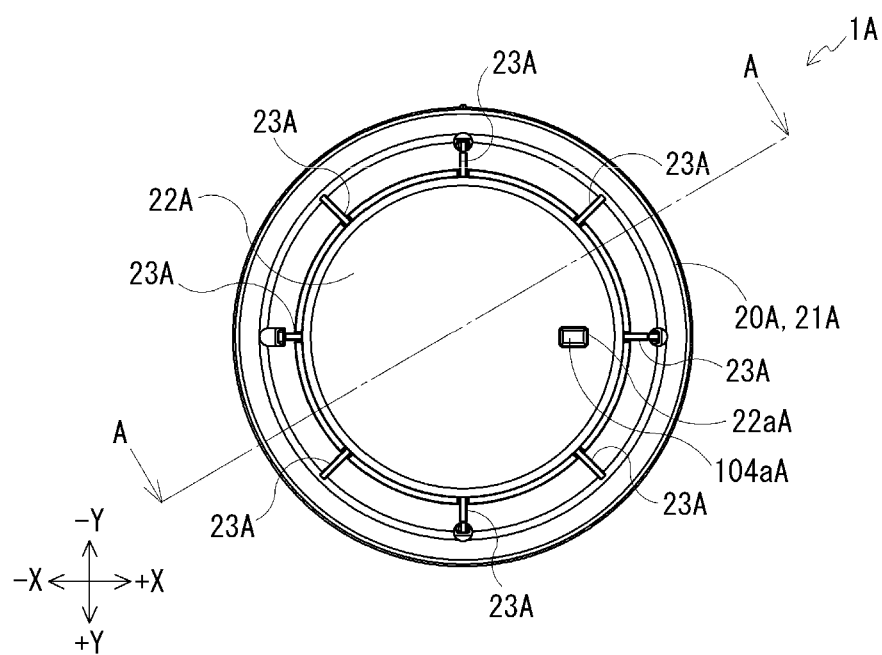

[Fig. 3]
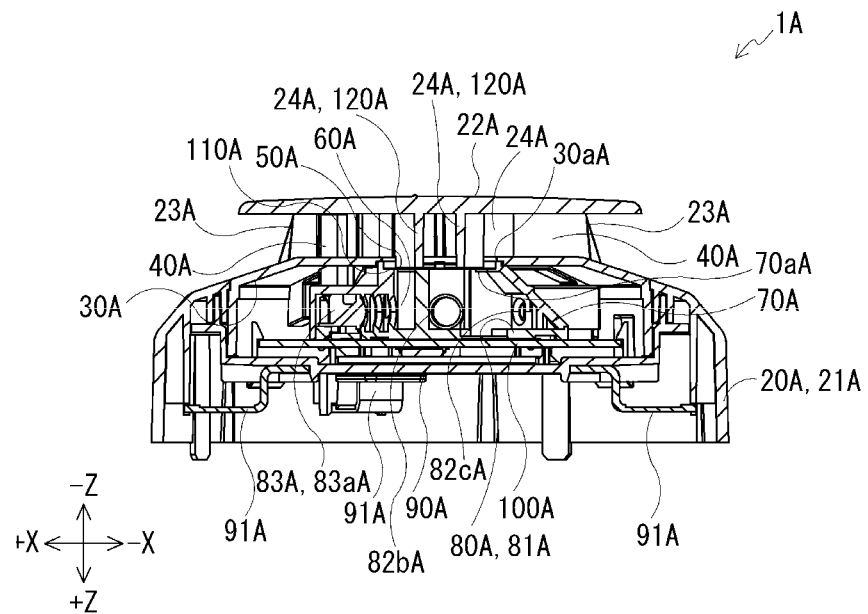
[Fig. 4]
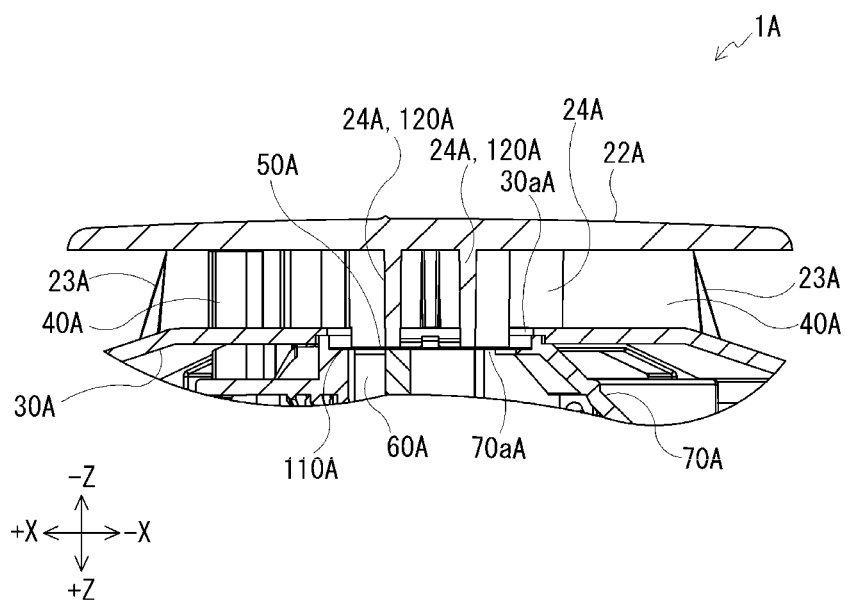

[Fig. 5A]
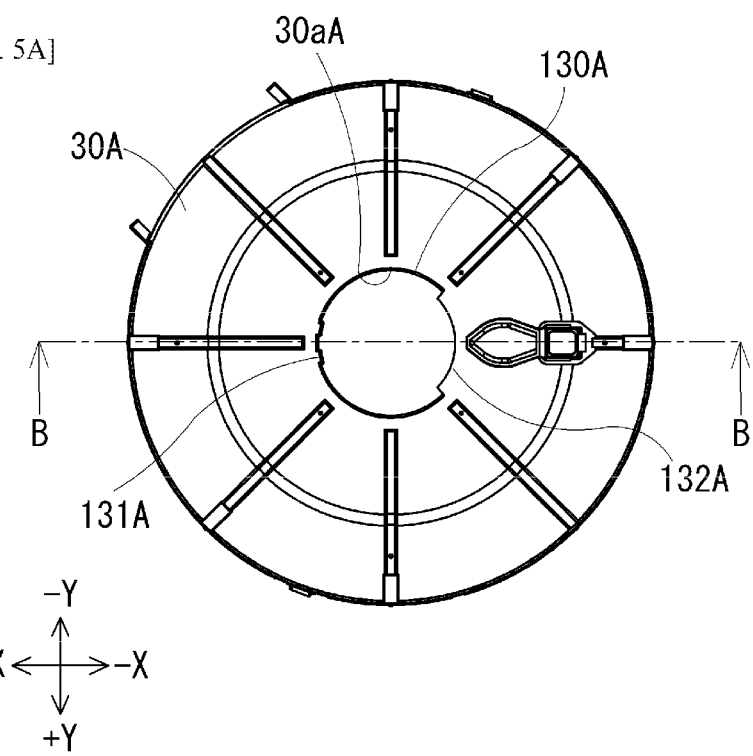
[Fig. 5B]
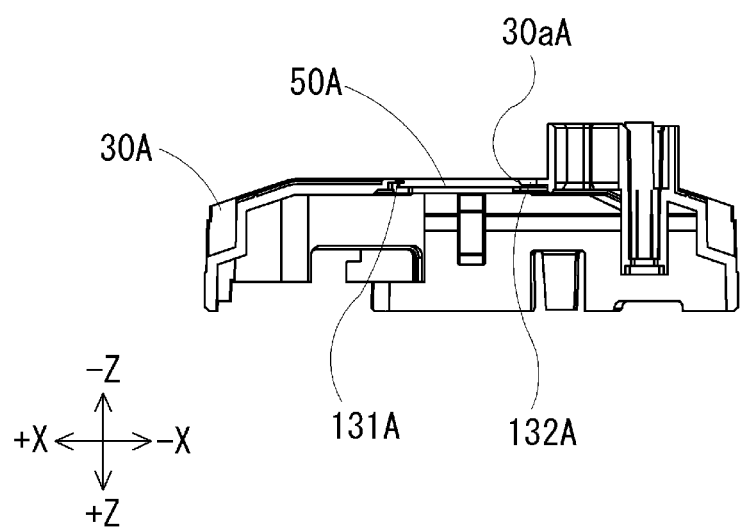

[Fig. 6]
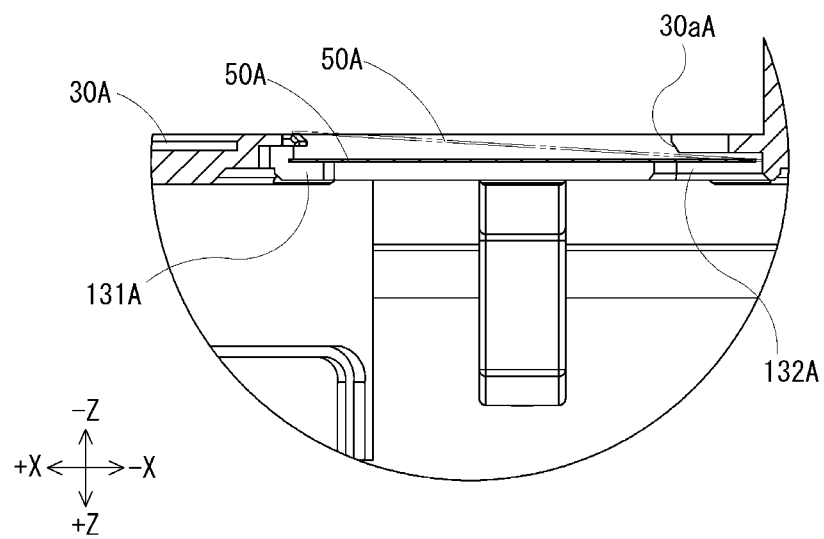
[Fig. 7]
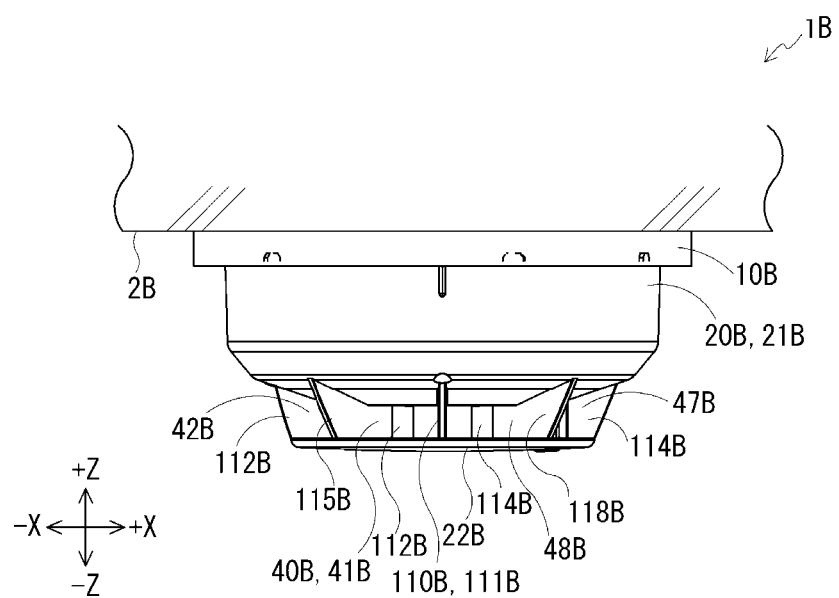

[Fig. 8]
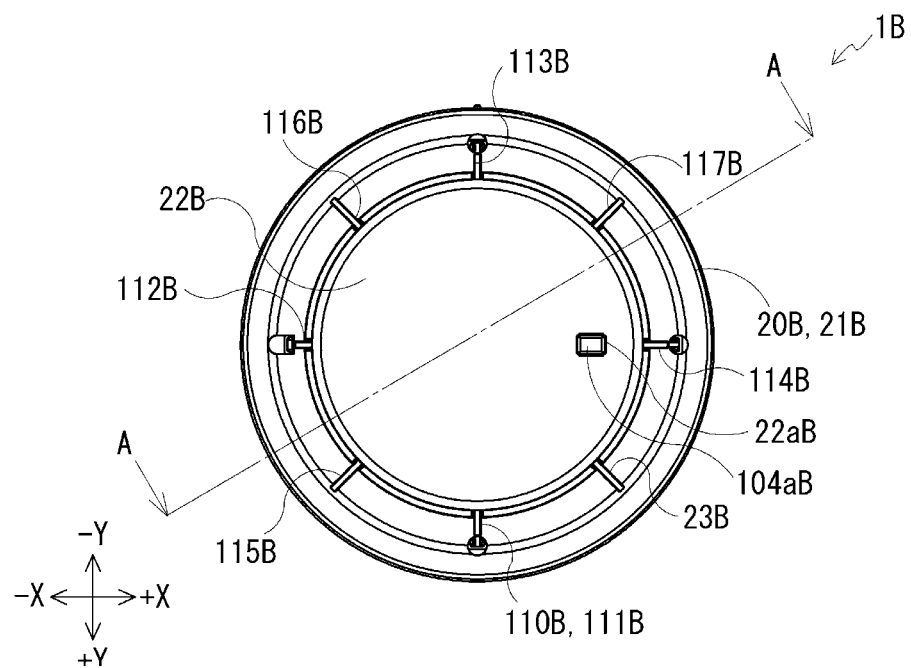
[Fig. 9]
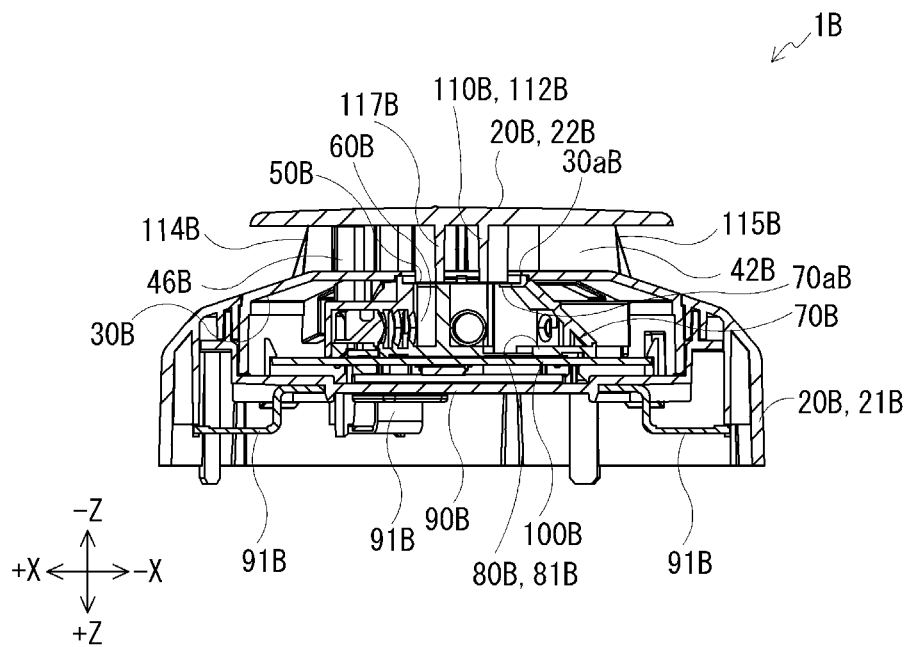

[Fig. 10]
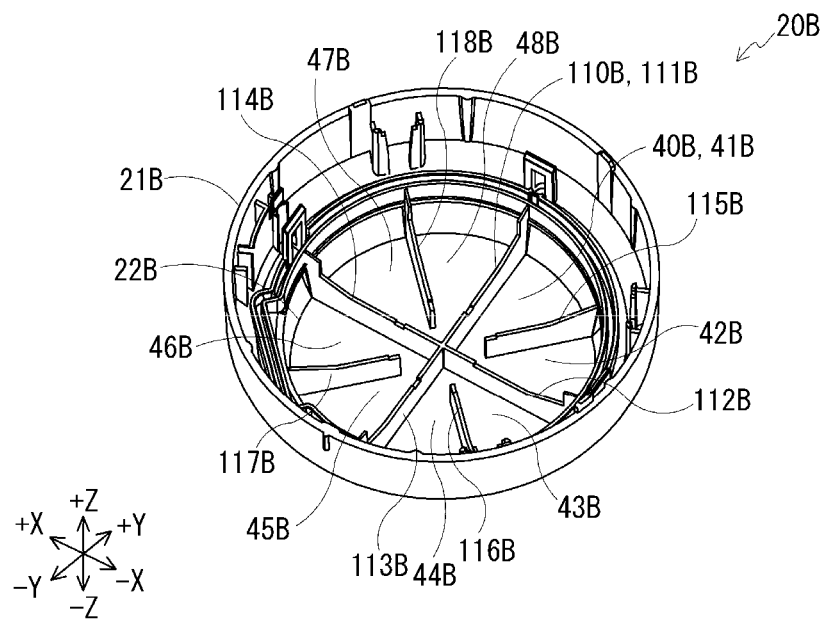
[Fig. 11]
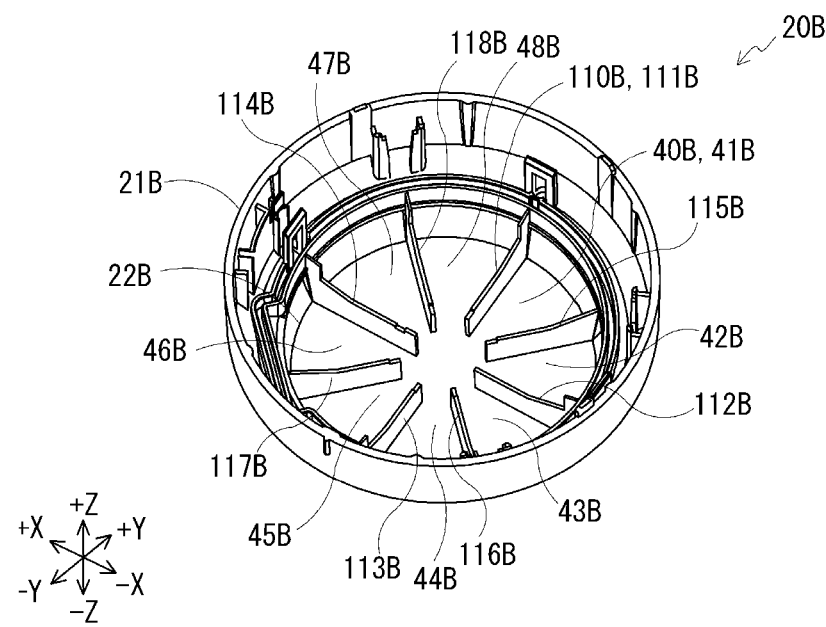

[Fig. 12]
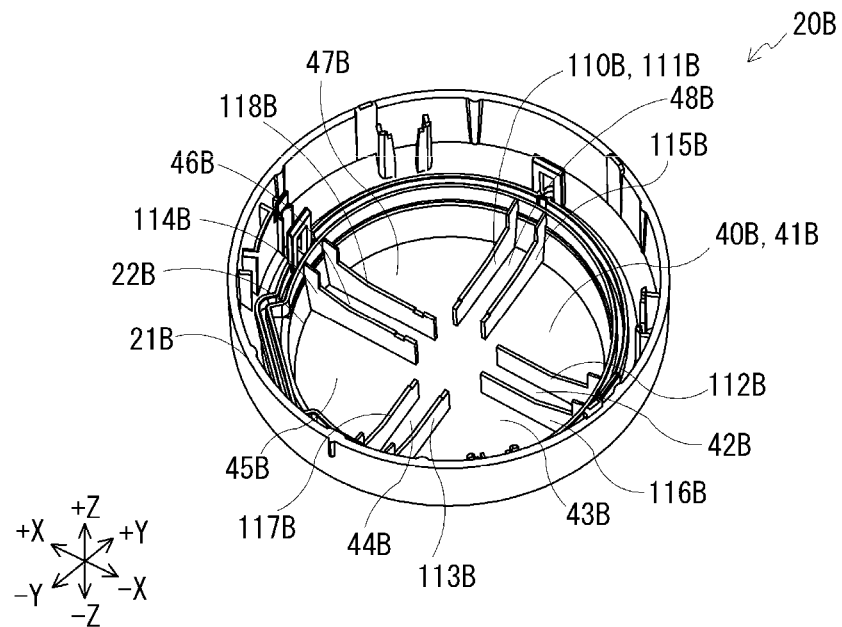
[Fig. 13]
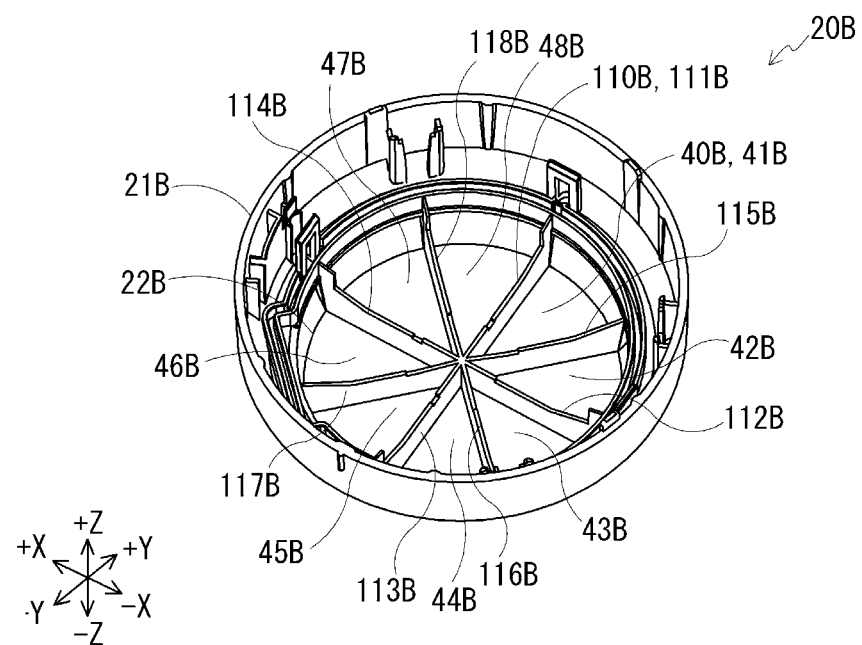

[Fig. 14]
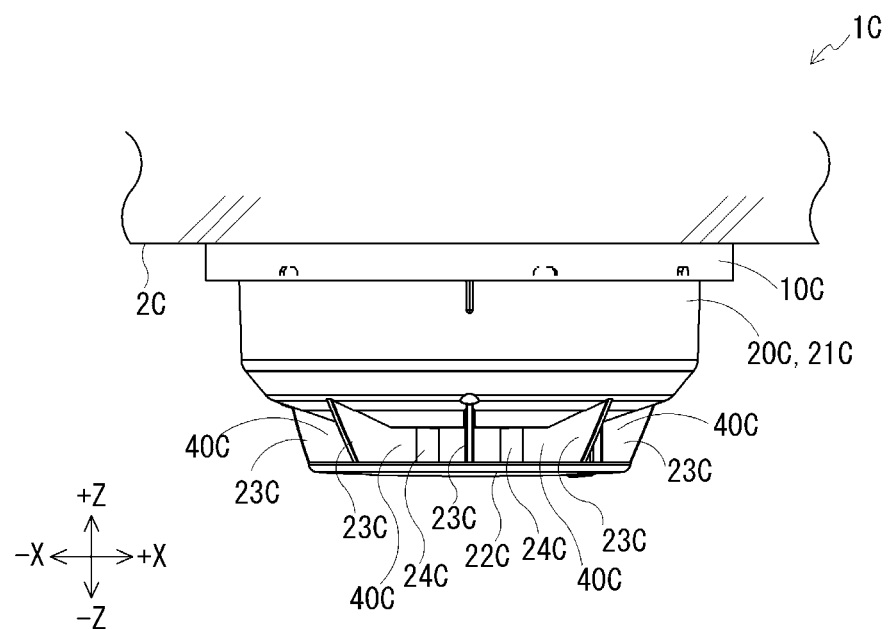

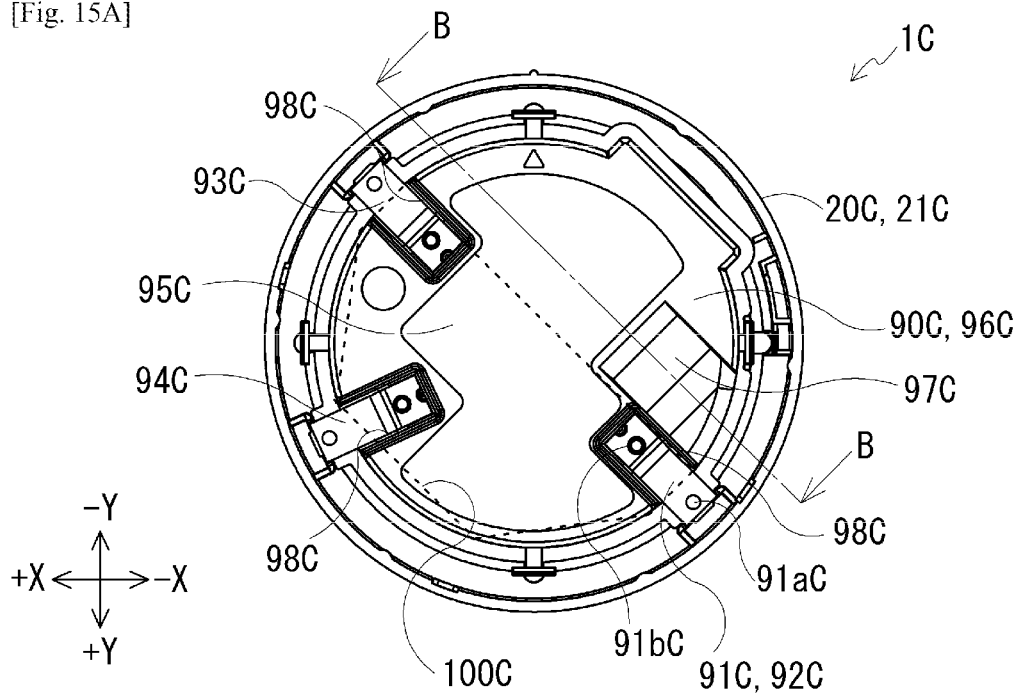
[Fig. 15A]
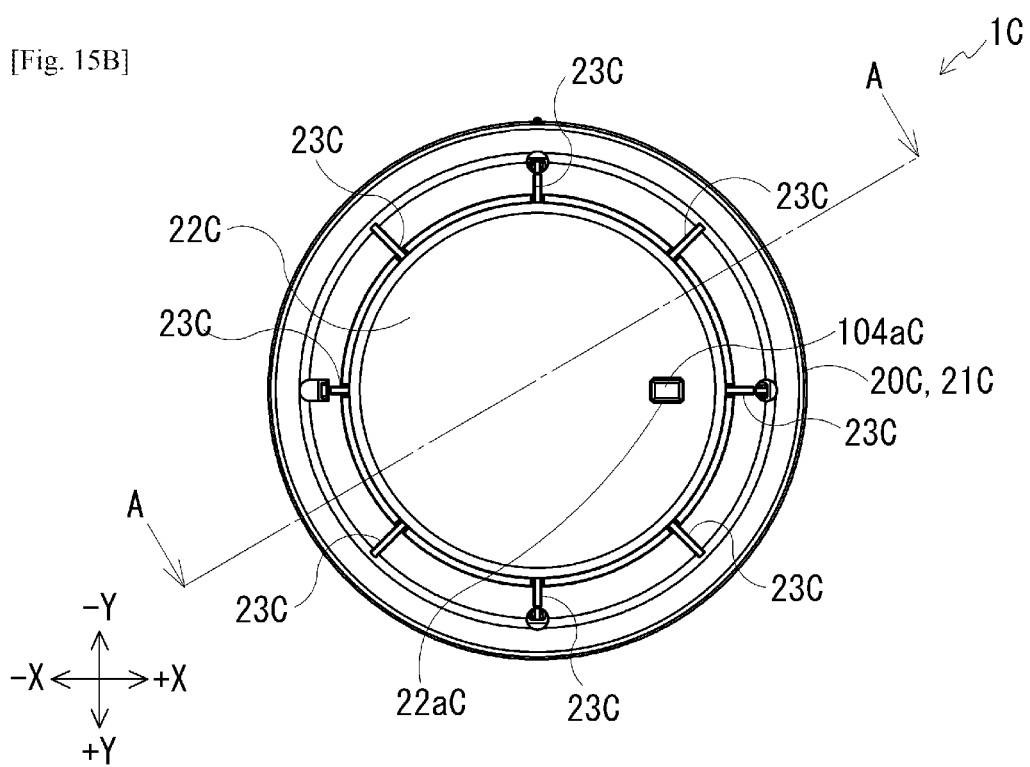
[Fig. 15B]

[Fig. 16]
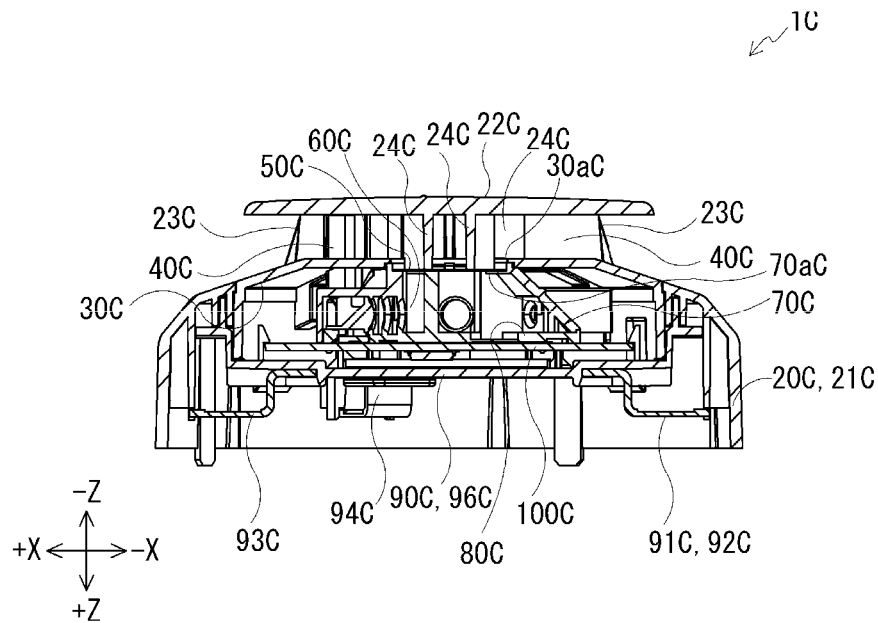
[Fig. 17]
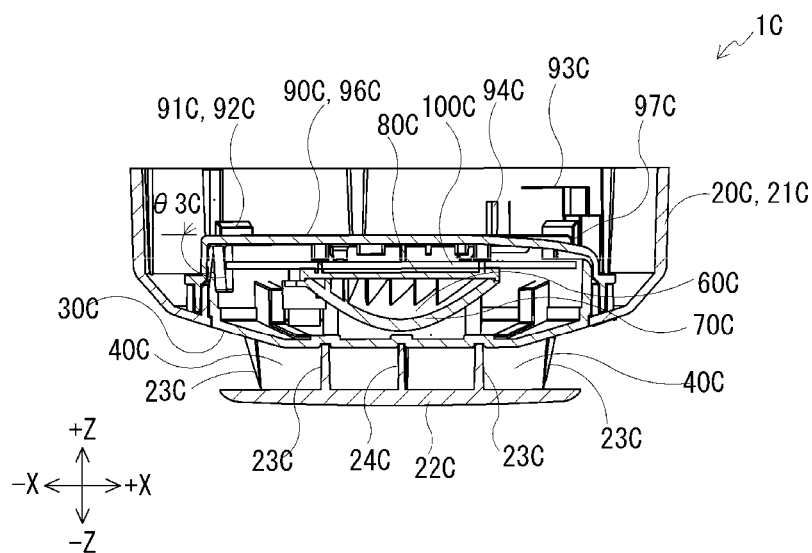

[Fig. 18]
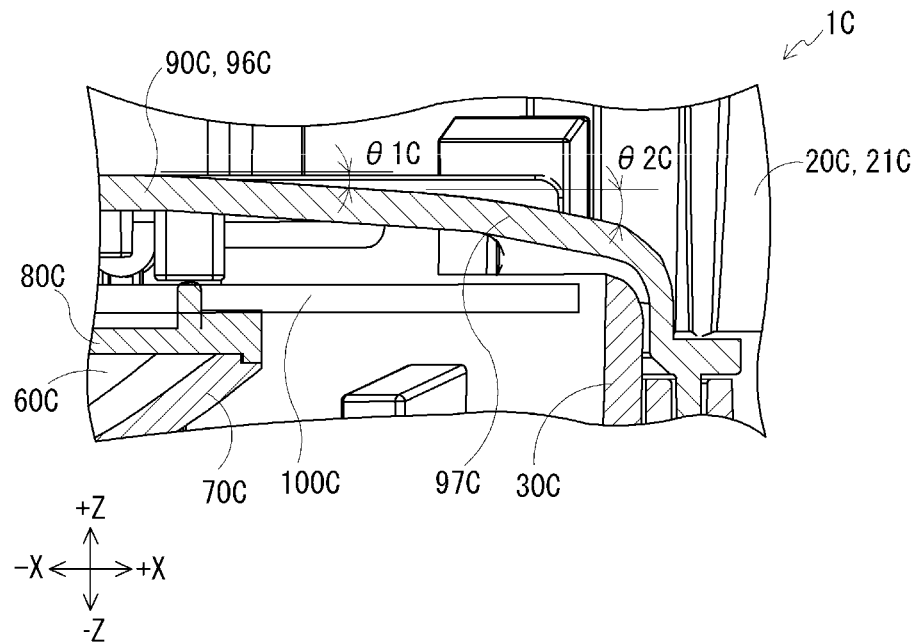
[Fig. 19]
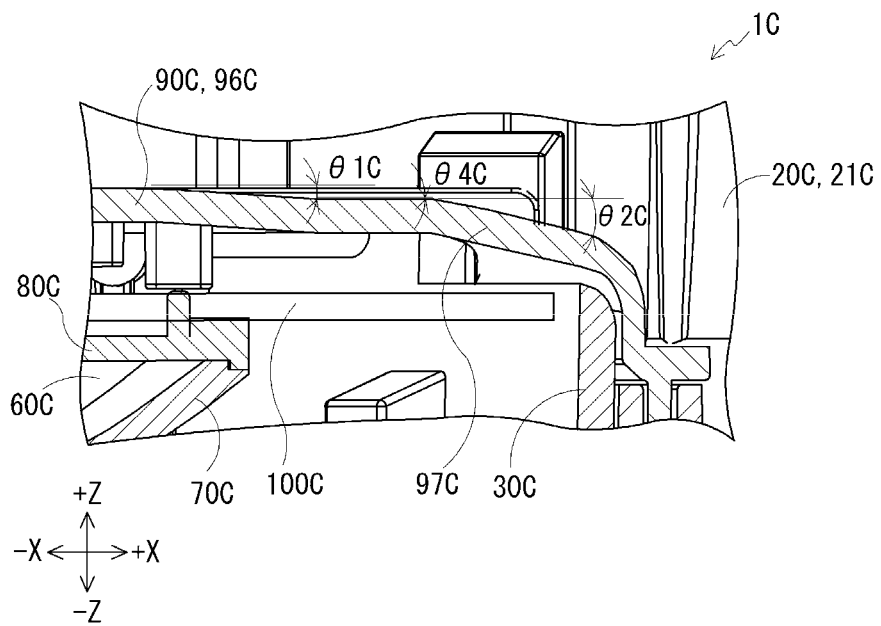

[Fig. 20]
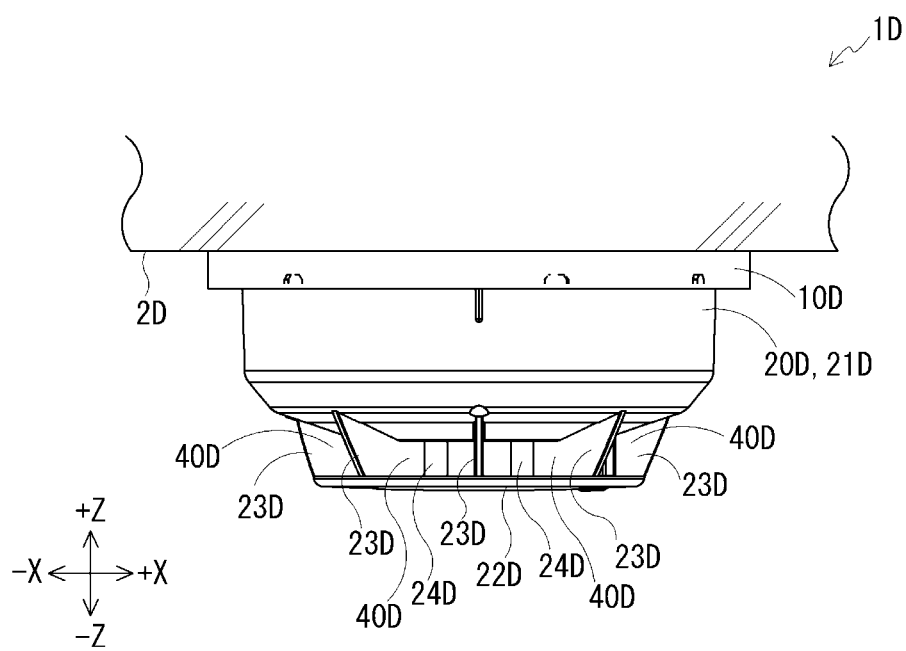
[Fig. 21]
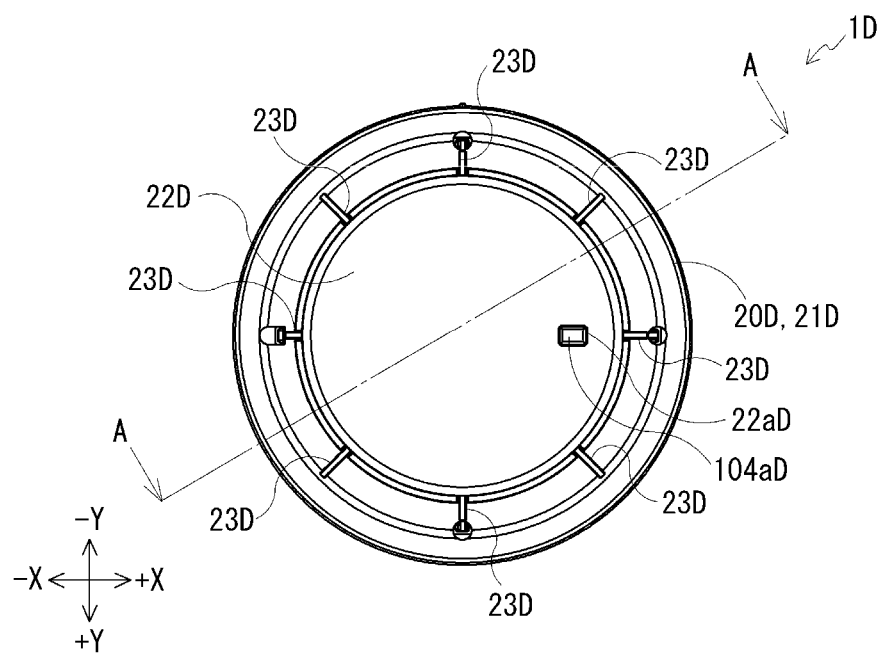

[Fig. 22]
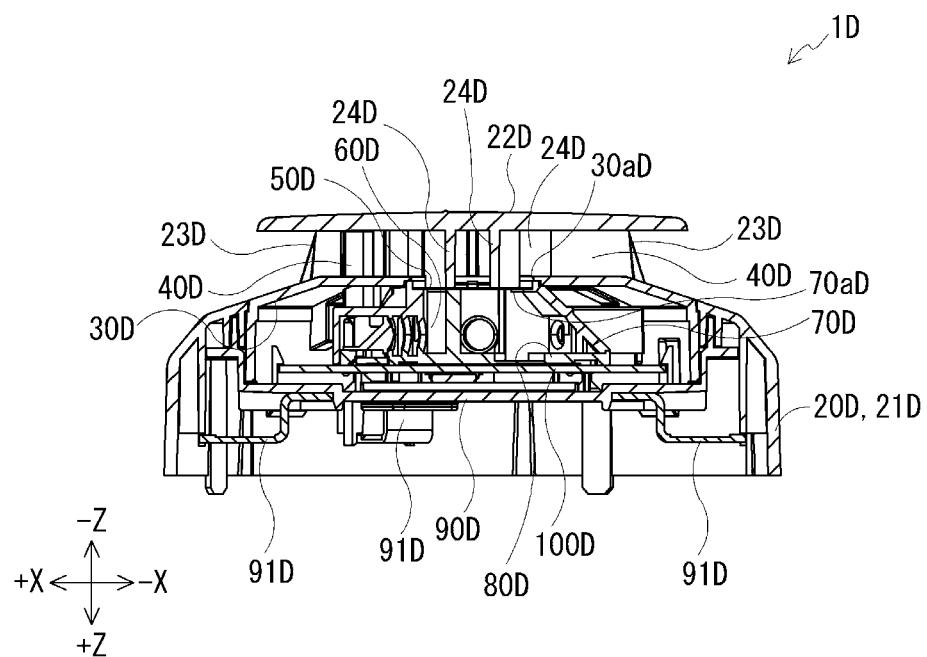

[Fig. 23A]
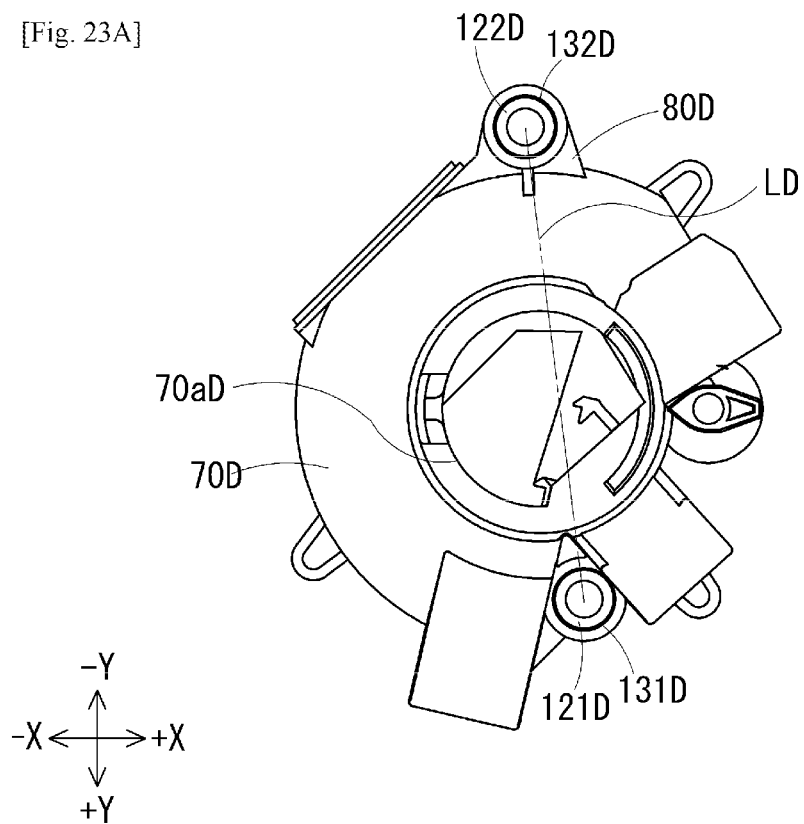
[Fig. 23B]
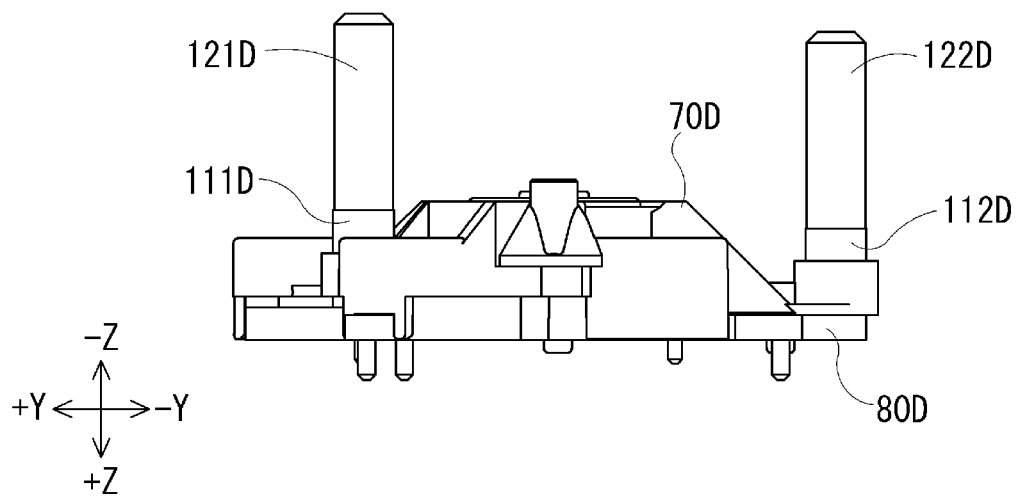

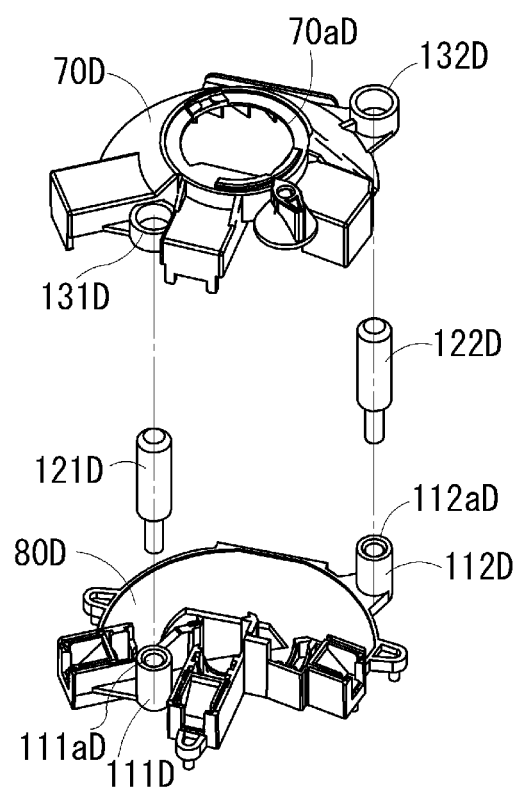
[Fig. 24A]

[Fig. 24B]
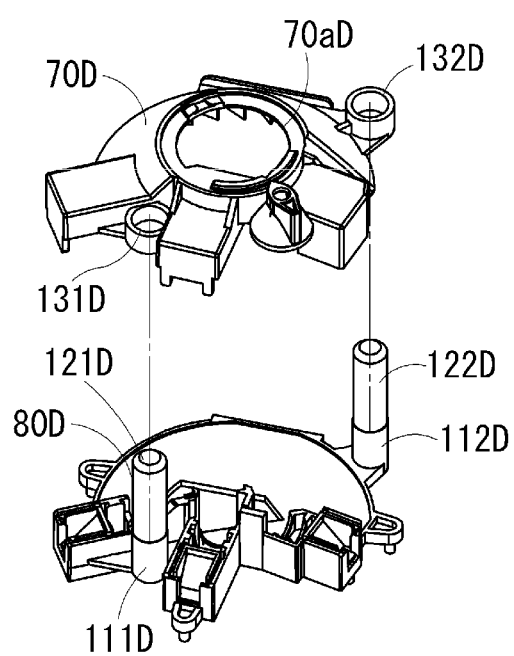

[Fig. 24C]
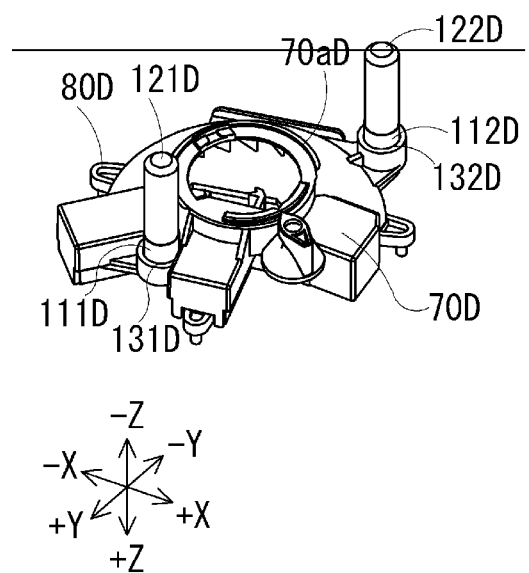

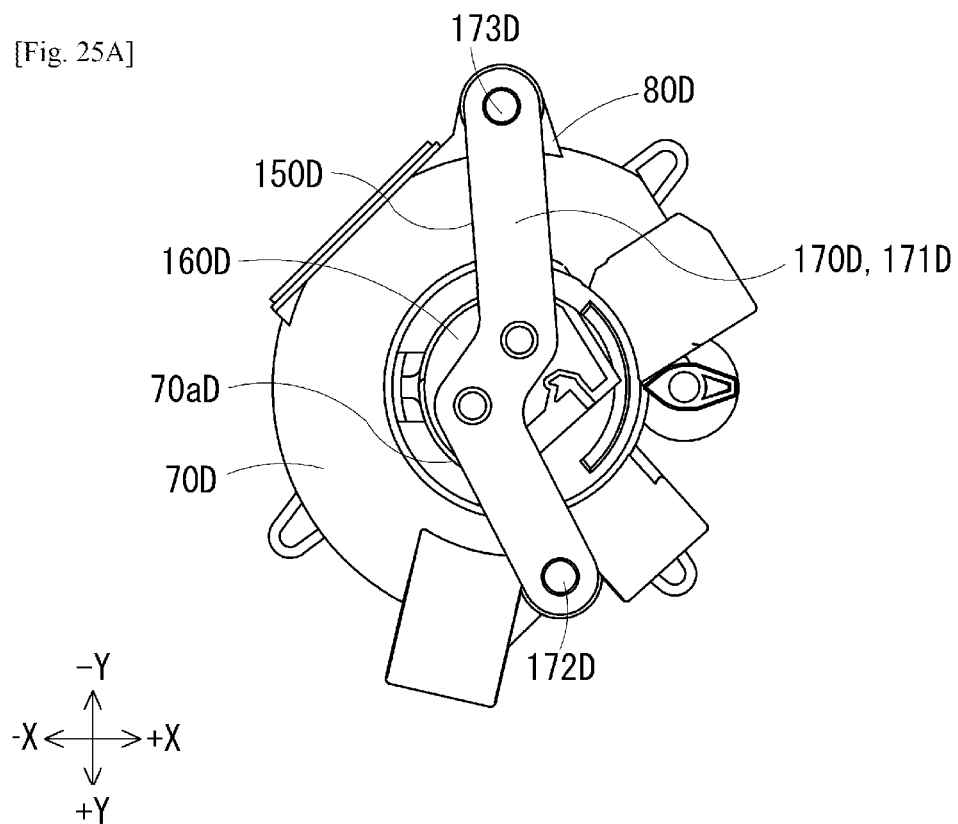
[Fig. 25A]
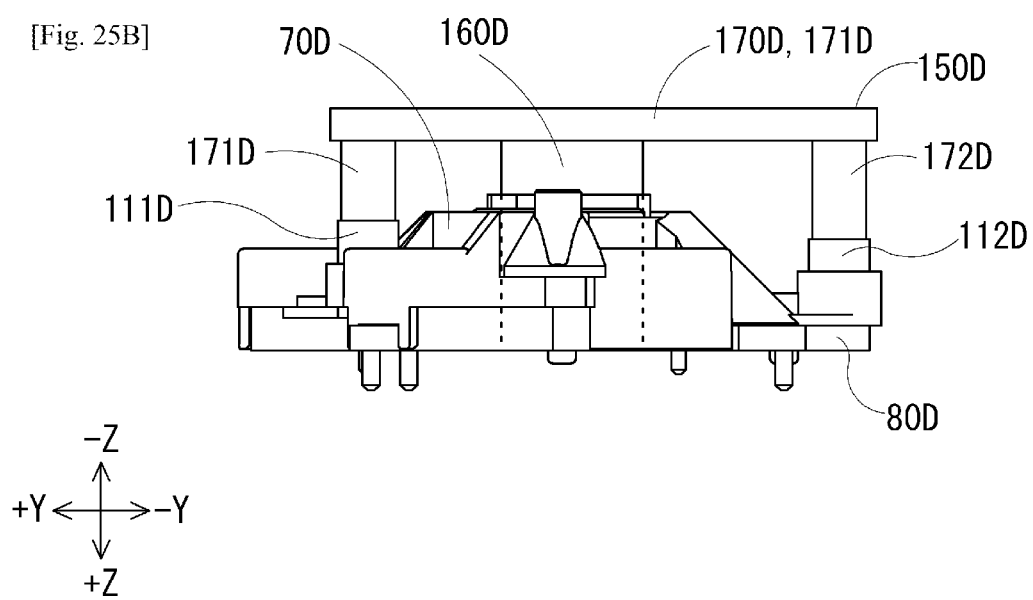
[Fig. 25B]

[Fig. 26]
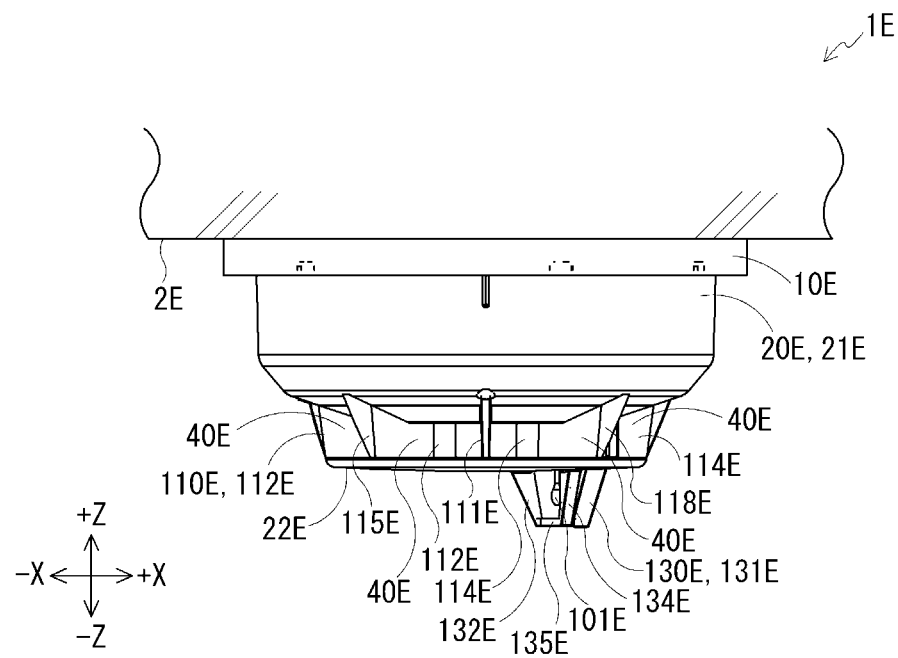
[Fig. 27]
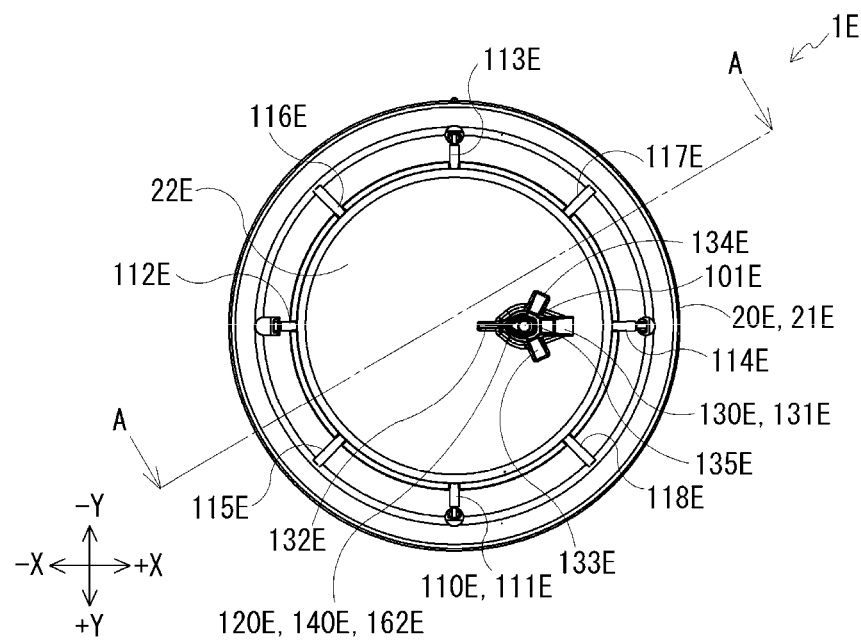

[Fig. 28]
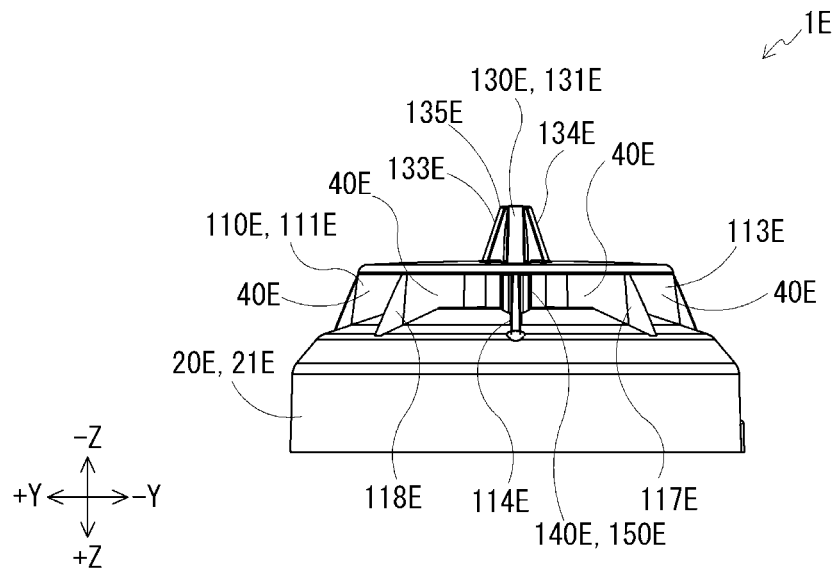
[Fig. 29]
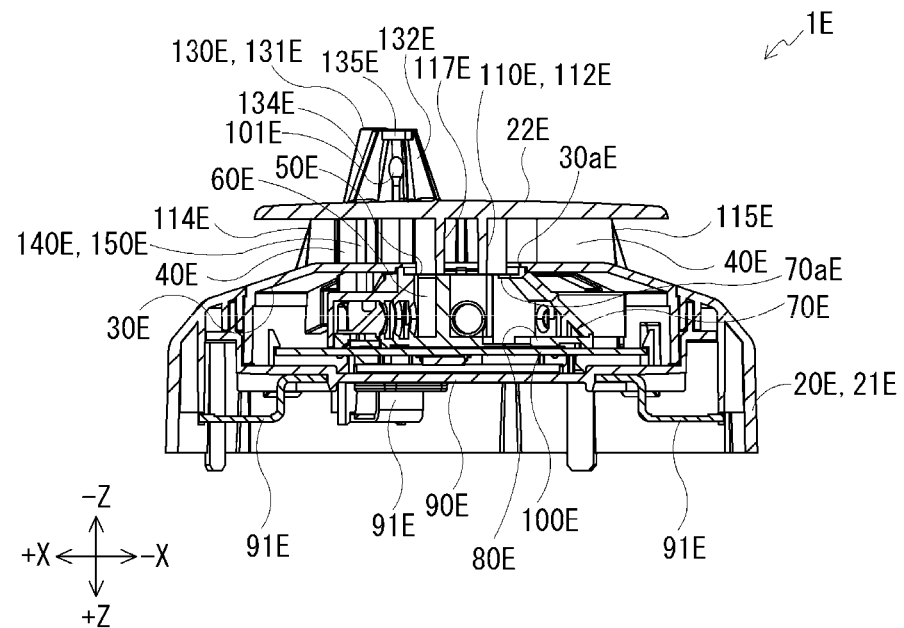

[Fig. 30]
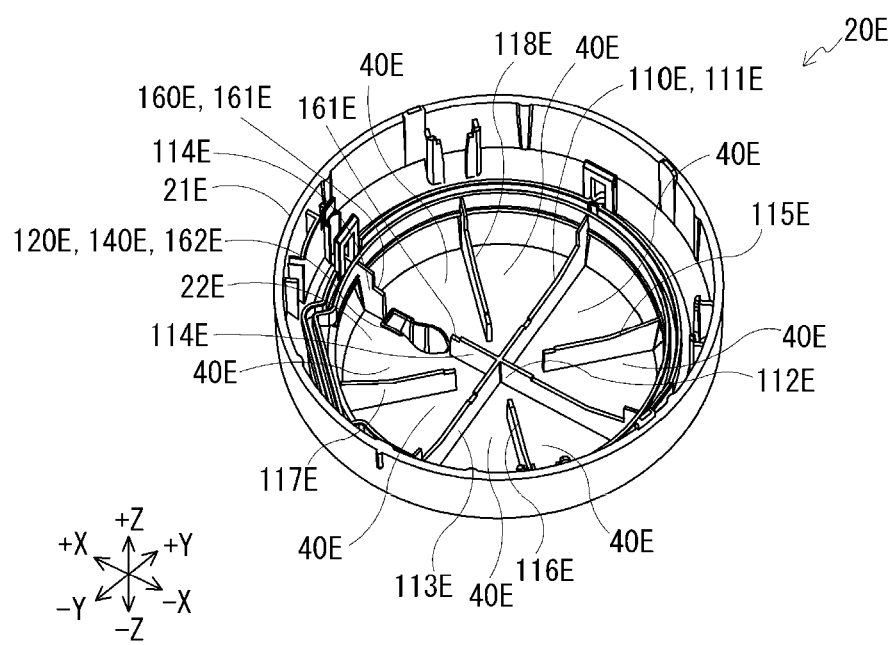

[Fig. 31A]
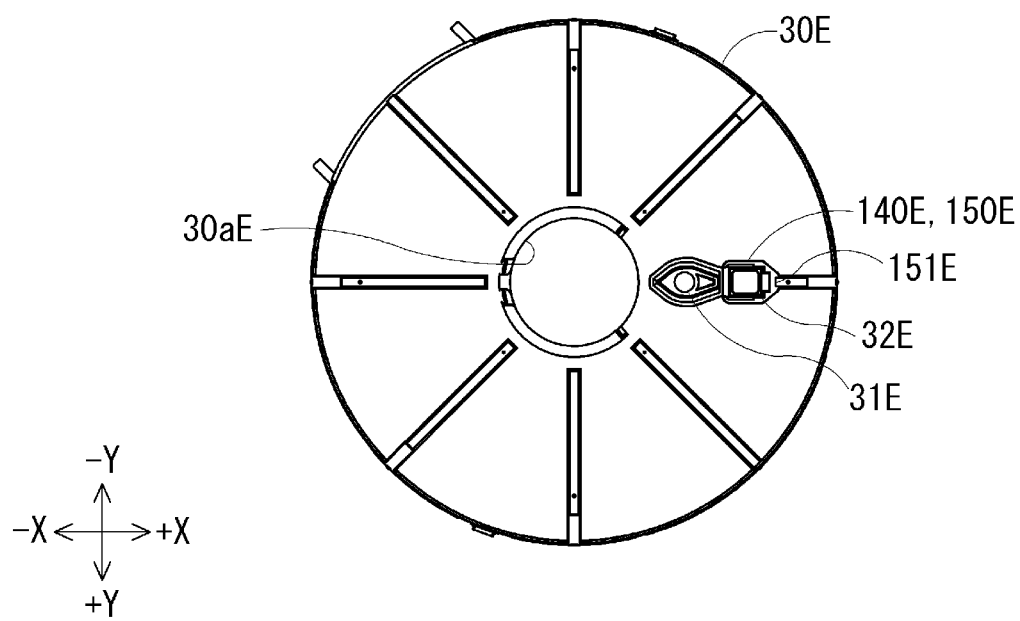
[Fig. 31B]
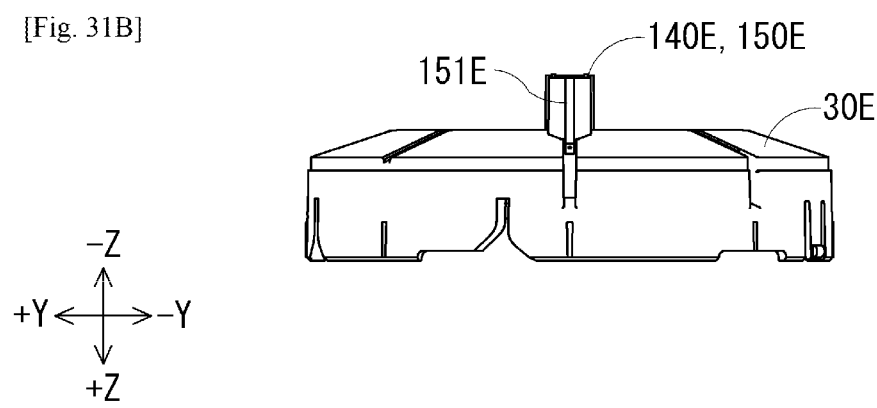

[Fig. 32]
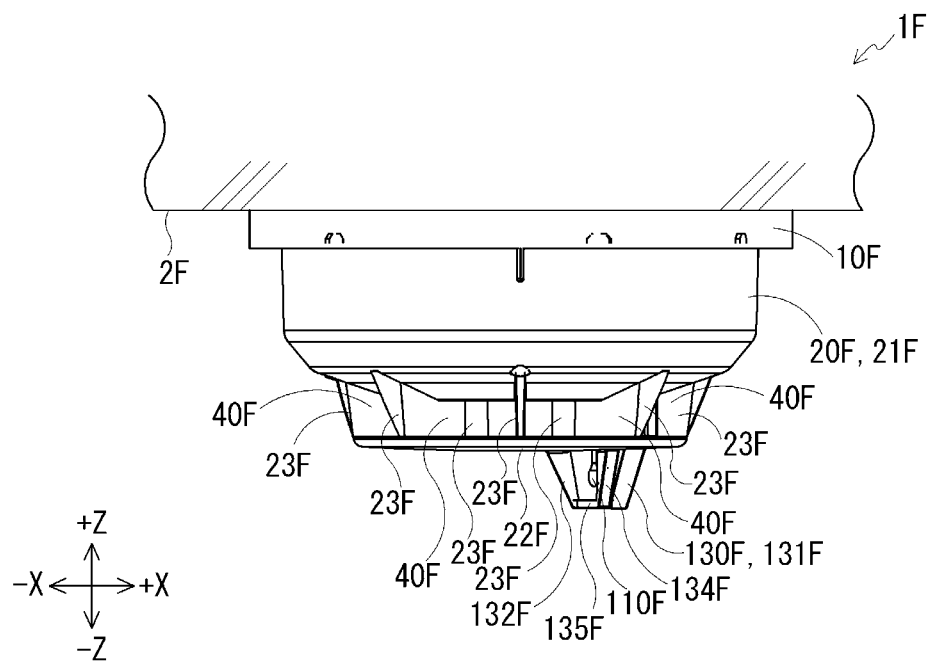
[Fig. 33]
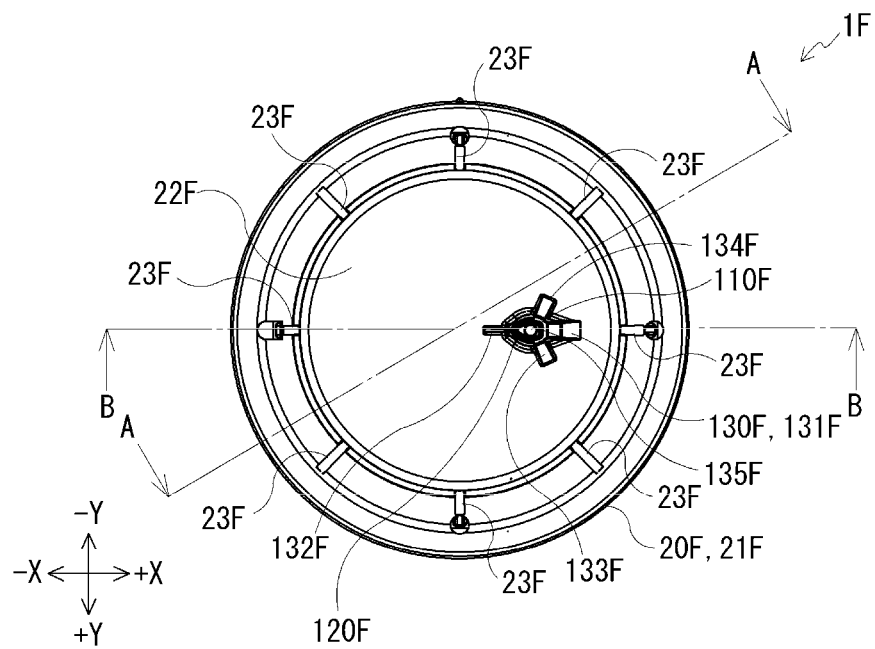

[Fig. 34]
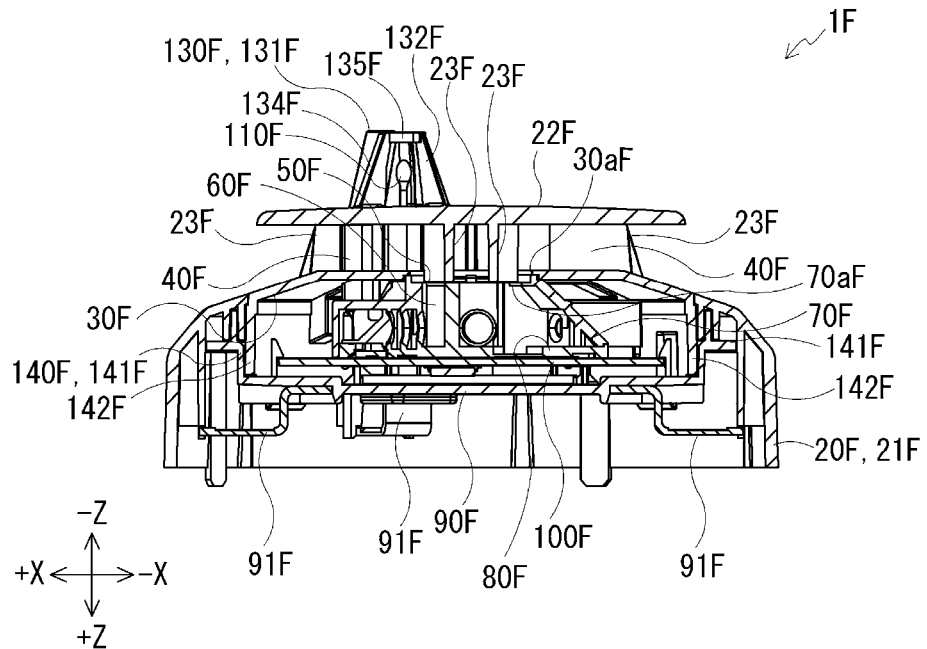
[Fig. 35]
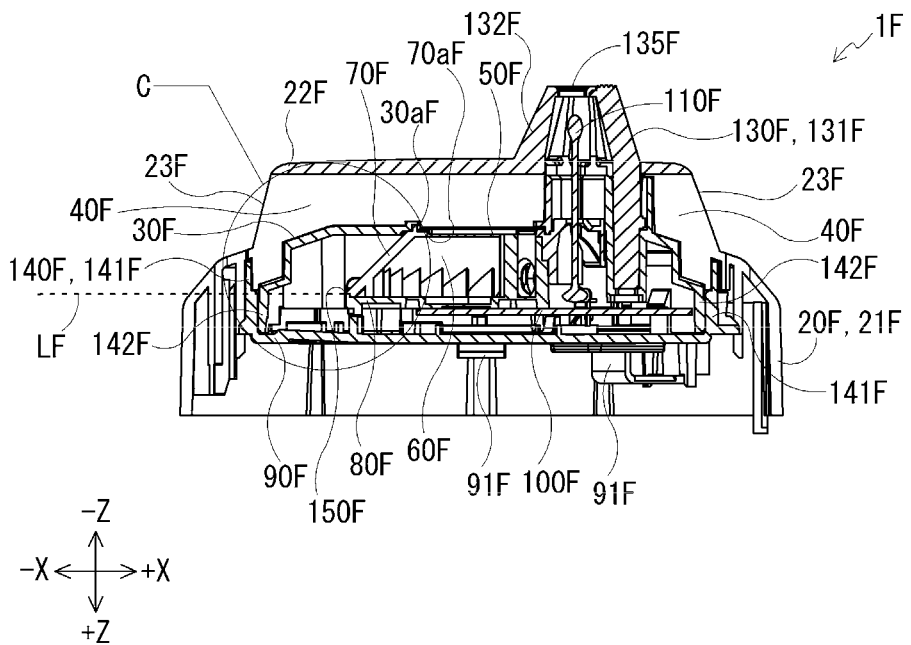

[Fig. 36]
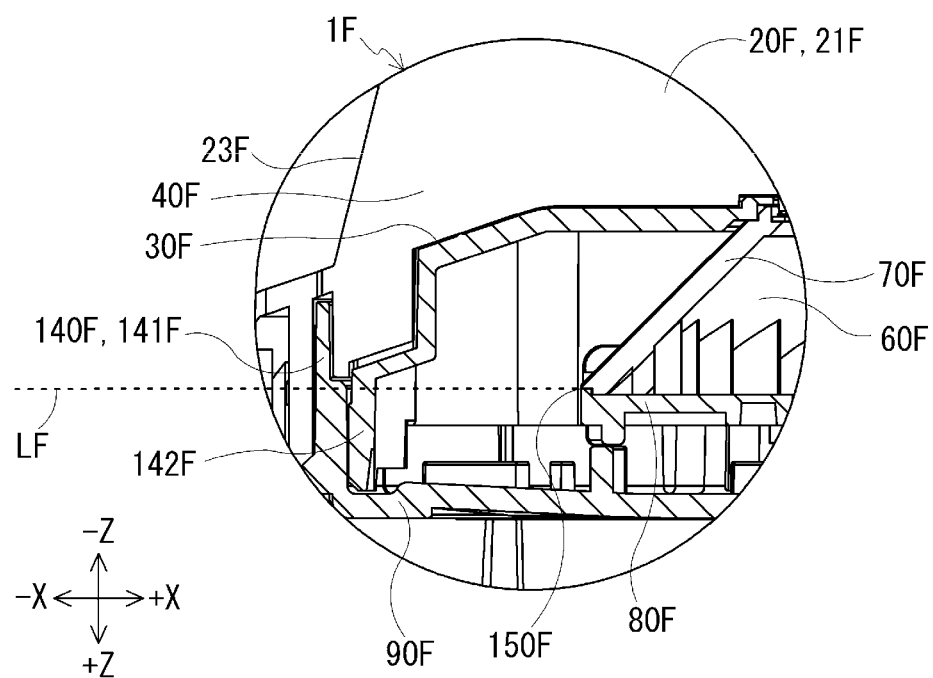

FIRE DETECTION APPARATUS

CROSS REFERENCE TO RELATED APPLICATIONS

The present application claims the benefit of Japanese Patent Applications No. 2018-119710, filed on Jun. 25, 2018, No. 2018-136052, filed on Jul. 19, 2018, No. 2018-138200, filed on Jul. 24, 2018, No. 2018-200276, filed on Oct. 24, 2018, No. 2018-240136, filed on Dec. 21, 2018, and No. 2019-003212, filed on Jan. 11, 2019, and the benefit of PCT application No. PCT/JP2019/017008 filed on Apr. 22, 2019, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, a fire detector that detects a fire in a monitored area has been known (for example, see Patent Document 1 to Patent Document 6).

Specifically, in a fire detector of Patent Document 1, for a smoke detector that detects a fire in a monitored area, there has been a proposed technology for preventing insects from intruding into a detection space located inside the smoke detector. In this technology, the smoke detector is configured to include a detection space, a labyrinth covering an outer periphery and a back surface of the detection space, a cylindrical insect screen covering an outer periphery of the detection unit included in the labyrinth, a hollow inner cover which covers a surface of the detection space and accommodates the detection space, the labyrinth, and the insect screen, and a hollow outer cover which accommodates the inner cover.

In addition, in a fire detector of Patent Document 2, for a smoke detector that detects a fire in a monitored area, there has been a proposed technology of providing an inflow space for allowing smoke to flow into a detection space inside the smoke detector. In this technology, the smoke detector is configured to include a base plate covering a lower surface of the detection space, a labyrinth having a plurality of labyrinth materials which covers an outer edge of the detection space, is spaced apart from each other, and is erected with respect to the base plate, a smoke detection unit body covering an upper surface of the detection space, a cover member which is provided to cover the labyrinth and the smoke detection unit body and has a plurality of smoke inlets for allowing an inflow of smoke from the outside, and an inflow space provided between the labyrinth (specifically the labyrinth materials) and a side wall of the cover member inside the cover member. According to such a smoke detector, it is possible to allow smoke present outside the cover member to flow into the inflow space through any one of the plurality of smoke inlets and to allow the smoke that has flowed in to flow into the detection space through a gap between the labyrinth materials.

In addition, in a fire detector of Patent Document 3, as a technology for electrically connecting a detector that detects a fire in a monitored area and a power supply line or a signal line to each other, there has been a proposed technology of connecting a connection terminal to the power supply line (or the signal line) provided on the installation surface. Here, the connection terminal is provided on a flat side portion present on an installation surface (specifically, a ceiling surface) side to which the detector is attached in side portions of a detector base included in a casing of the detector and is electrically connected to a circuit board.

In addition, in a fire detector of Patent Document 4, for a smoke detector that detects a fire in a monitored area, there has been a proposed technology for introducing smoke into the smoke detector to detect scattered light by the smoke. In this technology, for example, the smoke detector is configured to include a casing, a smoke detection space provided inside the casing, and a smoke detection unit provided inside the casing and used to accommodate the smoke detection space so that ambient light does not enter the smoke detection space. In addition, the smoke detection unit is configured by fitting a labyrinth, which is provided inside the casing and has a plurality of labyrinth members that surrounds a part of the detection space at an interval from each other, to a smoke detection unit body provided inside the casing and used to cover another part of the detection space.

In addition, in a fire detector of Patent Document 5, for a smoke detector that detects a fire in a monitored area, there has been a proposed technology for introducing smoke into the smoke detector while shielding ambient light. In this technology, the smoke detector is configured to include a detection space, a labyrinth covering an outer periphery of the detection space, a hollow inner cover which accommodates the labyrinth and has a slit for allowing gas containing smoke to flow in, and a hollow outer cover which accommodates the inner cover and has an opening for exposing the slit of the inner cover to the outside. In addition, the inner cover and the outer cover are separately formed.

In addition, in a fire detector of Patent Document 6, for a smoke detector that detects a fire in a monitored area, there has been a proposed technology for introducing smoke into the smoke detector while shielding ambient light. In this technology, a smoke detector including a smoke detection space and a smoke detection unit that accommodates the smoke detection space is disclosed. In addition, the smoke detection unit includes a smoke detection unit body that covers a side surface of the smoke detection space on an installation surface side and a smoke detection unit cover that covers a side surface of the smoke detection space on the opposite side from the installation surface side and a side surface of the smoke detection space on a side.

CITATION LIST

Patent Document

Patent Document 1: International Publication WO2016/009460
Patent Document 2: Laid-open Patent Application Publication in Japan No. 2004-220225
Patent Document 3: Laid-open Patent Application Publication in Japan No. 2017-228190
Patent Document 4: Laid-open Patent Application Publication in Japan No. 2006-267128

Patent Document 5: Laid-open Patent Application Publication in Japan No. 2012-048766

Patent Document 6: Laid-open Patent Application Publication in Japan No. Heisei 8-171685

SUMMARY OF THE INVENTION

Technical Problem

However, in the fire detectors of Patent Document 1 to Patent Document 6, a first problem to sixth problem shown below have occurred.

First, with regard to the first problem, in the fire detector of Patent Document 1, as described above, since the cylindrical insect screen is provided to cover the outer periphery of the detection unit on the inside of the inner cover, there is a need to perform a complicated operation such as fitting the insect screen into the labyrinth so that an inner edge of the cylindrical insect screen covers the outer edge of the labyrinth after the rectangular insect screen is deformed into a cylindrical shape at the time of attaching the insect screen. Thus, there is room for improvement from a viewpoint of efficiency of the operation.

In addition, with regard to the second problem, in the fire detector of Patent Document 2, as described above, since the detection space is covered by the plurality of labyrinth materials, for example, when smoke is inhibited from flowing into the detection space by the plurality of labyrinth materials, smoke flowing into the inflow space flows out to the outside of the cover member through the smoke inlets without flowing into the detection space. Thus, there is a possibility that detection of smoke may be adversely affected. Therefore, there is room for improvement from a viewpoint of improving detection accuracy of the fire detection apparatus such as the smoke detector.

In addition, with regard to the third problem, it is presumed that when condensation occurs on the installation surface, water droplets attached to the installation surface drip to the side portion of the detector base on the installation surface side. However, as described above, in the fire detector of Patent Document 3, since the side portion of the detector base on the installation surface side is formed in a flat shape, the dripping water droplets are likely to accumulate on the side portion of the detector base on the installation surface side. Thus, for example, there is concern that the connection terminal may be short-circuited by the accumulating water droplets. Therefore, there is room for improvement from a viewpoint of usability of the fire detection apparatus such as the detector.

In addition, with regard to the fourth problem, in recent years, there has been a growing need to improve efficiency of an assembly operation of the smoke detection unit. However, in the fire detector of Patent Document 4, as described above, even though the smoke detection unit is configured by fitting the labyrinth to the smoke detection unit body, for example, when a size of a fitting portion of the smoke detection unit body is relatively small, it may be difficult to fit the labyrinth to the smoke detection unit body. Thus, it may be difficult to improve the efficiency of the assembly operation of the smoke detection unit. Therefore, there is room for improvement from a viewpoint of manufacturability of the fire detection apparatus.

In addition, with regard to the fifth problem, in recent years, there has been a growing need to improve efficiency of an assembly operation of the smoke detector. However, in the fire detector of Patent Document 5, as described above, since the inner cover and the outer cover are separately formed, it is necessary to perform an operation of aligning a relative position of the inner cover and the outer cover to a predetermined position (so-called alignment operation) at the time of assembling the smoke detector. Thus, for example, it may be difficult to improve the efficiency of the assembly operation of the smoke detector since the operation requires time and effort. Moreover, when the inner cover (or outer cover) and another component come into contact with each other at the time of performing the alignment operation, there is a possibility that the other component may be damaged. Therefore, there is room for improvement from a viewpoint of manufacturability of the fire detection apparatus such as the smoke detector.

In addition, with regard to the sixth problem, in the fire detector of Patent Document 6, as described above, since the smoke detection unit is configured by combining the smoke detection unit body and the smoke detection unit cover, for example, when ambient light enters the smoke detection space through a boundary between the smoke detection unit body and the smoke detection unit cover, there is concern that it may be difficult to maintain the detection accuracy of the smoke detector. Thus, there is room for improvement from a viewpoint of maintaining the detection accuracy of the fire detection apparatus such as the smoke detector.

It is an object of the present invention to solve the problems of the above mentioned prior arts.

Solution to Problem

One aspect of the present invention provides a fire detection apparatus for detecting a fire in a monitored area, wherein a unit or a space used for detection of the fire is provided on an inside of the fire detection apparatus.

BRIEF DESCRIPTION OF THE DRAWINGS

FIG. 1 is a side view illustrating an attachment state of a fire detection apparatus according to Embodiment 1.

FIG. 2 is a bottom view illustrating the fire detection apparatus in a state of removing an attachment base.

FIG. 3 is a cross-sectional view taken along A-A line of FIG. 2.

FIG. 4 is an enlarged view of an area of an insect screen of FIG. 3 (partially not illustrated).

FIGS. 5A and 5B are diagrams illustrating a modification of an inner cover, in which FIG. 5A is a bottom view and FIG. 5B is a cross-sectional view taken along B-B line of FIG. 5A.

FIG. 6 is a diagram illustrating an enlarged view of an area of a first opening of FIGS. 5A and 5B.

FIG. 7 is a side view illustrating an attachment state of a fire detection apparatus according to Embodiment 2.

FIG. 8 is a bottom view illustrating the fire detection apparatus in a state of removing an attachment base.

FIG. 9 is a cross-sectional view taken along A-A line of FIG. 8.

FIG. 10 is a perspective view illustrating an outer cover.

FIG. 11 is a perspective view illustrating a modification of the outer cover.

FIG. 12 is a perspective view illustrating a modification of the outer cover.

FIG. 13 is a perspective view illustrating a modification of the outer cover.

FIG. 14 is a side view illustrating an attachment state of a fire detection apparatus according to Embodiment 3.

FIGS. 15A and 15B are diagrams illustrating the fire detection apparatus in a state of removing an attachment base, in which FIG. 15A is a plan view and FIG. 15B is a bottom view.

FIG. 16 is a cross-sectional view taken along A-A line of FIG. 15B.

FIG. 17 is a cross-sectional view taken along B-B line of FIG. FIG. 15A.

FIG. 18 is an enlarged view of an area of a non-horizontal portion of FIG. 17.

FIG. 19 is a diagram illustrating a modification of a terminal board and is a diagram illustrating an area corresponding to FIG. 18.

FIG. 20 is a side view illustrating an attachment state of a fire detection apparatus according to Embodiment 4.

FIG. 21 is a bottom view illustrating the fire detection apparatus in a state of removing an attachment base.

FIG. 22 is a cross-sectional view taken along A-A line of FIG. 21.

FIGS. 23A and 23B are diagrams illustrating a state in which a detector cover and a detector body are fixed to each other, in which FIG. 23A is a bottom view and FIG. 23B is a side view.

FIGS. 24A, 24B and 24C are perspective views illustrating a fixing state of the detector cover and the detector body, in which FIG. 24A is a diagram illustrating a state before the detector cover and the detector body are fixed to each other, FIG. 24B is a diagram illustrating a state in which a first guide portion and a second guide portion are fixed to the detector body, and FIG. 24C is a diagram illustrating a state in which the detector cover and the detector body are fixed to each other.

FIGS. 25A and 25B are diagrams illustrating a state in which a sensitivity adjustment tool and the detector body are fixed to each other, in which FIG. 25A is a bottom view and FIG. 25B is a side view.

FIG. 26 is a side view illustrating an attachment state of a fire detection apparatus according to Embodiment 5.

FIG. 27 is a bottom view illustrating the fire detection apparatus in a state of removing an attachment base.

FIG. 28 is a side view of the fire detection apparatus of FIG. 27.

FIG. 29 is a cross-sectional view taken along A-A line of FIG. 27.

FIG. 30 is a perspective view illustrating an outer cover.

FIGS. 31A and 31B are diagrams illustrating an inner cover, in which FIG. 31A is a bottom view and FIG. 31B is a side view.

FIG. 32 is a side view illustrating an attachment state of a fire detection apparatus according to Embodiment 6.

FIG. 33 is a bottom view illustrating the fire detection apparatus in a state of removing an attachment base.

FIG. 34 is a cross-sectional view taken along A-A line of FIG. 33.

FIG. 35 is a cross-sectional view taken along B-B line of FIG. 33 (partially not illustrated).

FIG. 36 is an enlarged view of a part around an area C of FIG. 35.

MODE FOR CARRYING OUT THE INVENTION

Hereinafter, embodiments of a fire detection apparatus according to the invention will be described in detail with reference to drawings. First, [I] basic concepts of the embodiments will be described, and then [II] specific contents of the embodiments will be described. Finally, [III] modifications to the embodiments will be described. However, the invention is not limited by the embodiments.

[1] Basic Concepts of Embodiments

First, the basic concepts of Embodiment 1 to Embodiment 6 will be described.

Basic Concept of Embodiment 1

First, the basic concept of Embodiment 1 will be described. Embodiment 1 (mode corresponding to the first problem) generally corresponds to a fire detection apparatus attached to an installation surface of an installation object, and relates to a fire detection apparatus for detecting a fire in a monitored area.

Here, in Embodiment 1, the "fire detection apparatus" is an apparatus that thermally detects and reports a fire in the monitored area, and is a concept including, for example, an optical fire detector, a fire alarm, etc. In addition, the "installation object" is an object on which the fire detection apparatus is installed, and is a concept including, for example, a ceiling portion, a wall portion, etc. of a building. In addition, a specific structure or type of the "building" is arbitrary. For example, the "building" is a concept including a detached house, a complex building such as a row house or an apartment, an office building, an event facility, a commercial facility, a public facility, etc. In addition, the "monitored area" is an area to be monitored and is a concept including, for example, an area inside a building, an area outside the building, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 1, a description will be given of a case in which the "fire detection apparatus" is the "optical fire detector", the "installation object" is the "ceiling of the office building", and the "monitored area" is the "area inside the office building".

Basic Concept of Embodiment 2

Next, the basic concept of Embodiment 2 will be described. Embodiment 2 (mode corresponding to the second problem) generally relates to a fire detection apparatus for detecting a fire in a monitored area.

Here, in Embodiment 2, the "fire detection apparatus" is an apparatus that optically detects and reports a fire in the monitored area, and is a concept including, for example, an optical fire detector, a fire alarm, etc. In addition, the "monitored area" is an area to be monitored and is a concept including, for example, an area inside a building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 2, a description will be given of a case in which the "fire detection apparatus" is the "optical fire detector", and the "monitored area" is the "area inside the office building".

Basic Concept of Embodiment 3

Next, the basic concept of Embodiment 3 will be described. Embodiment 3 (mode corresponding to the third problem) generally corresponds to a fire detection apparatus attached to an installation surface of an installation object, and relates to a fire detection apparatus for detecting a fire in a monitored area.

Here, in Embodiment 3, the "fire detection apparatus" is an apparatus that optically detects and reports a fire in the monitored area, and is a concept including, for example, an optical fire detector, a fire alarm, etc. In addition, the "installation object" is an object on which the fire detection apparatus is installed, and is a concept including, for example, a ceiling, a wall, etc. of a building. In addition, a specific structure or type of the "building" is arbitrary. For example, the "building" is a concept including a detached house, a complex building such as a row house or an apartment, an office building, an event facility, a commercial facility, a public facility, etc. In addition, the "monitored area" is an area to be monitored and is a concept including, for example, an area inside a building, an area outside the building, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 3, a description will be given of a case in which the "fire detection apparatus" is the "optical fire detector", the "installation object" is the "ceiling of the office building", and the "monitored area" is the "area inside the office building".

Basic Concept of Embodiment 4

Next, the basic concept of Embodiment 4 will be described. Embodiment 4 (mode corresponding to the fourth problem) generally relates to a fire detection apparatus for detecting a fire in a monitored area.

Here, in Embodiment 4, the "fire detection apparatus" is an apparatus that detects and reports a fire in the monitored area on the basis of detection results of a plurality of detection targets, and is a concept including, for example, an optical fire detector, a fire alarm, etc. In addition, the "monitored area" is an area to be monitored and is a concept including, for example, an area inside a building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 4, a description will be given of a case in which the "fire detection apparatus" is the "optical fire detector", and the "monitored area" is the "area inside the office building".

Basic Concept of Embodiment 5

Next, the basic concept of Embodiment 5 will be described. Embodiment 5 (mode corresponding to the fifth problem) generally relates to a fire detection apparatus for detecting a fire in a monitored area.

Here, in Embodiment 5, the "fire detection apparatus" is an apparatus that detects and reports a fire in the monitored area on the basis of a detection result of a detection target, and is a concept including, for example, an optical, electrical, and terminal fire detector, a fire alarm, etc. In addition, the "monitored area" is an area to be monitored and is a concept including, for example, an area inside a building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 5, a description will be given of a case in which the "fire detection apparatus" is a "thermal and optical fire detector", and the "monitored area" is the "area inside the office building".

Basic Concept of Embodiment 6

Next, the basic concept of Embodiment 6 will be described. Embodiment 6 (mode corresponding to the sixth problem) generally corresponds to a fire detection apparatus attached to an installation surface of an installation object, and relates to a fire detection apparatus for detecting a fire in a monitored area.

Here, in Embodiment 6, the "fire detection apparatus" is an apparatus that detects and reports a fire in the monitored area on the basis of a detection result of a detection target, and is a concept including, for example, an optical, electrical, and terminal fire detector, a fire alarm, etc. In addition, the "monitored area" is an area to be monitored and is a concept including, for example, an area inside a building, an area outside the building, etc. In addition, a specific structure or type of the "building" is arbitrary. For example, the "building" is a concept including a detached house, a complex building such as a row house or an apartment, an office building, an event facility, a commercial facility, a public facility, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 6, a description will be given of a case in which the "fire detection apparatus" is a "thermal and optical fire detector", and the "monitored area" is the "area inside the office building".

[II] Specific Contents of Embodiments

Next, the specific contents of the embodiments will be described.

Embodiment 1

First, the fire detection apparatus according to Embodiment 1 will be described. Embodiment 1 is an embodiment in which an insect screen described below is provided in an inner accommodating unit described below or an incidence suppressing unit described below.

(Configuration)

First, a description will be given of a configuration of the fire detection apparatus according to Embodiment 1. FIG. 1 is a side view illustrating an attachment state of the fire detection apparatus according to Embodiment 1. FIG. 2 is a bottom view illustrating the fire detection apparatus in a state of removing an attachment base described below. FIG. 3 is a cross-sectional view taken along A-A line of FIG. 2. In the following description, an X direction of FIG. 1 is referred to as a left-right direction of the fire detection apparatus (a +X direction is a left direction of the fire detection apparatus and a −X direction is a right direction of the fire detection apparatus), a Y direction of FIG. 2 is referred to as a front-back direction of the fire detection apparatus (a +Y direction is a frontward direction of the fire detection apparatus and a −Y direction is a backward direction of the fire detection apparatus), and a Z direction of FIG. 1 is referred to as a vertical direction of the fire detection apparatus (a +Z direction is an upward direction of the fire detection apparatus and a −Z direction is a downward direction of the fire detection apparatus). In addition, with reference to a center position of the detection space of FIG. 3, a direction away from the detection space is referred to as an "outer side", and a direction approaching the detection space is referred to as an "inner side".

The fire detection apparatus 1A is an apparatus that detects and reports a detection target (for example, smoke, etc.) contained in gas. The fire detection apparatus 1A is installed on an installation surface 2A on a lower surface of a ceiling portion of a building in an interior of the building, and includes an attachment base 10A, an outer cover 20A, an inner cover 30A, an inflow space 40A, an insect screen 50A, a detection space 60A, a detector cover 70A, a detector body 80A, a terminal board 90A, and a substrate 100A as illustrated in FIG. 1 to FIG. 3.

(Configuration—Attachment Base)

Returning to FIG. 1, the attachment base 10A is an attaching unit that attaches the outer cover 20A to the installation surface 2A. The attachment base 10A is configured using, for example, a known attachment base for the fire detection apparatus (as an example, a substantially plate-shaped attachment base made of resin), etc., and is fixed to the installation surface 2A by a fixing tool, etc. as illustrated in FIG. 1.

(Configuration—Outer Cover)

The outer cover 20A is an outer accommodating unit that accommodates the inner cover 30A, the inflow space 40A, the insect screen 50A, the detection space 60A, the detector cover 70A, the detector body 80A, the terminal board 90A, and the substrate 100A, and is an outer accommodating unit capable of allowing gas containing a detection target to flow into and out of the outer cover 20A. The outer cover 20A is formed of, for example, a resin material having a light shielding property, and includes an outer cover body 21A, a top surface portion 22A, a first rib portion 23A, and a second rib portion 24A as illustrated in FIG. 1 to FIG. 3.

Among these portions, the outer cover body 21A is a basic structure of the outer cover 20A. The outer cover body 21A is formed of, for example, a substantially hollow cylindrical body whose upper surface and lower surface are open, is disposed so that an upper end portion of the outer cover body 21A comes into contact with a lower surface of the attachment base 10A as illustrated in FIG. 1, and is fixed to the attachment base 10A by a fitting structure (or a fixing tool), etc.

In addition, the top surface portion 22A is a partition unit that partitions the inflow space 40A. The top surface portion 22A is formed of, for example, a substantially circular plate-shaped body, and is provided substantially horizontally below the outer cover body 21A as illustrated in FIG. 1 to FIG. 3. In addition, as illustrated in FIG. 1 to FIG. 3, a display hole 22aA is provided in the top surface portion 22A. The display hole 22aA is a through-hole for guiding light irradiated from a display unit (described below) to the outside of the fire detection apparatus 1A through a light guide 104aA and the display hole 22aA of FIG. 2.

In addition, the first rib portion 23A is a partition unit that partitions the inflow space 40A. The first rib portion 23A is formed of a substantially plate-shaped body, and is provided vertically between the outer cover body 21A and the top surface portion 22A. Specifically, as illustrated in FIG. 1 and FIG. 3, a plurality of first rib portions 23A is provided radially from the vicinity of a center of the outer cover 20A, and is connected to the outer cover body 21A and the top surface portion 22A.

In addition, the second rib portion 24A is a partition unit that partitions the inflow space 40A. The second rib portion 24A is formed of a substantially plate-shaped body, and is provided vertically between the outer cover body 21A and the top surface portion 22A. Specifically, as illustrated in FIG. 1 and FIG. 3, the second rib portion 24A is provided between inner end portions of adjacent first rib portions 23A, and is connected to the outer cover body 21A and the top surface portion 22A.

(Configuration—Inflow Space)

Returning to FIG. 1, the inflow space 40A is a space for allowing gas outside the fire detection apparatus 1A to flow into the fire detection apparatus 1A. A plurality of inflow spaces 40A is formed inside the outer cover 20A. Specifically, as illustrated in FIG. 1 and FIG. 3, a space surrounded by the top surface portion 22A, the first rib portion 23A, the second rib portion 24A, and the inner cover 30A in an internal space of the outer cover 20A is formed as the inflow space 40A.

(Configuration—Inner Cover)

The inner cover 30A is an inner accommodating unit that accommodates the detection space 60A, the detector cover 70A, the detector body 80A, and the substrate 100A, and is a partition unit that partitions the inflow space 40A. The inner cover 30A is, for example, a substantially hollow cylindrical body whose upper surface is opened, is formed of a resin material having a light shielding property, and is provided so that a lower surface of the inner cover 30A faces the top surface portion 22A of the outer cover 20A through the inflow space 40A on the inside of the outer cover 20A as illustrated in FIG. 3. In addition, as illustrated in FIG. 3, a first opening 30aA is formed in the inner cover 30A. The first opening 30aA is an opening for allowing gas flowing into the inflow space 40A to flow into the inner cover 30A. The first opening 30aA is formed in a substantially circular shape, and is provided in a side portion on the opposite side from a side portion on the installation surface 2A side (a lower side portion of the inner cover 30A in FIG. 3) in side portions of the inner cover 30A as illustrated in FIG. 3.

(Configuration—Detection Space)

The detection space 60A is a space for detecting a detection target. As illustrated in FIG. 3, a space surrounded by the detector cover 70A and the detector body 80A in an internal space of the inner cover 30A is formed as the detection space 60A.

(Configuration—Detector Cover)

The detector cover 70A is a partition unit that partitions the detection space 60A, and is an incidence suppressing unit that suppresses incidence of ambient light into the detection space 60A. The detector cover 70A is a substantially hollow cylindrical body whose upper surface is open, and is formed of a resin material having a light shielding property. In addition, as illustrated in FIG. 3, the detector cover 70A is disposed so that a lower surface of the detector cover 70A faces the top surface portion 22A of the outer cover 20A through the first opening 30aA and the inflow space 40A on the inside of the inner cover 30A, and is fixed to the detector body 80A. In addition, as illustrated in FIG. 3, a second opening 70aA is formed in the detector cover 70A. The second opening 70aA is an opening for allowing gas flowing into the inner cover 30A to flow into the detection space 60A. The second opening 70aA is formed in a substantially circular shape, and is provided in a side portion on the opposite side from a side portion on the installation surface 2A side in side portions of the detector cover 70A (lower surface portion of the detector cover 70A in FIG. 3) as illustrated in FIG. 3.

(Configuration—Insect Screen)

The insect screen 50A is a net for preventing insects present outside the fire detection apparatus 1A from intruding into the detection space 60A. The insect screen 50A is configured using a flat plate-shaped net (for example, a circular net), and is attached to the detector cover 70A as illustrated in FIG. 3.

(Configuration—Detector Body)

The detector body 80A is an attaching unit that attaches the detector cover 70A. The detector body 80A is formed of, for example, a resin material having a light shielding property, is disposed to cover an upper surface of the detector cover 70A as illustrated in FIG. 3, and is fixed to the substrate 100A by a fixing tool, etc. In addition, each support (not illustrated) for supporting each of a first light emitting unit described below, a second light emitting unit described below, and a light receiving unit described below is provided on the detector body 80A. Furthermore, each optical path hole (not illustrated) for forming an optical path between the detection space 60A and each of the first light emitting unit described below, the second light emitting unit described below, and the light receiving unit described below is provided in the detector body 80A.

The terminal board 90A is an accommodating unit that accommodates the inner cover 30A, the detector cover 70A, the detector body 80A, and the substrate 100A. The terminal board 90A has a substantially hollow cylindrical shape whose lower surface is open, and is formed of, for example, a resin material having a light shielding property. In addition, as illustrated in FIG. 3, the terminal board 90A is provided to cover the inner cover 30A, the detector cover 70A, the detector body 80A, and the substrate 100A from above, is fixed to the outer cover 20A by a fitting structure, etc., and is fixed to the attachment base 10A by a fixing tool, etc. through a first attachment hole (not illustrated) formed in an attachment member 91A.

(Configuration—Substrate)

The substrate 100A is a mounting unit on which various electric circuits (not illustrated) are mounted. The substrate 100A is configured using, for example, a known flat plate-shaped circuit board, etc., is disposed substantially horizontally at intervals from an upper end portion and a lower end portion of the terminal board 90A in the terminal board 90A as illustrated in FIG. 3, and is fixed to the terminal board 90A by a fixing tool through an attachment hole (not illustrated) formed in the terminal board 90A and a second attachment hole (not illustrated) formed in the attachment member 91A.

Further, in addition to the fact that a known electronic component used for the conventional fire detection apparatus 1A is mounted on the substrate 100A, the first light emitting unit (not illustrated), the second light emitting unit (not illustrated), the light receiving unit (not illustrated), a display unit (not illustrated), a communication unit (not illustrated), a power supply unit (not illustrated), a control unit (not illustrated), and a storage unit (not illustrated) are mounted on the substrate 100A.

(Configuration—Substrate—First Light Emitting Unit, Second Light Emitting Unit, and Light Receiving Unit)

Among these units, the first light emitting unit is a first light emitting unit that irradiates the detection space 60A with detection light (hereinafter referred to as "first detection light"), and is configured using, for example, a known light emitting element (as an example, an infrared light emitting diode (LED), etc.). In addition, the second light emitting unit is a second light emitting unit that irradiates the detection space 60A with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit 102 with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 1, installation is performed to be able to avoid direct reception of the first detection light or the second detection light irradiated from the first light emitting unit or the second light emitting unit through various optical path holes of the detector body 80A. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°.

(Configuration—Substrate—Display Unit, Communication Unit, and Power Supply Unit)

In addition, the display unit is a display unit that displays various types of information (for example, information indicating the presence or absence of detection of a fire), and is configured using, for example, a known display unit (an LED, etc.). A light projection method of the display unit is arbitrary. Examples thereof include light projection by guiding light from the display unit toward the outside of the fire detection apparatus 1A through the light guide 104aA inserted into insertion holes (not illustrated) provided in each of the inner cover 30A, the detector cover 70A, and the detector body 80A and the display hole 22aA of the outer cover 20A. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1A.

(Configuration—Substrate—Control Unit and Storage Unit)

In addition, the control unit is a control unit that controls the fire detection apparatus 1A. Specifically, the control unit is a computer including a central processing unit (CPU) and an internal memory such as a random access memory (RAM) for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1A. The storage unit is configured using a rewritable recording medium. For example, it is possible to use a non-volatile recording medium such as a flash memory.

According to the fire detection apparatus 1A described above, it is sufficient to attach the flat plate-shaped insect screen 50A to the detector cover 70A to substantially cover the entire second opening 70aA as an installation operation of the insect screen 50A. Thus, when compared to a conventional technology (a technology of providing a cylindrical insect screen to cover an outer periphery of a detection unit on the inside of an inner cover), it is possible to easily attach the insect screen 50A, and to improve efficiency of the attachment operation. In addition, since the insect screen 50A has a flat plate shape, when compared to a case in which the insect screen 50A is formed in a cylindrical shape, it is possible to easily manufacture the insect screen 50A, make the insect screen 50A compact, reduce the manufacturing cost of the fire detection apparatus 1A, and reduce an environmental load at the time of manufacture. In addition, since the insect screen 50A and the second opening 70aA are formed in circular shapes, it becomes easy to ensure processing accuracy of the insect screen 50A and the second opening 70aA when compared to another shape, and thus it is possible to enhance manufacturability of the insect screen 50A and the detector cover 70A. In addition, dependency of a flow direction of the detection target can be relatively reduced. In particular, it becomes easy to allow the detection target to flow into the detection space in almost the same manner and at almost the same timing from any direction in a circumferential direction.

(Configuration—Attachment Structure of Insect Screen)

Next, a description will be given of an attachment structure of the insect screen 50A. FIG. 4 is an enlarged view of an area of the insect screen 50A of FIG. 3 (partially not illustrated). In Embodiment 1, a feature of the attachment structure allowing efficient performance of maintenance operation (for example, a cleaning operation, a washing operation, a replacement operation, etc.) for the insect screen 50A is described below.

(Configuration—Attachment Structure of Insect Screen—First Feature)

First, with regard to a first feature of the attachment structure, the insect screen 50A is configured to substantially cover the entire second opening 70aA. Specifically, a diameter of the insect screen 50A is set to be larger than a diameter of the second opening 70aA. Further, as for an installation method of the insect screen 50A, as illustrated in FIG. 4, the insect screen 50A is installed such that the entire second opening 70aA is covered from an outside of the detector cover 70A in a lower end portion of the detector cover 70A.

In addition, the first opening 30aA is configured such that substantially the entire insect screen 50A is exposed to the outside of the inner cover 30A through the first opening 30aA. Specifically, a diameter of the first opening 30aA is set to be larger than the diameter of the insect screen 50A. Moreover, with regard to a method of forming the first opening 30aA, as illustrated in FIG. 4, the first opening 30aA is formed in a portion corresponding to the insect screen 50A in the lower side portion of the inner cover 30A.

According to such a first feature, when the outer cover 20A and the inner cover 30A are provided, the maintenance operation of the insect screen 50A can be performed without removing the inner cover 30A, and the maintenance operation can be made more efficient.

(Configuration—Attachment Structure of Insect Screen—Second Feature)

Next, with regard to a second feature of the attachment structure, the insect screen 50A, the first opening 30aA, and the detector cover 70A are configured such that the insect screen 50A can be detachably attached to the detector cover 70A through the first opening 30aA.

Specifically, with regard to the insect screen 50A and the detector cover 70A, as illustrated in FIG. 4, the insect screen 50A is accommodated in a circular recess 110A formed in a lower side portion of the detector cover 70A (specifically, the recess 110A formed adjacent to the second opening 70aA), and an entire edge end portion of the insect screen 50A is detachably fit (or may be simply accommodated) by the recess 110A. In addition, with regard to the first opening 30aA, the diameter of the first opening 30aA may be set to be larger than a diameter of the recess 110A. In addition, with regard to a method of forming the first opening 30aA, as illustrated in FIG. 4, the first opening 30aA is formed in a portion which corresponds to the recess 110A and in which the entire recess 110A can be exposed to the outside of the inner cover 30A in the lower side portion of the detector cover 70A.

According to such a second feature, the insect screen 50A can be attached to and detached from the detector cover 70A without removing the inner cover 30A. Therefore, it is possible to easily perform the maintenance operation of the insect screen 50A, and to further improve efficiency of the maintenance operation of the insect screen 50A.

(Configuration—Attachment Structure of Insect Screen—Third Feature) Returning to FIG. 3, next, with regard to a third feature of the attachment structure, as illustrated in FIG. 3 and FIG. 4, the fire detection apparatus 1A further includes a fall prevention portion 120A.

The fall prevention portion 120A is a fall prevention unit that prevents the insect screen 50A from falling off the detector cover 70A. The fall prevention portion 120A is formed from a part of the outer cover 20A, and specifically is formed from at least one or more second rib portions 24A (formed from a plurality of second rib portions 24A in FIG. 4) as illustrated in FIG. 3 and FIG. 4.

Here, a specific size of the fall prevention portion 120A is arbitrary. In Embodiment 1, as illustrated in FIG. 4, a length of the fall prevention portion 120A in the vertical direction is set to a length in which an upper end portion of the fall prevention portion 120A can come into contact with the insect screen 50A. More specifically, the length may be set to a length in which the upper end portion of the fall prevention portion 120A comes into contact with the insect screen 50A at all times, or set to a length in which the upper end portion of the fall prevention portion 120A comes into contact with the insect screen 50A when the insect screen 50A moves downward by a predetermined distance in the recess 110A. In addition, as illustrated in FIG. 4, each of a length of the fall prevention portion 120A in the left-right direction and a length thereof in the front-back direction is set to a length in which the upper end portion of the fall prevention portion 120A can be accommodated in the recess 110A, and more specifically set to be smaller than the diameter of the recess 110A.

According to such a third feature, it is possible to prevent the insect screen 50A from falling off the detector cover 70A, and it is possible to improve an attaching property of the insect screen 50A. Moreover, since it is unnecessary to separately provide a member for the fall prevention portion, an installation property of fall prevention portion 120A can be improved.

(With Regard to Maintenance Method of Insect Screen)

Next, a description will be given of a maintenance method of the insect screen 50A according to Embodiment 1 (here, a method related to the cleaning operation).

That is, for example, in a state in which the fire detection apparatus 1A is attached to the installation surface 2A, first, the outer cover 20A is removed from the attachment base 10A. Subsequently (or at a timing when the attachment base 10A is removed), after the insect screen 50A accommodated in the recess 110A of the detector cover 70A is taken out from the detector cover 70A through the first opening 30aA, a foreign material adhering to the insect screen 50A which has been taken out is removed. Then, the insect screen 50A which has been taken out is fit in the recess 110A through the first opening 30aA, and then the outer cover 20A is attached to the attachment base 10A. Thus, the maintenance of the insect screen 50A is completed.

However, the maintenance method of the insect screen 50A is not limited to the method described above. For example, in a case in which the insect screen 50A is fit to the recess 110A so as not to fall off, after the outer cover 20A is removed from the attachment base 10A, the foreign material of the insect screen 50A accommodated in the recess 110A may be suctioned through the first opening 30aA by a known suction apparatus, and then the outer cover 20A may be attached to the attachment base 10A. In this way, the maintenance operation of the insect screen 50A can be performed without removing the insect screen 50A.

Effect of Embodiment 1

As described above, according to Embodiment 1, since the inner cover 30A that accommodates the detection space 60A and the detector cover 70A, the outer cover 20A that accommodates the inner cover 30A, the first opening 30aA provided in the side portion on the opposite side from the side portion on the installation surface 2A side in the side portions of the inner cover 30A, the second opening 70aA provided in the side portion on the opposite side from the side portion on the installation surface 2A side in the side portions of the detector cover 70A, and the flat plate-shaped insect screen 50A provided on the detector cover 70A and configured to substantially cover the entire second opening 70aA are included, it is sufficient to attach the flat plate-shaped insect screen 50A to the detector cover 70A to substantially cover the entire second opening 70aA as the installation operation of the insect screen 50A. Thus, when compared to the conventional technology (the technology of providing the cylindrical insect screen to cover the outer periphery of the detection unit on the inside of the inner cover), it is possible to easily attach the insect screen 50A, and to improve efficiency of the attachment operation. In addition, since the insect screen 50A has the flat plate shape, when compared to a case in which the insect screen 50A is formed in the cylindrical shape, it is possible to easily manufacture the insect screen 50A, make the insect screen 50A compact, reduce the manufacturing cost of the fire detection apparatus 1A, and reduce an environmental load at the time of manufacture.

In addition, since the first opening 30aA is configured such that substantially the entire insect screen 50A is exposed to the outside of the inner cover 30A through the first opening 30aA, when the inner cover 30A and the outer cover 20A are provided, it is possible to perform the maintenance operation of the insect screen 50A without removing the inner cover 30A, and to improve the efficiency of the maintenance operation.

In addition, since the insect screen 50A, the first opening 30aA, and the detector cover 70A are configured such that the insect screen 50A can be detachably attached to the detector cover 70A through the first opening 30aA, it is possible to attach and detach the insect screen 50A to and from the detector cover 70A without removing the inner cover 30A. Therefore, it is possible to easily perform the maintenance operation of the insect screen 50A, and to further improve the efficiency of the maintenance operation of the insect screen 50A.

In addition, since a part of the outer cover 20A is formed as the fall prevention portion 120A for preventing the insect screen 50A from falling off the detector cover 70A, it is possible to prevent the insect screen 50A from falling off the detector cover 70A, and it is possible to improve the attaching property of the insect screen 50A. Moreover, since it is unnecessary to separately provide the member for the fall prevention portion, the installation property of fall prevention portion 120A can be improved.

In addition, since the insect screen 50A and the second opening 70aA are formed in circular shapes, it becomes easy to ensure processing accuracy of the insect screen 50A and the second opening 70aA when compared to another shape, and thus it is possible to enhance manufacturability of the insect screen 50A and the detector cover 70A. In addition, dependency of the flow direction of the detection target can be relatively reduced. In particular, it becomes easy to allow the detection target to flow into the detection space in almost the same manner and at almost the same timing from any direction in the circumferential direction.

Embodiment 2

Next, a description will be given of a fire detection apparatus according to Embodiment 2. Embodiment 2 is a mode in which a plurality of ribs is provided between an inner accommodating unit described below and an outer accommodating unit described below.

(Configuration)

First, a description will be given of a configuration of the fire detection apparatus according to Embodiment 2. FIG. 7 is a side view illustrating an attachment state of the fire detection apparatus according to Embodiment 2. FIG. 8 is a bottom view illustrating the fire detection apparatus in a state of removing an attachment base described below. FIG. 9 is a cross-sectional view taken along A-A line of FIG. 8. In the following description, an X direction of FIG. 7 is referred to as a left-right direction of the fire detection apparatus (a +X direction is a left direction of the fire detection apparatus and a −X direction is a right direction of the fire detection apparatus), a Y direction of FIG. 8 is referred to as a front-back direction of the fire detection apparatus (a +Y direction is a frontward direction of the fire detection apparatus and a −Y direction is a backward direction of the fire detection apparatus), and a Z direction of FIG. 7 is referred to as a vertical direction of the fire detection apparatus (a +Z direction is an upward direction of the fire detection apparatus and a −Z direction is a downward direction of the fire detection apparatus). In addition, with reference to a detection space of FIG. 9 described below, a direction away from the detection space described below is referred to as an "outer side", and a direction approaching the detection space described below is referred to as an "inner side".

The fire detection apparatus 1B is an apparatus that detects and reports a detection target (for example, smoke, etc.) contained in gas. The fire detection apparatus 1B is installed on an installation surface 2B on a lower surface of a ceiling portion of a building in an interior of the building, and includes an attachment base 10B, an outer cover 20B, an inner cover 30B, an inflow space 40B, an insect screen 50B, a detection space 60B, a detector cover 70B, a detector body 80B, a terminal board 90B, and a substrate 100B as illustrated in FIG. 7 to FIG. 9.

(Configuration—Attachment Base)

Returning to FIG. 7, the attachment base 10B is an attaching unit that attaches the outer cover 20B to the installation surface 2B. The attachment base 10B is configured using, for example, a known attachment base for the fire detection apparatus (as an example, a substantially plate-shaped attachment base made of resin), etc., and is fixed to the installation surface 2B by a fixing tool, etc. as illustrated in FIG. 7.

(Configuration—Outer Cover)

The outer cover 20B is an outer accommodating unit that accommodates the inner cover 30B, the inflow space 40B, the insect screen 50B, the detection space 60B, the detector cover 70B, the detector body 80B, the terminal board 90B, and the substrate 100B. The outer cover 20B is formed of, for example, a resin material having a light shielding property, and includes an outer cover body 21B and a top surface portion 22B as illustrated in FIG. 7 to FIG. 9.

Among these portions, the outer cover body 21B is a basic structure of the outer cover 20B. The outer cover body 21B is formed of, for example, a substantially hollow cylindrical body whose upper surface and lower surface are open, is disposed so that an upper end portion of the outer cover body 21B comes into contact with a lower surface of the attachment base 10B as illustrated in FIG. 7, and is fixed to the attachment base 10B by a fitting structure (or a fixing tool), etc.

In addition, the top surface portion 22B is a partition unit that partitions the inflow space 40B. The top surface portion 22B is formed of, for example, a substantially circular plate-shaped body, and is provided substantially horizontally below the outer cover body 21B as illustrated in FIG. 7 to FIG. 9. In addition, as illustrated in FIG. 8, a display hole 22aB is provided in the top surface portion 22B. The display hole 22aB is a through-hole for guiding light irradiated from a display unit described below to the outside of the fire detection apparatus 1B through a light guide 104aB and the display hole 22aB of FIG. 8.

(Configuration—Inflow Space)

Returning to FIG. 7, the inflow space 40B is a space for guiding gas flowing into the outer cover 20B to an inflow portion of gas in the inner cover 30B (a first opening 30aB described below). As illustrated in FIG. 9, a gap between the top surface portion 22B and the inner cover 30B in an internal space of the outer cover 20B is formed as the inflow space 40B.

(Configuration—Inner Cover)

The inner cover 30B is an inner accommodating unit that accommodates the detection space 60B, the detector cover 70B, the detector body 80B, and the substrate 100B, and is a partition unit that partitions the inflow space 40B. The inner cover 30B is, for example, a substantially hollow cylindrical body whose upper surface is opened, is formed of a resin material having a light shielding property, and is provided so that a lower side portion of the inner cover 30B faces the top surface portion 22B of the outer cover 20B through the inflow space 40B on the inside of the outer cover 20B as illustrated in FIG. 9. In addition, as illustrated in FIG. 9, the first opening 30aB is formed in the lower side portion of the inner cover 30B. The first opening 30aB is an opening for sending gas flowing into the inflow space 40B to the detection space 60B and is provided in a substantially central portion and a vicinity thereof in a lower side portion of the inner cover 30B as illustrated in FIG. 9.

(Configuration—Detection Space)

The detection space 60B is a space for detecting a detection target. As illustrated in FIG. 9, a space surrounded by the detector cover 70B and the detector body 80B in an internal space of the inner cover 30B is formed as the detection space 60B.

(Configuration—Detector Cover)

The detector cover 70B is a partition unit that partitions the detection space 60B, and is an incidence suppressing unit that suppresses incidence of ambient light into the detection space 60B. The detector cover 70B is a substantially hollow cylindrical body whose upper surface is open, and is formed of a resin material having a light shielding property. In addition, as illustrated in FIG. 9, the detector cover 70B is disposed so that a lower side portion of the detector cover 70B faces the top surface portion 22B of the outer cover 20B through the first opening 30aB and the inflow space 40B on the inside of the inner cover 30B, and is fixed to the detector body 80B. In addition, as illustrated in FIG. 9, a second opening 70aB is formed in the detector cover 70B. The second opening 70aB is an opening for allowing gas sent from the first opening 30aB to flow into the detection space 60B, and is provided in a portion corresponding to the first opening 30aB in the lower side portion of the detector cover 70B as illustrated in FIG. 9.

(Configuration—Insect Screen)

The insect screen 50B is a net for preventing insects present outside the fire detection apparatus 1B from intruding into the detection space 60B. The insect screen 50B is configured using a mesh-like and circular net, and is attached to the detector cover 70B as illustrated in FIG. 9.

(Configuration—Detector Body)

The detector body 80B is an attaching unit that attaches the detector cover 70B, and is an incidence suppressing unit that suppresses incidence of ambient light into the detection space 60B. The detector body 80B is, for example, a thick plate-shaped body (as an example, a substantially circular plate-shaped body) formed of a resin material having a light shielding property, is provided on the substrate 100B side of the detector cover 70B (upper side in FIG. 9), specifically is disposed to cover an upper surface of the detector cover 70B as illustrated in FIG. 9, and is fixed to the substrate 100B by a fixing tool, etc.

(Configuration—Terminal Board)

The terminal board 90B is an accommodating unit that accommodates the inner cover 30B, the detector cover 70B, the detector body 80B, and the substrate 100B. The terminal board 90B has a substantially hollow cylindrical shape whose lower surface is open, and is formed of, for example, a resin material having a light shielding property. In addition, as illustrated in FIG. 9, the terminal board 90B is provided to cover the inner cover 30B, the detector cover 70B, the detector body 80B, and the substrate 100B from above, is fixed to the outer cover 20B by a fitting structure, etc., and is fixed to the attachment base 10B by a fixing tool, etc. through a first attachment hole (not illustrated) formed in an attachment member 91B.

(Configuration—Substrate)

The substrate 100B is a mounting unit on which various electric circuits (not illustrated) are mounted. The substrate 100B is configured using, for example, a known flat plate-shaped circuit board, etc., is disposed substantially horizontally at intervals from an upper end portion and a lower end portion of the terminal board 90B in the terminal board 90B as illustrated in FIG. 9, and is fixed to the terminal board 90B by a fixing tool through an attachment hole (not illustrated) formed in the terminal board 90B and a second attachment hole (not illustrated) formed in the attachment member 91B.

Further, in addition to the fact that a known component (electric component) used for the conventional fire detection apparatus 1B is mounted on the substrate 100B, the first light emitting unit, the second light emitting unit, the light receiving unit, the display unit, a communication unit, a power supply unit, a control unit, and a storage unit are mounted on the substrate 100B (each of the units is not illustrated).

(Configuration—Substrate—First Light Emitting Unit, Second Light Emitting Unit, and Light Receiving Unit)

Among these units, the first light emitting unit is a first light emitting unit that irradiates the detection space 60B with detection light (hereinafter referred to as "first detection light"), and is configured using, for example, a known light emitting element (as an example, an infrared LED, etc.). In addition, the second light emitting unit is a second light emitting unit that irradiates the detection space 60B with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 2, installation is performed to be able to avoid direct reception of the first detection light or the second detection light irradiated from the first light emitting unit or the second light emitting unit through various optical path holes of the detector body 80B. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°.

(Configuration—Substrate—Display Unit, Communication Unit, and Power Supply Unit)

In addition, the display unit is a display unit that displays various types of information (for example, information indicating the presence or absence of detection of a fire), and is configured using, for example, a known display unit (an LED, etc.). A light projection method of the display unit is arbitrary. Examples thereof include light projection by guiding light from the display unit toward the outside of the fire detection apparatus 1B through the light guide 104aB inserted into insertion holes (not illustrated) provided in each of the inner cover 30B, the detector cover 70B, and the detector body 80B and the display hole 22aB of the outer cover 20B. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1B.

(Configuration—Substrate—Control Unit and Storage Unit)

In addition, the control unit is a control unit that controls the fire detection apparatus 1B. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1B. The storage unit is configured using a rewritable recording medium. For example, it is possible to use a non-volatile recording medium such as a flash memory.

(Configuration—Inflow Structure of Gas)

Next, an inflow structure of gas will be described. FIG. 10 is a plan view illustrating the outer cover 20B (partially not illustrated). In Embodiment 2, a feature of an inflow structure for enhancing an inflow property of gas into the inner cover 30B is described below.

(Configuration—Inflow Structure of Gas—First Feature)

First, with regard to a first feature of the inflow structure, as illustrated in FIG. 9 and FIG. 10, a first rib 111B to an eighth rib 118B are provided in a gap between the inner cover 30B and the outer cover 20B. In the following, when it is unnecessary to distinguish the first rib 111B to the eighth rib 118B, the ribs will be simply collectively referred to as "ribs 110B".

The first rib 111B to the eighth rib 118B are ribs for partitioning the inflow space 40B. Each of the first rib 111B to the eighth rib 118B is formed of a substantially plate-shaped body, provided substantially vertically between the top surface portion 22B of the outer cover 20B and the lower side portion of the inner cover 30B as illustrated in FIG. 10, and connected to the outer cover body 21B or the top surface portion 22B.

In addition, with regard to a specific configuration of the first rib 111B to the eighth rib 118B, in Embodiment 2, the first rib 111B to the eighth rib 118B are configured such that a first inflow space 41B to an eighth inflow space 48B are formed by partitioning the gap between the top surface portion 22B and the inner cover 30B using the first rib 111B to the eighth rib 118B.

Specifically, first, shapes and sizes of the first rib 111B to the eighth rib 118B are set as follows. That is, as illustrated in FIG. 10, the shapes of the first rib 111B to the eighth rib 118B are set to be rectangular. Further, widths (horizontal lengths) of the first rib 111B to the eighth rib 118B are set to a length substantially the same as or slightly shorter than a radius of the top surface portion 22B. Further, heights (vertical lengths) of the first rib 111B to the eighth rib 118B are set to be substantially the same as or shorter than a vertical length of the inflow space 40B.

Further, with regard to a method of installing the first rib 111B to the eighth rib 118B, the first rib 111B to the eighth rib 118B are installed (disposed) radially outward from a center side of the inner cover 30B. More specifically, as illustrated in FIG. 10, the first rib 111B to the fourth rib 114B are disposed in a cross shape. More specifically, the first rib 111B and the third rib 113B are arranged in parallel along the front-back direction and disposed to come into contact with each other, and the second rib 112B and the fourth rib 114B are arranged in parallel along the front-back direction and disposed to come into contact with a boundary between the first rib 111B and the third rib 113B. Further, the fifth rib 115B to the eighth rib 118B are disposed between the first rib 111B to the fourth rib 114B, respectively. More specifically, the fifth rib 115B is disposed between the first rib 111B and the second rib 112B, the sixth rib 116B is disposed between the second rib 112B and the third rib 113B, the seventh rib 117B is disposed between the third rib 113B and the fourth rib 114B, and the eighth rib 118B is disposed between the first rib 111B and the fourth rib 114B. According to such an installation method, it is possible to partition the inflow space 40B into eight parts (that is, the first inflow space 41B to the eighth inflow space 48B illustrated in FIG. 10), and it is possible to radially form the first inflow space 41B to the eighth inflow space 48B. Thus, it is possible to reduce direction dependency of gas flowing into the outer cover 20B.

According to such a first feature, gas flowing into the outer cover 20B can be reliably guided to the gas inflow portion (that is, the first opening 30aB) in the inner cover 30B by the first inflow space 41B to the eighth inflow space 48B, and gas flowing into the outer cover 20B can be inhibited from flowing out to the outside without flowing into the inner cover 30B. Therefore, when compared to a conventional technology (a technology of covering a detection space with a labyrinth on the inside of a cover member), it is possible to enhance the inflow property of gas into the inner cover 30B, and it is possible to improve detection accuracy of the fire detection apparatus 1B.

(Configuration—Inflow Structure of Gas—Second Feature)

Next, with regard to a second feature of the inflow structure, the first rib 111B to the eighth rib 118B are disposed such that some ribs 110B among the first rib 111B to the eighth rib 118B do not come into contact with another rib 110B.

Specifically, as illustrated in FIG. 10, the fifth rib 115B to the eighth rib 118B are disposed so as not to come into contact with another rib 110B between the first rib 111B and the fourth rib 114B disposed in a cross shape. More specifically, the fifth rib 115B is disposed at distances from the adjacent first rib 111B and second rib 112B, the sixth rib 116B is disposed at distances from the adjacent second rib 112B and third rib 113B, the seventh rib 117B is disposed at distances from the adjacent third rib 113B and fourth rib 114B, and the eighth rib 118B is disposed at distances from the adjacent first rib 111B and fourth rib 114B. In this case, for example, as illustrated in FIG. 10, a width of each of the fifth rib 115B to the eighth rib 118B is set to be shorter than a width of each of the first rib 111B to the eighth rib 118B.

According to such a second feature, when compared to a case in which each of the first rib 111B to the eighth rib 118B is disposed to come into contact with another rib 110B, it is possible to suppress an excessive increase in pressure of gas in the inflow portion in the inner cover 30B, and it becomes easy to ensure the inflow property of gas into the inner cover 30B.

(Configuration—Inflow Structure of Gas—Third Feature)

Returning to FIG. 9, next, with regard to a third feature of the inflow structure, as illustrated in FIG. 9 and FIG. 10, the first rib 111B to the eighth rib 118B are configured such that gas flowing into an inflow space partitioned by the first rib 111B to the fourth rib 114B disposed in the cross shape (for example, the first inflow space 41B, the second inflow space 42B, etc. partitioned by the first rib 111B and the second rib 112B as illustrated in FIG. 10) among the first inflow space 41B to the eighth inflow space 48B does not directly flow out to another inflow space.

Specifically, first, heights of the first rib 111B to the fourth rib 114B are set to be substantially the same as the vertical length of the inflow space 40B. In addition, the first rib 111B to the fourth rib 114B are disposed such that an upper end portion of each of the first rib 111B to the fourth rib 114B comes into contact with the lower side portion of the inner cover 30B, and a lower end portion of each of the first rib 111B to the fourth rib 114B comes into contact with the top surface portion 22B of the outer cover 20B.

According to such a third feature, it is possible to prevent gas flowing into the inflow space partitioned by the first rib 111B to the fourth rib 114B from flowing into another inflow space (for example, it is possible to prevent gas flowing into the first inflow space 41B or the second inflow space 42B from flowing into the eighth inflow space 48B), and it is possible to further inhibit gas flowing into the outer cover 20B flowing out to the outside without flowing into the inner cover 30B.

In this case, specific configurations of the fifth rib 115B to the eighth rib 118B are arbitrary. In Embodiment 2, the fifth rib 115B to the eighth rib 118B are configured similarly to the first rib 111B to the fourth rib 114B described above. That is, heights of the fifth rib 115B to the eighth rib 118B are set to be substantially the same as the vertical length of the inflow space 40B. In addition, the fifth rib 115B to the eighth rib 118B are disposed such that an upper end portion of each of the fifth rib 115B to the eighth rib 118B comes into contact with the lower side portion of the inner cover 30B, and a lower end portion of each of the fifth rib 115B to the eighth rib 118B comes into contact with the top surface portion 22B of the outer cover 20B. However, the invention is not limited thereto, and the heights of the fifth rib 115B to the eighth rib 118B may be set to be shorter than the vertical length of the inflow space 40B. Alternatively, the fifth rib 115B to the eighth rib 118B may be disposed such that the upper end portion or the lower end portion of each of the fifth rib 115B to the eighth rib 118B does not come into contact with the lower side portion of the inner cover 30B or the top surface portion 22B of the outer cover 20B.

(Configuration—Inflow Structure of Gas—Fourth Feature)

Next, with regard to a fourth feature of the inflow structure, the first rib 111B to the eighth rib 118B are integrally formed with the inner cover 30B or the outer cover 20B. Specifically, as illustrated in FIG. 10, the first rib 111B to the eighth rib 118B are integrally formed with the outer cover 20B. Here, a method of integrally forming the first rib 111B to the eighth rib 118B with the outer cover 20B is arbitrary. For example, the ribs may be formed by injection-molding a resin material having a light shielding property.

According to such a fourth feature, the first rib 111B to the eighth rib 118B can be easily formed, and manufacturability of the fire detection apparatus 1B can be improved.

(With Regard to Action of Fire Detection Apparatus)

Next, a description will be given of an action of the fire detection apparatus 1B configured as described above.

That is, for example, when gas containing smoke generated by a fire attempts to flow into the outer cover 20B, gas flowing into at least one of the first inflow space 41B to the eighth inflow space 48B is guided to the first opening 30aB of the inner cover 30B by any of the first inflow space 41B to the eighth inflow space 48B. Thus, it is possible to inhibit gas flowing into the outer cover 20B from flowing out to the outside without flowing into the inner cover 30B, and it is possible to enhance the inflow property of gas into the inner cover 30B. In particular, since the first inflow space 41B to the eighth inflow space 48B are radially formed by the first rib 111B to the eighth rib 118B, it is possible to reduce the direction dependency of gas flowing into the outer cover 20B. In addition, since the first rib 111B to the eighth rib 118B are configured such that gas flowing into the inflow space partitioned by the first rib 111B to the fourth rib 114B disposed in the cross shape (for example, the first inflow space 41B, the second inflow space 42B, etc. partitioned by the first rib 111B and the second rib 112B) does not directly flow out to another inflow space, it is possible to inhibit gas flowing into the outer cover 20B from flowing out to the outside without flowing into the inner cover 30B. Furthermore, even when gas is simultaneously guided by at least two or more inflow spaces among the first inflow space 41B to the eighth inflow space 48B, since the fifth rib 115B to the eighth rib 118B are disposed not to come into contact with another rib 110B, it is possible to suppress an excessive increase in pressure of gas in the first opening 30aB in the inner cover 30B, and it is possible to ensure the inflow property of gas into the inner cover 30B.

Effect of Embodiment 2

According to such Embodiment 2, since a plurality of ribs 110B is configured such that the first inflow space 41B to the eighth inflow space 48B for guiding gas flowing into the outer cover 20B to the inflow portion of gas in the inner cover 30B are formed when the gap is partitioned by the plurality of ribs 110B, it is possible to reliably guide gas flowing into the outer cover 20B to the inflow portion of gas in the inner cover 30B by the first inflow space 41B to the eighth inflow space 48B, and it is possible to inhibit gas flowing into the outer cover 20B from flowing out to the outside without flowing into the inner cover 30B. Therefore, when compared to the conventional technology (the technology of covering the detection space with the labyrinth on the inside of the cover member), it is possible to enhance the inflow property of gas into the inner cover 30B, and it is possible to improve detection accuracy of the fire detection apparatus 1B.

In addition, since the plurality of ribs 110B is disposed radially outward from the center side of the inner cover 30B, it is possible to radially form the first inflow space 41B to the eighth inflow space 48B, and it is possible to reduce the direction dependency of gas flowing into the outer cover 20B.

In addition, since some other ribs of the plurality of ribs 110B are disposed not to come into contact with the other ribs 110B between the ribs 110B disposed in the cross shape, when compared to a case in which each of the plurality of ribs 110B is disposed to come into contact with another rib 110B, it is possible to suppress an excessive increase in pressure of gas in the inflow portion in the inner cover 30B, and it is possible to ensure the inflow property of gas into the inner cover 30B.

In addition, since the plurality of ribs 110B is configured such that gas flowing into the inflow space partitioned by the ribs 110B disposed in the cross shape does not directly flow out to another inflow space, it is possible to prevent gas flowing into the inflow space partitioned by the ribs 110B disposed in the cross shape from flowing into another inflow space, and it is possible to further inhibit gas flowing into the outer cover 20B from flowing out to the outside without flowing into the inner cover 30B.

In addition, since the plurality of ribs 110B is disposed such that some ribs 110B among the plurality of ribs 110B do not come into contact with another rib 110B, when compared to a case in which each of the plurality of ribs 110B is disposed to come into contact with another rib 110B, it is possible to suppress an excessive increase in pressure of gas in the inflow portion in the inner cover 30B, and it becomes easy to ensure the inflow property of gas into the inner cover 30B.

In addition, since the plurality of ribs 110B is formed integrally with the outer cover 20B, it is possible to easily form the plurality of ribs 110B, and it is possible to improve manufacturability of the fire detection apparatus 1B.

Embodiment 3

Next, a description will be given of a fire detection apparatus according to Embodiment 3. Embodiment 3 is a mode in which a part of a side portion of a casing described below is formed in a non-horizontal shape.

(Configuration)

First, a description will be given of a configuration of the fire detection apparatus according to Embodiment 3. FIG. 14 is a side view illustrating an attachment state of the fire detection apparatus according to Embodiment 3. FIGS. 15A and 15B are diagrams illustrating the fire detection apparatus in a state of removing an attachment base described below, in which FIG. 15A is a plan view and FIG. 15B is a bottom view. FIG. 16 is a cross-sectional view taken along A-A line of FIG. 15B. In the following description, an X direction of FIG. 14 is referred to as a left-right direction of the fire detection apparatus (a +X direction is a left direction of the fire detection apparatus and a −X direction is a right direction of the fire detection apparatus), a Y direction of FIGS. 15A and 15B is referred to as a front-back direction of the fire detection apparatus (a +Y direction is a frontward direction of the fire detection apparatus and a −Y direction is a backward direction of the fire detection apparatus), and a Z direction of FIG. 14 is referred to as a vertical direction of the fire detection apparatus (a +Z direction is an upward direction of the fire detection apparatus and a −Z direction is a downward direction of the fire detection apparatus). In FIG. 15A, a substrate described below is indicated by a dotted line.

The fire detection apparatus 1C is an apparatus that detects and reports a substance to be detected (for example, smoke, etc.) contained in gas. The fire detection apparatus 1C is installed on an installation surface 2C on a lower surface of a ceiling portion of a building in an interior of the building as illustrated in FIG. 14, and includes an attachment base 10C, an outer cover 20C, an inner cover 30C, an inflow space 40C, an insect screen 50C, a detection space 60C, a detector cover 70C, a detector body 80C, a terminal board 90C, and a substrate 100C as illustrated in FIG. 14 to FIG. 16.

(Configuration—Attachment Base)

Returning to FIG. 14, the attachment base 10C is an attaching unit that attaches the outer cover 20C to the installation surface 2C. The attachment base 10C is configured using, for example, a known attachment base for the fire detection apparatus (as an example, a substantially plate-shaped attachment base made of resin), etc., and is fixed to the installation surface 2C by a fixing tool, etc. as illustrated in FIG. 14.

(Configuration—Outer Cover)

The outer cover 20C is a cover that covers the inner cover 30C, the inflow space 40C, the insect screen 50C, the detection space 60C, the detector cover 70C, the detector body 80C, the terminal board 90C, and the substrate 100C. The outer cover 20C is formed of, for example, a resin material having a light shielding property, and includes an outer cover body 21C, a top surface portion 22C, a first rib portion 23C, and a second rib portion 24C as illustrated in FIG. 14 to FIG. 16.

Among these portions, the outer cover body 21C is a basic structure of the outer cover 20C. The outer cover body 21C is formed of, for example, a substantially hollow cylindrical body whose upper surface and lower surface are open, is disposed so that an upper end portion of the outer cover body 21C comes into contact with a lower surface of the attachment base 10C as illustrated in FIG. 14, and is fixed to the attachment base 10C by a fitting structure (or a fixing tool), etc.

In addition, the top surface portion 22C is a partition unit that partitions the inflow space 40C. The top surface portion 22C is formed of, for example, a substantially circular plate-shaped body, and is provided substantially horizontally below the outer cover body 21C as illustrated in FIG. 14 to FIG. 16. In addition, as illustrated in FIG. 15B, a display hole 22aC is provided in the top surface portion 22C. The display hole 22aC is a through-hole for guiding light irradiated from a display unit described below to the outside of the fire detection apparatus 1C through a light guide 104aC and the display hole 22aC of FIG. 15A.

In addition, the first rib portion 23C is a partition unit that partitions the inflow space 40C. The first rib portion 23C is formed of a substantially plate-shaped body, and is provided vertically between the outer cover body 21C and the top surface portion 22C. Specifically, as illustrated in FIG. 14 and FIG. 16, a plurality of first rib portions 23C is provided radially from the vicinity of a center of the outer cover 20C, and is connected to the outer cover body 21C and the top surface portion 22C.

In addition, the second rib portion 24C is a partition unit that partitions the inflow space 40C. The second rib portion 24C is formed of a substantially plate-shaped body, and is provided vertically between the outer cover body 21C and the top surface portion 22C. Specifically, as illustrated in FIG. 14 and FIG. 16, the second rib portion 24C is provided between inner end portions of adjacent first rib portions 23C, and is connected to the outer cover body 21C and the top surface portion 22C.

(Configuration—Inflow Space)

Returning to FIG. 14, the inflow space 40C is a space for allowing gas outside the fire detection apparatus 1C to flow into the fire detection apparatus 1C. A plurality of inflow spaces 40C is provided inside the outer cover 20C. Specifically, as illustrated in FIG. 14 and FIG. 16, a space surrounded by the top surface portion 22C, the first rib portion 23C, the second rib portion 24C, and the inner cover 30C in an internal space of the outer cover 20C is formed as the inflow space 40C.

(Configuration—Inner Cover)

The inner cover 30C is a cover that covers the detection space 60C, the detector cover 70C, the detector body 80C, and the substrate 100C, and is a partition unit that partitions the inflow space 40C. The inner cover 30C is, for example, a substantially hollow cylindrical body whose upper surface is opened, is formed of a resin material having a light shielding property, and is provided so that a lower side portion of the inner cover 30C faces the top surface portion 22C of the outer cover 20C through the inflow space 40C on the inside of the outer cover 20C as illustrated in FIG. 16. In addition, as illustrated in FIG. 16, a first opening 30aC is formed in the lower side portion of the inner cover 30C. The first opening 30aC is an opening for sending gas flowing into the inflow space 40C to the detection space 60C and is provided in a substantially central portion and a vicinity thereof in a lower side portion of the inner cover 30C as illustrated in FIG. 16.

(Configuration—Detection Space)

The detection space 60C is a space for detecting a substance to be detected. As illustrated in FIG. 16, a space surrounded by the detector cover 70C and the detector body 80C in an internal space of the inner cover 30C is formed as the detection space 60C.

(Configuration—Detector Cover)

The detector cover 70C is a partition unit that partitions the detection space 60C, and is an incidence suppressing unit that suppresses incidence of ambient light into the detection space 60C. The detector cover 70C is a substantially hollow cylindrical body whose upper surface is open, and is formed of a resin material having a light shielding property. In addition, as illustrated in FIG. 16, the detector cover 70C is disposed so that a lower side portion of the detector cover 70C faces the top surface portion 22C of the outer cover 20C through the first opening 30aC and the inflow space 40C on the inside of the inner cover 30C, and is fixed to the detector body 80C by a fitting structure, etc. In addition, as illustrated in FIG. 16, a second opening 70aC is formed in the lower side portion of the detector cover 70C. The second opening 70aC is an opening for allowing gas sent from the first opening 30aC to flow into the detection space 60C, and is provided in a portion corresponding to the first opening 30aC in the lower side portion of the detector cover 70C as illustrated in FIG. 16.

(Configuration—Insect Screen)

The insect screen 50C is a net for preventing insects present outside the fire detection apparatus 1C from intruding into the detection space 60C. The insect screen 50C is configured using a mesh-like and circular net, and is attached to the detector cover 70C as illustrated in FIG. 16.

(Configuration—Detector Body)

The detector body 80C is an attaching unit that attaches the detector cover 70C, and is an incidence suppressing unit that suppresses incidence of ambient light into the detection space 60C. The detector body 80C is formed of, for example, a resin material having a light shielding property, is disposed to cover an upper surface of the detector cover 70C as illustrated in FIG. 16, and is fixed to the substrate 100C by a fixing tool, etc. In addition, each support (not illustrated) for supporting each of a first light emitting unit described below, a second light emitting unit described below, and a light receiving unit described below is provided on the detector body 80C. Furthermore, each optical path hole (not illustrated) for forming an optical path between the detection space 60C and each of the first light emitting unit described below, the second light emitting unit described below, and the light receiving unit described below is provided in the detector body 80C.

The terminal board 90C is an accommodating unit that accommodates the inner cover 30C, the detector cover 70C, the detector body 80C, and the substrate 100C. The terminal board 90C has a substantially hollow cylindrical shape whose lower surface is open, and is formed of, for example, a resin material having a light shielding property. In addition, as illustrated in FIG. 16, the terminal board 90C is provided to cover the inner cover 30C, the detector cover 70C, the detector body 80C, and the substrate 100C from above, and is fixed to the outer cover 20C by a fitting structure, etc. Details of a configuration of the terminal board 90C will be described below. In addition, the "outer cover 20C", the "inner cover 30C", and the "terminal board 90C" described above correspond to a casing in claims.

(Configuration—Substrate)

Returning to FIG. 15A and FIG. 15B, the substrate 100C is a mounting unit on which various electric circuits (not illustrated) are mounted. The substrate 100C is configured using, for example, a known flat plate-shaped circuit board, etc. Specifically, as illustrated in FIG. 15A, when viewed in the Z direction, the substrate 100C is formed in a hexagonal shape that can overlap a part of a first connection terminal portion 92C described below, a part of a second connection terminal portion 93C described below, and a part of a third connection terminal portion 94C described below. In addition, the substrate 100C is disposed substantially horizontally at intervals from an upper end portion and a lower end portion of the terminal board 90C in the terminal board 90C as illustrated in FIG. 16, and is fixed to the terminal board 90C by a fixing tool through an attachment hole (not illustrated) formed in the terminal board 90C and a second attachment hole 91bC formed in a connection terminal portion 91C.

Further, in addition to the fact that a known electronic component (not illustrated) used for the conventional fire detection apparatus 1C is mounted on the substrate 100C, the first light emitting unit, the second light emitting unit, the light receiving unit, the display unit, a communication unit, a power supply unit, a control unit, and a storage unit are mounted on the substrate 100C (each of the units is not illustrated).

(Configuration—Substrate—First Light Emitting Unit, Second Light Emitting Unit, and Light Receiving Unit)

Among these units, the first light emitting unit is a first light emitting unit that irradiates the detection space 60C with detection light (hereinafter referred to as "first detection light"), and is configured using, for example, a known light emitting element (as an example, an infrared LED, etc.). In addition, the second light emitting unit is a second light emitting unit that irradiates the detection space 60C with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 3, installation is performed to be able to avoid direct reception of the first detection light or the second detection light irradiated from the first light emitting unit or the second light emitting unit through various optical path holes of the detector body 80C. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°.

(Configuration—Substrate—Display Unit, Communication Unit, and Power Supply Unit)

In addition, the display unit is a display unit that displays predetermined information (for example, information indicating the presence or absence of detection of a fire) by irradiating light (hereinafter, referred to as "display light") toward the outside of the fire detection apparatus 1C, and is configured using, for example, a known display device (an LED, etc.). A light projection method of the display unit is arbitrary. Examples thereof include light projection by guiding display light from the display unit toward the outside of the fire detection apparatus 1C through the light guide 104aC inserted into insertion holes (not illustrated) provided in each of the detector cover 70C, the detector body 80C, and the inner cover 30C and the display hole 22aC of the outer cover 20C described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1C.

(Configuration—Substrate—Control Unit and Storage Unit)

In addition, the control unit is a control unit that controls the fire detection apparatus 1C. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1C. The storage unit is configured using a rewritable recording medium. For example, it is possible to use a non-volatile recording medium such as a flash memory.

(Configuration—Details of Configuration of Terminal Board)

Returning to FIGS. 15A and 15B, next, a description will be given of details of a configuration of the terminal board 90C. However, the terminal board 90C can be manufactured in any shape, method, and material unless otherwise noted.

In Embodiment 3, the connection terminal portion 91C and a nameplate seal 95C are provided on the terminal board 90C.

(Configuration—Details of Configuration of Terminal Board—Connection Terminal Portion)

The connection terminal portion 91C is a terminal portion for electrically connecting an electronic component and an external wiring (not illustrated) mounted on the substrate 100C. Here, the "external wiring" refers to a wiring present outside the fire detection apparatus 1C, and corresponds to, for example, a power line, a signal line, etc. attached on the installation surface 2C. The connection terminal portion 91C is configured using, for example, a known long electric connection terminal, and at least one or more connection terminal portion is provided on a side surface on the installation surface 2C side in side surfaces of a side portion 96C on the installation surface 2C side (hereinafter referred to as an "installation surface-side side portion 96C") in side portions of the terminal board 90C (three connection terminal portions are provided on an upper surface of the installation surface-side side portion 96C in FIG. 15A). Further, the connection terminal portion 91C is electrically connected to an external wiring through a first attachment hole 91aC formed in the connection terminal portion 91C, and is electrically connected to the substrate 100C by a fixing tool, etc. through the second attachment hole 91b formed in the connection terminal portion 91C and an attachment hole of the terminal board 90C. According to such a connection terminal portion 91C, power can be supplied from an external power supply (for example, a commercial power supply, etc.), or it is possible to communicate with an external apparatus. Hereinafter, a connection terminal portion 91C located on the right side of FIG. 15A will be referred to as a "first connection terminal portion 92C", a connection terminal portion 91C located on the upper left side of FIG. 15A will be referred to as a "second connection terminal portion 93C", and a connection terminal portion 91C located on the lower left side of FIG. 15A will be referred to as a "third connection terminal portion 94C".

(Configuration—Details of Configuration of Terminal Board—Nameplate Seal)

The nameplate seal 95C is a seal indicating predetermined information related to the fire detection apparatus 1C (for example, information indicating a serial number). The nameplate seal 95C is configured using, for example, a known seal material made of resin, and is affixed to a side surface of the installation surface-side side portion 96C on the installation surface 2C side. Specifically, as illustrated in FIG. 15A, the nameplate seal 95C is affixed to a portion other than a portion corresponding to the connection terminal portion 91C (the first connection terminal portion 92C, the second connection terminal portion 93C, and the third connection terminal portion 94C) on the side surface on the installation surface 2C side, and is disposed in the vicinity of the connection terminal portion 91C.

(Configuration—Drainage Structure of Terminal Board)

Next, a description will be given of a drainage structure of the terminal board 90C. FIG. 17 is a cross-sectional view taken along B-B line of FIG. 15A. FIG. 18 is an enlarged view of an area of a non-horizontal portion 97C described below of FIG. 17. In Embodiment 3, a feature of a drainage structure for inhibiting water droplets dripping from the installation surface 2C or the attachment base 10C from accumulating on at least a part of the installation surface-side side portion 96C when condensation occurs on the installation surface 2C or the attachment base 10C is described below.

(Configuration—Details of Configuration of Terminal Board—Drainage Structure—First Feature)

First, with regard to a first feature of the drainage structure, at least a part of the installation surface-side side portion 96C is formed in a non-horizontal shape.

Specifically, first, a vicinity of the connection terminal portion 91C in a portion of the installation surface-side side portion 96C is formed in a non-horizontal shape. More specifically, as illustrated in FIG. 15A and FIG. 17, a vicinity of the first connection terminal portion 92C in the portion of the installation surface-side side portion 96C is formed in a non-horizontal shape. However, the invention is not limited thereto. For example, in addition thereto (or in place thereof), a vicinity of the second connection terminal portion 93C or the third connection terminal portion 94C in the portion of the installation surface-side side portion 96C may be formed in a non-horizontal shape. According to such a configuration, it is possible to inhibit water droplets from accumulating on the connection terminal portion 91C or the vicinity thereof, and it is possible to avoid short circuit of the connection terminal portion 91C due to water droplets.

In addition, a portion other than a portion corresponding to the substrate 100C in the portion of the installation surface-side side portion 96C is formed in a non-horizontal shape. More specifically, as illustrated in FIG. 15A and FIG. 17, the vicinity of the first connection terminal portion 92C in the portion other than the portion corresponding to the substrate 100C is formed in a non-horizontal shape. However, the invention is not limited thereto. For example, a portion other than the vicinity of the first connection terminal portion 92C in the portion other than the portion corresponding to the substrate 100C may be formed in a non-horizontal shape. According to such a configuration, it is possible to reliably ensure a space for accommodating an electronic component mounted on the substrate 100C on the inside of the terminal board 90C (specifically, a space in the vertical direction) while inhibiting water droplets from accumulating on the portion other than the portion corresponding to the substrate 100C, and it is possible to maintain an accommodating property for the electronic component while having a draining property.

Furthermore, a vicinity of the nameplate seal 95C in the portion of the installation surface-side side portion 96C is formed in a non-horizontal shape. More specifically, as illustrated in FIG. 15A and FIG. 17, a vicinity of the first connection terminal portion 92C in the vicinity of the nameplate seal 95C is formed in a non-horizontal shape. However, the invention is not limited thereto. For example, a portion other than the vicinity of the first connection terminal portion 92C in the vicinity of the nameplate seal 95C may be formed in a non-horizontal shape. According to such a configuration, it is possible to efficiently drain water droplets accumulating on the nameplate seal 95C, and it is possible to further avoid short circuit of the connection terminal portion 91C. In particular, when the nameplate seal 95C is formed of a resin material having a relatively high surface tension, water droplets are easily accumulated on the nameplate seal 95C, and thus the water droplets can be efficiently drained by the configuration.

It is conceivable that at least a part of the portion corresponding to the nameplate seal 95C in the portion of the installation surface-side side portion 96C is formed in a non-horizontal shape. However, in this case, since drained water droplets easily enter a gap between an end portion of the nameplate seal 95C and the installation surface-side side portion 96C, the nameplate seal 95C is easily peeled off from the installation surface-side side portion 96C, and thus this configuration may not be preferable. From this point of view, it is considered that by forming the vicinity of the nameplate seal 95C in the non-horizontal shape, it is possible to suppress occurrence of peeling of the nameplate seal 95C due to water droplets, and it becomes easy to maintain an affixing property of the nameplate seal 95C.

According to such a first feature, in a case in which condensation occurs on the installation surface 2C or the attachment base 10C, even when water droplets attached to the installation surface 2C or the attachment base 10C drip on the installation surface-side side portion 96C, it is possible to inhibit water droplets from accumulating on at least a part of the installation surface-side side portion 96C when compared to a case in which the entire installation surface-side side portion 96C has a horizontal shape. Therefore, for example, it is possible to prevent an electronic component or a peripheral component thereof (for example, a wiring, a terminal, etc.) from being damaged by water droplets, and to improve usability of the fire detection apparatus 1C.

(Configuration—Details of Configuration of Terminal Board—Drainage Structure—Second Feature)

Returning to FIG. 15A and FIG. 15B, in addition, with regard to a second feature of the drainage structure, a portion 97C corresponding to a non-horizontal shape (hereinafter, referred to as a "non-horizontal portion 97C") in the installation surface-side side portion 96C is configured such that water droplets dropping from the installation surface 2C or the attachment base 10C are efficiently drained by the non-horizontal portion 97C.

Specifically, as illustrated in FIG. 15A, the non-horizontal portion 97C is formed in a long and substantially rectangular shape and disposed such that a longitudinal direction of the non-horizontal portion 97C extends substantially along a longitudinal direction of the first connection terminal portion 92C. In this case, a length of the non-horizontal portion 97C in the longitudinal direction is arbitrary. In Embodiment 3, the length is set to a length in which one of end portions of the non-horizontal portion 97C in the longitudinal direction is located near the nameplate seal 95C and the other one of the end portions of the non-horizontal portion 97C in the longitudinal direction is located near the outer cover 20C. In addition, a length of the non-horizontal portion 97C in the short direction is arbitrary. In Embodiment 3, as illustrated in FIG. 15A, the length is set to be shorter than a radius of the installation surface-side side portion 96C.

In addition, the non-horizontal portion 97C is formed such that the non-horizontal portion 97C is away from the installation surface 2C as the non-horizontal portion 97C is headed to an outside of the installation surface-side side portion 96C (specifically, an outer peripheral side of the installation surface-side side portion 96C). More specifically, as illustrated in FIG. 17 and FIG. 18, the non-horizontal portion 97C is formed to be inclined downward from an end portion of the non-horizontal portion 97C on the nameplate seal 95C side (an end portion on the left side in FIG. 18) to an end portion of the non-horizontal portion 97C on the outer cover 20C side (an end portion on the right side in FIG. 18). In this case, an inclination angle of the non-horizontal portion 97C is arbitrary. In Embodiment 3, an inclination angle of a part of the non-horizontal portion 97C is set to be different from an inclination angle of another part of the non-horizontal portion 97C. Specifically, as illustrated in FIG. 18, an inclination angle θ1C of a part on the nameplate seal 95C side in the non-horizontal portion 97C (that is, a part corresponding to an inside of the installation surface-side side portion 96C in the non-horizontal portion 97C) is set to be smaller than an inclination angle θ2C of a part on the outer cover 20C side in the non-horizontal portion 97C (that is, a part corresponding to an outside of the installation surface-side side portion 96C in the non-horizontal portion 97C), and the inclination angle θ1C and the inclination angle θ2C are set to relatively moderate angles. However, the invention is not limited thereto. For example, the inclination angle θ1C and the inclination angle θ2C may be equal to each other. In addition, an inclined portion corresponding to a part of the non-horizontal portion 97C and an inclined portion corresponding to another part of the non-horizontal portion 97C are formed continuously (however, the invention is not limited thereto, and, for example, the portions may be formed discontinuously). Further, a boundary between the inclined portion corresponding to the part of the non-horizontal portion 97C and the inclined portion corresponding to another part of the non-horizontal portion 97C is formed in a round shape (a rounded shape) (however, the invention is not limited thereto, and, for example, the boundary may be formed in a horn shape).

According to such a second feature, since it is easy to ensure a space for accommodating the electronic component in an inner part of the inside of the terminal board 90C while suppressing accumulation of water droplets on the installation surface-side side portion 96C, it is possible to maintain the accommodating property for the electronic component while having the draining property. Further, since the inclination angle of the part of the non-horizontal portion 97C and the inclination angle of the other part of the non-horizontal portion 97C are made different from each other, it is possible to change a degree of an influence of surface tension acting on water droplets flowing in the non-horizontal portion 97C according to the sizes of these inclination angles, and it is possible to perform drainage according to an installation situation. In particular, in Embodiment 3, since an inclination angle θ1C of a part on the nameplate seal 95C side in the non-horizontal portion 97C is set to be smaller than an inclination angle θ2C of a part on the outer cover 20C side in the non-horizontal portion 97C, it is possible to relatively reduce the influence of surface tension acting on water droplets flowing in the non-horizontal portion 97C, and it is possible to improve the draining property of the non-horizontal portion 97C. In addition, since the inclined portion corresponding to the part of the non-horizontal portion 97C and the inclined portion corresponding to another part of the non-horizontal portion 97C are formed continuously, it is possible to inhibit water droplets from accumulating on the non-horizontal portion 97C when compared to a case in which the inclined portions are formed discontinuously. Further, since the boundary between these inclined portions is formed in the round shape, when compared to a case in which the boundary is formed in a horn shape, it is possible to reduce the influence of surface tension acting on water droplets flowing through the boundary, and it is possible to further inhibit water droplets from accumulating on the non-horizontal portion 97C.

In Embodiment 3, as illustrated in FIG. 17, since an inclination angle θ3C of a vicinity of an outer edge in a portion other than the non-horizontal portion 97C in a portion of the installation surface-side side portion 96C is set to be significantly larger than the inclination angle θ2C, it is possible to relatively increase an increase of surface tension acting on water droplets on the vicinity of the outer edge, and it is possible to prevent the water droplets from flowing into the substrate 100C.

(Configuration—Details of Configuration of Terminal Board—Drainage Structure—Third Feature)

Returning to FIG. 15A and FIG. 15B, in addition, with regard to a third feature of the drainage structure, an inflow prevention portion 98C is provided on a side surface on the installation surface 2C side among side surfaces of the installation surface-side side portion 96C.

The inflow prevention portion 98C is an inflow prevention unit that prevents water droplets present on the side surface on the installation surface 2C side from flowing into the connection terminal portion 91C. As illustrated in FIG. 15A, the inflow prevention portion 98C is formed of a substantially plate-shaped body having a U-shape whose planar shape is opened toward the outside of the terminal board 90C, and is erected in a portion corresponding to an outer periphery of each of the first connection terminal portion 92C, the second connection terminal portion 93C, and the third connection terminal portion 94C on the side surface on the installation surface 2C side. In addition, in Embodiment 3, a vertical length of the inflow prevention portion 98C is set to a length in which even when water droplets accumulated on the nameplate seal 95C flows out to the outside, the water droplets that have flowed out do not flow into the connection terminal portion 91C.

In addition, a method of forming the inflow prevention portion 98C is arbitrary. In Embodiment 3, the inflow prevention portion 98C and the terminal board 90C are mutually integrally formed, and may be integrally formed by, for example, injection-molding a resin material having a light shielding property.

According to such a third feature, it is possible to prevent water droplets present on the side surface on the installation surface 2C side from flowing into the connection terminal portion 91C using the inflow prevention portion 98C, and it is possible to further avoid short circuit of the connection terminal portion 91C due to water droplets.

(With Regard to Action of Fire Detection Apparatus)

Next, a description will be given of an action of the fire detection apparatus 1C configured as described above. In more detail, for example, when condensation occurs on the installation surface 2C or the attachment base 10C in a state in which the fire detection apparatus 1C is attached to the installation surface 2C, water droplets drip to the installation surface-side side portion 96C of the terminal board 90C from the installation surface 2C or the attachment base 10C.

In this case, when the water droplets drip to the non-horizontal portion 97C, the water droplets are efficiently drained downward by the non-horizontal portion 97C, and thus the water droplets are inhibited from accumulating on the non-horizontal portion 97C. Therefore, it is possible to avoid short circuit of the first connection terminal portion 92C, the second connection terminal portion 93C, or the third connection terminal portion 94C due to the water droplets.

In addition, in a case in which the water droplets drip on the nameplate seal 95C, the water droplets are accumulated on the nameplate seal 95C. However, when the water droplets accumulate by a predetermined amount or more, and thus flow out to the outside, the water droplets are drained downward by the non-horizontal portion 97C, and the water droplets are prevented from flowing into the first connection terminal portion 92C, the second connection terminal portion 93C, or the third connection terminal portion 94C by the inflow prevention portion 98C. Therefore, it is possible to further avoid short circuit of the first connection terminal portion 92C, the second connection terminal portion 93C, or the third connection terminal portion 94C due to the water droplets.

Effect of Embodiment 3

As described above, according to Embodiment 3, at least a part of the installation surface-side side portion 96C of the casing for accommodating the electronic component is formed in the non-horizontal shape. Thus, in a case in which condensation occurs on the installation surface 2C, even when water droplets attached to the installation surface 2C drip to the installation surface-side side portion 96C, it is possible to inhibit water droplets from accumulating on at least the part of the installation surface-side side portion 96C when compared to a case in which the entire installation surface-side side portion 96C has a horizontal shape. Therefore, for example, it is possible to prevent an electronic component or a peripheral component thereof (for example, a wiring, a terminal, etc.) from being damaged by water droplets, and to improve usability of the fire detection apparatus 1C.

In addition, since the vicinity of the connection terminal portion 91C in the portion of the installation surface-side side portion 96C is formed in the non-horizontal shape, it is possible to inhibit water droplets from accumulating on the connection terminal portion 91C or the vicinity thereof, and it is possible to avoid short circuit of the connection terminal portion 91C due to water droplets.

In addition, since the inflow prevention portion 98C provided on the side surface on the installation surface 2C side among the side surfaces of the installation surface-side side portion 96C and used to prevent water droplets present on the side surface of the installation surface 2C from flowing into the connection terminal portion 91C is included, it is possible to prevent water droplets present on the side surface on the installation surface 2C side among the side surfaces of the installation surface-side side portion 96C from flowing into the connection terminal portion 91C using the inflow prevention portion 98C, and it is possible to further avoid short circuit of the connection terminal portion 91C due to water droplets.

In addition, since the portion other than the portion corresponding to the substrate 100C in the portion of the installation surface-side side portion 96C is formed in the non-horizontal shape, it is possible to reliably ensure the space for accommodating the electronic component mounted on the substrate 100C on the inside of the casing while inhibiting water droplets from accumulating on the portion other than the portion corresponding to the substrate 100C, and it is possible to maintain the accommodating property for the electronic component while having the draining property.

In addition, since the vicinity of the nameplate seal 95C in the portion of the installation surface-side side portion 96C is formed in the non-horizontal shape, it is possible to efficiently drain water droplets accumulating on the nameplate seal 95C, and it is possible to further avoid short circuit of the connection terminal portion 91C. In addition, when compared to a case in which a part of the portion corresponding to the nameplate seal 95C in the portion of the installation surface-side side portion 96C is formed a non-horizontal shape, it is possible to suppress occurrence of peeling off of the nameplate seal 95C due to water droplets, and it becomes easy to maintain the affixing property of the nameplate seal 95C.

In addition, since the non-horizontal portion 97C is formed such that the non-horizontal portion 97C is away from the installation surface 2C as being headed to the outside of the installation surface-side side portion 96C, it becomes easy to ensure the space for accommodating the electronic component in the inner part inside the casing while inhibiting water droplets from accumulating on the installation surface-side side portion 96C, and thus it becomes easy to maintain the accommodating property for the electronic component while having the draining property.

In addition, since the inclination angle of the part of the non-horizontal portion 97C and the inclination angle of the other part of the non-horizontal portion 97C are made different from each other, it is possible to change a degree of an influence of surface tension acting on water droplets flowing in the non-horizontal portion 97C according to the sizes of these inclination angles, and it is possible to perform drainage according to the installation situation.

In addition, since the inclined portion corresponding to the part of the non-horizontal portion 97C and the inclined portion corresponding to another part of the non-horizontal portion 97C are formed continuously, when compared to a case in which these inclined portions are formed discontinuously, it is possible to inhibit water droplets from accumulating on the non-horizontal portion 97C, and it is possible to further avoid short circuit of the connection terminal portion 91C due to water droplets.

In addition, since the boundary between the inclined portion corresponding to the part of the non-horizontal portion 97C and the inclined portion corresponding to another part of the non-horizontal portion 97C is formed in the round shape, when compared to a case in which the boundary is formed in a horn shape, it is possible to reduce the influence of surface tension acting on water droplets flowing through the boundary, and it is possible to further inhibit water droplets from accumulating on the non-horizontal portion 97C.

Embodiment 4

Next, a description will be given of a fire detection apparatus according to Embodiment 4. Embodiment 4 is a mode of including an incidence suppressing unit that inhibits ambient light from entering a detection space described below.

(Configuration)

First, a description will be given of a configuration of the fire detection apparatus according to Embodiment 4. FIG. 20 is a side view illustrating an attachment state of the fire detection apparatus according to Embodiment 4. FIG. 21 is a bottom view illustrating the fire detection apparatus in a state of removing an attachment base described below. FIG. 22 is a cross-sectional view taken along A-A line of FIG. 21. In the following description, an X direction of FIG. 20 is referred to as a left-right direction of the fire detection apparatus (a −X direction is a left direction of the fire detection apparatus and a +X direction is a right direction of the fire detection apparatus), a Y direction of FIG. 21 is referred to as a front-back direction of the fire detection apparatus (a +Y direction is a frontward direction of the fire detection apparatus and a −Y direction is a backward direction of the fire detection apparatus), and a Z direction of FIG. 20 is referred to as a vertical direction of the fire detection apparatus (a +Z direction is an upward direction of the fire detection apparatus and a −Z direction is a downward direction of the fire detection apparatus).

The fire detection apparatus 1D is an apparatus that detects and reports a detection target (for example, smoke, etc.) contained in gas. The fire detection apparatus 1D is installed on an installation surface 2D on a lower surface of a ceiling portion of a building in an interior of the building, and includes an attachment base 10D, an outer cover 20D, an inner cover 30D, an inflow space 40D, an insect screen 50D, a detection space 60D, a detector cover 70D, a detector body 80D, a terminal board 90D, and a substrate 100D as illustrated in FIG. 20 to FIG. 22.

(Configuration—Attachment Base)

Returning to FIG. 20, the attachment base 10D is an attaching unit that attaches the outer cover 20D to the installation surface 2D. The attachment base 10D is configured using, for example, a known attachment base for the fire detection apparatus (as an example, a substantially plate-shaped attachment base made of resin), etc., and is fixed to the installation surface 2D by a fixing tool, etc. as illustrated in FIG. 20.

(Configuration—Outer Cover)

The outer cover 20D is a cover that covers the inner cover 30D, the inflow space 40D, the insect screen 50D, the detection space 60D, the detector cover 70D, the detector body 80D, the terminal board 90D, and the substrate 100D. The outer cover 20D is formed of, for example, a resin material having a light shielding property, and includes an outer cover body 21D, a top surface portion 22D, a first rib portion 23D, and a second rib portion 24D as illustrated in FIG. 20 to FIG. 22.

Among these portions, the outer cover body 21D is a basic structure of the outer cover 20D. The outer cover body 21D is formed of, for example, a substantially hollow cylindrical body whose upper surface and lower surface are open, is disposed so that an upper end portion of the outer cover body 21D comes into contact with a lower surface of the attachment base 10D as illustrated in FIG. 20, and is fixed to the attachment base 10D by a fitting structure (or a fixing tool), etc.

In addition, the top surface portion 22D is a partition unit that partitions the inflow space 40D. The top surface portion 22D is formed of, for example, a substantially circular plate-shaped body, and is provided substantially horizontally below the outer cover body 21D as illustrated in FIG. 20 to FIG. 22. In addition, as illustrated in FIG. 21, a display hole 22aD is provided in the top surface portion 22D. The display hole 22aD is a through-hole for guiding light irradiated from a display unit described below to the outside of the fire detection apparatus 1D through a light guide 104aD and the display hole 22aD of FIG. 21.

In addition, the first rib portion 23D is a partition unit that partitions the inflow space 40D. The first rib portion 23D is formed of a substantially plate-shaped body, and is provided vertically between the outer cover body 21D and the top surface portion 22D. Specifically, as illustrated in FIG. 20 and FIG. 22, a plurality of first rib portions 23D is provided radially from the vicinity of a center of the outer cover 20D, and is connected to the outer cover body 21D and the top surface portion 22D.

In addition, the second rib portion 24D is a partition unit that partitions the inflow space 40D. The second rib portion 24D is formed of a substantially plate-shaped body, and is provided vertically between the outer cover body 21D and the top surface portion 22D. Specifically, as illustrated in FIG. 20 and FIG. 22, the second rib portion 24D is provided between inner end portions of adjacent first rib portions 23D, and is connected to the top surface portion 22D.

(Configuration—Inflow Space)

Returning to FIG. 20, the inflow space 40D is a space for allowing gas outside the fire detection apparatus 1D to flow into the fire detection apparatus 1D. A plurality of inflow spaces 40D is provided inside the outer cover 20D. Specifically, as illustrated in FIG. 20 and FIG. 22, a space surrounded by the top surface portion 22D, the first rib portion 23D, the second rib portion 24D, and the inner cover 30D in an internal space of the outer cover 20D is formed as the inflow space 40D.

(Configuration—Inner Cover)

The inner cover 30D is a cover that covers the detection space 60D, the detector cover 70D, the detector body 80D, and the substrate 100D, and is a partition unit that partitions the inflow space 40D. The inner cover 30D is, for example, a substantially hollow cylindrical body whose upper surface is opened, is formed of a resin material having a light shielding property, and is provided so that a lower side portion of the inner cover 30D faces the top surface portion 22D of the outer cover 20D through the inflow space 40D on the inside of the outer cover 20D as illustrated in FIG. 22. In addition, as illustrated in FIG. 22, a first opening 30aD is formed in the lower side portion of the inner cover 30D. The first opening 30aD is an opening for sending gas flowing into the inflow space 40D to the detection space 60D and is provided in a substantially central portion and a vicinity thereof in a lower side portion of the inner cover 30D as illustrated in FIG. 22.

(Configuration—Detection Space)

The detection space 60D is a space for detecting a detection target. As illustrated in FIG. 22, a space surrounded by the detector cover 70D and the detector body 80D in an internal space of the inner cover 30D is formed as the detection space 60D.

(Configuration—Detector Cover)

The detector cover 70D is an incidence suppressing unit that suppresses incidence of ambient light into the detection space 60D and covers a part of the detection space 60D. The detector cover 70D is a substantially hollow cylindrical body whose upper surface is open, and is formed of a resin material having a light shielding property. In addition, as illustrated in FIG. 22, the detector cover 70D is disposed so that a lower side portion of the detector cover 70D faces the top surface portion 22D of the outer cover 20D through the first opening 30aD and the inflow space 40D on the inside of the inner cover 30D, and is fixed to the detector body 80D. In addition, as illustrated in FIG. 22, a second opening 70aD is formed in a lower side portion of the detector cover 70D. The second opening 70aD is an opening for allowing gas sent from the first opening 30aD to flow into the detection space 60D, and is provided in a portion corresponding to the first opening 30aD in the lower side portion of the detector cover 70D as illustrated in FIG. 22.

(Configuration—Insect Screen)

The insect screen 50D is a net for preventing insects present outside the fire detection apparatus 1D from intruding into the detection space 60D. The insect screen 50D is configured using a mesh-like and circular net, and is attached to the detector cover 70D as illustrated in FIG. 22.

(Configuration—Detector Body)

The detector body 80D is a second incidence suppressing unit that suppresses incidence of ambient light into the detection space 60D and covers another part of the detection space 60D. The detector body 80D is, for example, a thick plate-shaped body (as an example, a substantially circular plate-shaped body) formed of a resin material having a light shielding property, is provided on the substrate 100D side of the detector cover 70D (upper side in FIG. 22), specifically is disposed to cover an upper surface of the detector cover 70D as illustrated in FIG. 22, and is fixed to the substrate 100D by a fixing tool, etc. The "detector cover 70D" and the "detector body 80D" described above correspond to an "incidence suppressing unit" in the claims.

Returning to FIG. 22, the terminal board 90D is an accommodating unit that accommodates the inner cover 30D, the detector cover 70D, the detector body 80D, and the substrate 100D. The terminal board 90D has a substantially hollow cylindrical shape whose lower surface is open, and is formed of, for example, a resin material having a light shielding property. In addition, as illustrated in FIG. 22, the terminal board 90D is provided to cover the inner cover 30D, the detector cover 70D, the detector body 80D, and the substrate 100D from above, is fixed to the outer cover 20D by a fitting structure, etc., and is fixed to the attachment base 10D by a fixing tool, etc. through a first attachment hole (not illustrated) formed in an attachment member 91D.

(Configuration—Substrate)

The substrate 100D is a mounting unit on which various electric circuits (not illustrated) are mounted. The substrate 100D is configured using, for example, a known flat plate-shaped circuit board, etc., is disposed substantially horizontally at intervals from an upper end portion and a lower end portion of the terminal board 90D in the terminal board 90D as illustrated in FIG. 22, and is fixed to the terminal board 90D by a fixing tool through an attachment hole (not illustrated) formed in the terminal board 90D and a second attachment hole (not illustrated) formed in the attachment member 91D.

Further, in addition to the fact that a known component (electric component) used for the conventional fire detection apparatus 1D is mounted on the substrate 100D, the first light emitting unit, the second light emitting unit, the light receiving unit, the display unit, a communication unit, a power supply unit, a control unit, and a storage unit are mounted on the substrate 100D (each of the units is not illustrated).

(Configuration—Substrate—First Light Emitting Unit, Second Light Emitting Unit, and Light Receiving Unit)

Among these units, the first light emitting unit is a light emitting unit that irradiates the detection space 60D with detection light (hereinafter referred to as "first detection light"), and is configured using, for example, a known light emitting element (as an example, an infrared LED, etc.). In addition, the second light emitting unit is a light emitting unit that irradiates the detection space 60D with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 4, installation is performed to be able to avoid direct reception of the first detection light or the second detection light irradiated from the first light emitting unit or the second light emitting unit through various prism lenses described below. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°. A unit including the "first light emitting unit", the "second light emitting unit", and the "light receiving unit" corresponds to a "detection unit" in the claims.

(Configuration—Substrate—Display Unit, Communication Unit, and Power Supply Unit)

In addition, the display unit is a display unit that displays predetermined information (for example, information indicating the presence or absence of detection of a fire) by irradiating light (hereinafter, referred to as "display light") toward the outside of the fire detection apparatus 1D, and is configured using, for example, a known display unit (an LED, etc.). A light projection method of the display unit is arbitrary. Examples thereof include light projection by guiding display light from the display unit toward the outside of the fire detection apparatus 1D through the light guide 104aD inserted into insertion holes (not illustrated) provided in each of the detector cover 70D, the detector body 80D, and the inner cover 30D and the display hole 22aD of the outer cover 20D described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1D.

(Configuration—Substrate—Control Unit and Storage Unit)

In addition, the control unit is a control unit that controls the fire detection apparatus 1D. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1D. The storage unit is configured using a rewritable recording medium. For example, it is possible to use a non-volatile recording medium such as a flash memory.

(Configuration—Fixing Structure)

Next, a description will be given of a fixing structure of the fire detection apparatus 1D. The fire detection apparatus 1D includes the fixing structure for fixing the detector cover 70D and the detector body 80D to each other. In Embodiment 4, a feature of the fixing structure is described below.

(Configuration—Fixing Structure—First Feature)

First, a first feature of the fixing structure will be described. FIGS. 23A and 23B are diagrams illustrating a state in which the detector cover 70D and the detector body 80D are fixed to each other, in which FIG. 23A is a bottom view and FIG. 23B is a side view. FIGS. 24A, 24B and 24C are perspective views illustrating a fixing state of the detector cover 70D and the detector body 80D, in which FIG. 24A is a diagram illustrating a state before the detector cover 70D and the detector body 80D are fixed to each other, FIG. 24B is a diagram illustrating a state in which a first guide portion 121D and a second guide portion 122D are fixed to the detector body 80D, and FIG. 24C is a diagram illustrating a state in which the detector cover 70D and the detector body 80D are fixed to each other. With regard to the first feature of the fixing structure, the fire detection apparatus 1D includes a first fixing portion 111D, a second fixing portion 112D, the first guide portion 121D, and the second guide portion 122D.

(Configuration—Fixing Structure—First Feature—First Fixing Portion and Second Fixing Portion)

The first fixing portion 111D and the second fixing portion 112D correspond to a fixing unit that fixes the detector cover 70D and the detector body 80D to each other. Each of the first fixing portion 111D and the second fixing portion 112D is formed of a substantially long body (specifically, a hollow and substantially cylindrical body), is provided on the detector body 80D, and specifically is provided to be spaced apart from each other as illustrated in FIGS. 23A, 23B and FIGS. 24A, 24B, and 24C.

In addition, a method of installing the first fixing portion 111D and the second fixing portion 112D is arbitrary. In Embodiment 4, the first fixing portion 111D and the second fixing portion 112D are installed (disposed) such that a substantially central portion of the detection space 60D is located on a straight line LD extending from one of the first fixing portion 111D or the second fixing portion 112D to the other one of the first fixing portion 111D or the second fixing portion 112D. Specifically, as illustrated in FIGS. 23A, 23B and FIGS. 24A, 24B, and 24C, the first fixing portion 111D is disposed at a front end portion of the detector body 80D, the second fixing portion 112D is disposed at a back end portion of the detector body 80D, and the first fixing portion 111D and the second fixing portion 112D are disposed such that the straight line LD from the first fixing portion 111D to the second fixing portion 112D extends substantially along the front-back direction. In this way, centering (specifically, horizontal centering) of the detector cover 70D and the detector body 80D can be easily performed, and it becomes easy to accurately fix the detector cover 70D and the detector body 80D to each other.

In addition, a method of forming the first fixing portion 111D and the second fixing portion 112D is arbitrary. In Embodiment 4, the first fixing portion 111D and the second fixing portion 112D are formed integrally with the detector body 80D by injection-molding a resin material having a light shielding property. In this way, it is possible to reduce the number of parts of the fire detection apparatus 1D, and it is possible to reduce the manufacturing cost of the fire detection apparatus 1D. However, the invention is not limited thereto. For example, the first fixing portion 111D and the second fixing portion 112D may be formed separately from the detector body 80D.

(Configuration—Fixing Structure—First Feature—First Guide Portion and Second Guide Portion)

Returning to FIGS. 23A, 23B, the first guide portion 121D is a guide unit that guides the detector cover 70D or the detector body 80D to the first fixing portion 111D when the detector cover 70D and the detector body 80D are fixed through the first fixing portion 111D. In addition, the second guide portion 122D is a guide unit that guides the detector cover 70D or the detector body 80D to the second fixing portion 112D when the detector cover 70D and the detector body 80D are fixed through the second fixing portion 112D. Each of the first guide portion 121D and the second guide portion 122D is formed of, for example, a long hollow body (specifically, a hollow and substantially cylindrical body) made of resin, and provided between the detector cover 70D and the detector body 80D. Specifically, as illustrated in FIGS. 23A, 23B and FIGS. 24A, 24B, and 24C, the first guide portion 121D is disposed such that a longitudinal direction of the first guide portion 121D is along the vertical direction, and is disposed such that an upper end portion of the first guide portion 121D is fit into a first fitting hole 111aD (a through-hole or a non-through hole) of FIG. 24A formed in the first fixing portion 111D. In addition, the second guide portion 122D is disposed such that a longitudinal direction of the second guide portion 122D is along the vertical direction, and is disposed such that an upper end portion of the second guide portion 122D is fit into a second insertion hole 112aD (a through-hole or a non-through hole) of FIG. 24A formed in the second fixing portion 112D. In Embodiment 4, the first guide portion 121D and the second guide portion 122D will be described as being provided in the detector body 80D at all times.

In addition, a method of forming the first guide portion 121D and the second guide portion 122D is arbitrary. In Embodiment 4, the first guide portion 121D and the second guide portion 122D are formed separately from the first fixing portion 111D (or the second fixing portion 112D). In this way, the first guide portion 121D and the second guide portion 122D can be attached and detached, and the first guide portion 121D and the second guide portion 122D can be used in accordance with a situation.

(Configuration—Fixing Structure—First Feature—Other Configurations)

Returning to FIGS. 23A, 23B, in addition, specific configurations of the detector cover 70D, the detector body 80D, the first fixing portion 111D, the second fixing portion 112D, the first guide portion 121D, and the second guide portion 122D are arbitrary. In Embodiment 4, the portions are configured such that the detector cover 70D or the detector body 80D can be detachably fixed to the first fixing portion 111D and the second fixing portion 112D by being inserted through the first guide portion 121D or second guide portion 122D and the first fixing portion 111D and the second fixing portion 112D.

Specifically, as described above, the first fixing portion 111D and the second fixing portion 112D are provided on the detector body 80D. In addition, as illustrated in FIGS. 23A, 23B and FIGS. 24A, 24B, and 24C, a first insertion hole 131D and a second insertion hole 132D are provided in the detector cover 70D. In these holes, the first insertion hole 131D is a through-hole into which the first fixing portion 111D and the first guide portion 121D can be inserted and is disposed at a portion facing the first fixing portion 111D of the detector cover 70D. In addition, the second insertion hole 132D is a through-hole into which the second fixing portion 112D and the second guide portion 122D can be inserted and is disposed at a portion facing the second fixing portion 112D of the detector cover 70D. In addition, a diameter of the first fixing portion 111D is set to a size at which the first fixing portion 111D can be fit into the first insertion hole 131D. For example, the diameter is set to be substantially the same as a diameter of the first insertion hole 131D. In addition, a diameter of the second fixing portion 112D is set to a size at which the second fixing portion 112D can be fit into the second insertion hole 132D. For example, the diameter is set to be substantially the same as a diameter of the second insertion hole 132D.

In addition, a longitudinal (vertical) length of each of the first guide portion 121D and the second guide portion 122D is set to a length in which the detector cover 70D or the detector body 80D can be inhibited from touching a component (for example, an electric component mounted on the substrate 100, etc.) provided in the detection space or a vicinity thereof when the detector cover 70D or the detector body 80D is inserted into the first guide portion 121D and the second guide portion 122D or is guided to the first fixing portion 111D and the second fixing portion 112D after insertion. More specifically, the longitudinal length of the first guide portion 121D may be set to a length longer than (or substantially the same as) a vertical length of the component and set to a length in which the upper end portion of the first guide portion 121D (end portion at which guiding of the first guide portion 121D is started) can be positioned above (or at substantially the same height as that of) an upper end of the component and the first guide portion 121D can be accommodated in the inner cover 30D while the substrate 100D is attached to the detector body 80D. As an example, the length may be set to be slightly shorter than a vertical length of the inner cover 30D. In addition, the longitudinal length of the second guide portion 122D may be set to be longer than (or substantially the same as) the vertical length of the component and set to a length in which the upper end portion of the second guide portion 122D (end portion at which guiding of the second guide portion 122D is started) can be positioned above (or at substantially the same height as that of) the upper end of the component and the second guide portion 122D can be accommodated in the inner cover 30D while the substrate 100D is attached to the detector body 80D. As an example, the length may be set to be slightly shorter than the vertical length of the inner cover 30D. In this way, the detector cover 70D or the detector body 80D can be inhibited from touching the component when the detector cover 70D or the detector body 80D is inserted into the first guide portion 121D and the second guide portion 122D or is guided to the first fixing portion 111D and the second fixing portion 112D after insertion. Therefore, for example, it becomes easy to prevent the component from being damaged or falling off and the component (for example, the substrate 100D, etc.) to which the component is attached from being deformed or loaded during an assembly operation of the detector cover 70D and the detector body 80D.

According to such a configuration, it is possible to increase a contact area between the detector cover 70D, and the first fixing portion 111D and the second fixing portion 112D, and it is possible to firmly fix the detector cover 70D to the first fixing portion 111D and the second fixing portion 112D. In addition, it is possible to easily attach and detach the detector cover 70D to and from the first fixing portion 111D and the second fixing portion 112D, and it is possible to easily perform a maintenance operation, etc.

According to the first feature, at the time of fixing the detector cover 70D and the detector body 80D through the first fixing portion 111D and the second fixing portion 112D, it is possible to guide the detector cover 70D to the first fixing portion 111D and the second fixing portion 112D through the first guide portion 121D and the second guide portion 122D, and it is possible to accurately and rapidly fix the detector cover 70D and the detector body 80D to each other when compared to a case in which the first guide portion 121D and the second guide portion 122D are not provided. Therefore, it is possible to efficiently perform the assembly operation of the detector cover 70D and the detector body 80D, and it is possible to improve manufacturability of the fire detection apparatus 1D. In particular, since it becomes easy to fix the detector cover 70D without the detector cover 70D touching a component (for example, a thermistor, etc.) protruding from the substrate 100D, etc., it becomes easy to efficiently perform the assembly operation of the detector cover 70D and the detector body 80D. In addition, since the first fixing portion 111D and the second fixing portion 112D are provided to be spaced apart from each other, when compared to a case in which only one of the first fixing portion 111D or the second fixing portion 112D is provided, it is possible to stably fix the detector cover 70D and the detector body 80D to each other, it is possible to easily perform positioning of the detector cover 70D and the detector body 80D, and it is possible to effectively fix the detector cover 70D and the detector body 80D to each other.

(Configuration—Fixing Structure—Second Feature)

Next, a description will be given of a second feature of the fixing structure. FIGS. 25A and 25B are diagrams illustrating a state in which a sensitivity adjustment tool 150D described below and the detector body 80D are fixed to each other, in which FIG. 25A is a bottom view and FIG. 25B is a side view. In FIG. 24B, a part of a sensitivity adjustment portion 160D accommodated in the detector cover 70D is indicated by a dotted line. With regard to the second feature of the fixing structure, the first fixing portion 111D and the second fixing portion 112D are configured such that the sensitivity adjustment tool 150D can be fixed to the first fixing portion 111D and the second fixing portion 112D.

Here, the "sensitivity adjustment tool 150D" is a tool used at the time of performing sensitivity adjustment of the first light emitting unit, the second light emitting unit, and the light receiving unit, and includes the sensitivity adjustment portion 160D and a support 170D as illustrated in FIGS. 25A, 25B. Among these portions, the sensitivity adjustment portion 160D is a sensitivity adjustment unit that performs sensitivity adjustment of the first light emitting unit, the second light emitting unit, and the light receiving unit, and is configured using, for example, a known sensitivity adjustment unit for the fire detection apparatus, etc. In addition, the support 170D is a support unit that supports the sensitivity adjustment portion 160D, and includes a support body 171D, a first leg portion 172D, and a second leg portion 173D as illustrated in FIGS. 25A, 25B. Among these portions, the support body 171D is a basic structure of the support 170D, is used to fix the sensitivity adjustment portion 160D to the support 170D, and is formed of a long plate-shaped body having a curved planar shape. In addition, each of the first leg portion 172D and the second leg portion 173D supports the support body 171D, is formed of a long solid (or hollow) rod-shaped body, and is attached to the support body 171D. Specifically, as illustrated in FIG. 25B, the first leg portion 172D is attached to project in the vertical direction at one end portion of the support body 171D in the longitudinal direction, and the second leg portion 173D is attached to project in the vertical direction at the other end portion of the support body 171D in the longitudinal direction.

In addition, with regard to specific configurations of the first fixing portion 111D and the second fixing portion 112D, as illustrated in FIGS. 25A, 25B the first fixing portion 111D and the second fixing portion 112D are installed at positions at which the first leg portion 172D of the sensitivity adjustment tool 150D can be fit into the first fitting hole 111aD of the first fixing portion 111D and the second leg portion 173D of the sensitivity adjustment tool 150D can be fit into the second fitting hole 112aD of the second fixing portion 112D. In addition, a diameter of the first fitting hole 111aD is set to a size at which the first leg portion 172D can be fit and flutter of the support body 171D can be suppressed. For example, the diameter is set to be substantially the same as a diameter of the first leg portion 172D. In addition, a diameter of the second fitting hole 112aD is set to a size at which the second leg portion 173D can be fit and flutter of the support body 171D can be suppressed. For example, the diameter is set to be substantially the same as a diameter of the second leg portion 173D.

According to such a second feature, it is possible to accurately and rapidly attach the sensitivity adjustment tool 150D, and it is possible to efficiently perform a sensitivity adjustment operation of the first light emitting unit, the second light emitting unit, and the light receiving unit. In addition, since it is unnecessary to separately provide a member for positioning of the sensitivity adjustment tool 150D in the detector cover 70D or the detector body 80D, it is possible to reduce the manufacturing cost of the fire detection apparatus 1D.

(Action of Fixing Structure)

Returning to FIGS. 24A, 24B and 24C, next, a description will be given of an action of the fixing structure of the fire detection apparatus 1D configured as described above. The action of the fixing structure is roughly divided into an action in the case of fixing the detector cover 70D and the detector body 80D to each other (hereinafter referred to as a "first action") and an action in the case of fixing the sensitivity adjustment tool 150D and the detector body 80D to each other (hereinafter referred to as a "second action"). Thus, hereinafter, each of the first action and the second action will be described.

(Action of Fixing Structure—First Action)

First, the first action will be described.

First, in the case of fixing the detector cover 70D and the detector body 80D to each other, first, as illustrated in FIG. 24B, the first guide portion 121D is fit into the first fitting hole 111aD of the first fixing portion 111D, and the second guide portion 122D is fit into the second fitting hole 112aD of the second fixing portion 112D. Subsequently, when the first insertion hole 131D of the detector cover 70D is inserted into the first guide portion 121D and the first fixing portion 111D, and the second insertion hole 132D of the detector cover 70D is inserted into the second guide portion 122D and the second fixing portion 112D, as illustrated in-FIG. 24C, the first fixing portion 111D is fit into the first insertion hole 131D, and the second fixing portion 112D is fit into the second insertion hole 132D. In this way, it is possible to accurately and rapidly fix the detector cover 70D and the detector body 80D to each other.

In addition, in the case of removing the detector cover 70D from the detector body 80D, the detector cover 70D can be easily removed from the detector body 80D by performing a reverse operation to an operation in the case of fixing the detector cover 70D and the detector body 80D to each other. Alternatively, the detector cover 70D may be removed from the detector body 80D by removing the first guide portion 121D from the first insertion hole 131D and removing the second guide portion 122D from the second insertion hole 132D after removing the first guide portion 121D and the second guide portion 122D from the detector body 80D.

(Action of Fixing Structure—Second Action)

Next, the second action will be described.

First, in the case of fixing the sensitivity adjustment tool 150D and the detector body 80D to each other, the first guide portion 121D and the second guide portion 122D are removed from the detector body 80D in a state in which the detector cover 70D and the detector body 80D are fixed to each other. Subsequently, when the first leg portion 172D of the sensitivity adjustment tool 150D is inserted into the first fitting hole 111aD, and the second leg portion 173D of the sensitivity adjustment tool 150D is inserted into the second fitting hole 112aD, as illustrated in FIGS. 25A and 25B, the first leg portion 172D is fit into the first fitting hole 111aD, and the second leg portion 173D is fit into the second fitting hole 112aD. In this way, it is possible to accurately and rapidly fix the sensitivity adjustment tool 150D and the detector body 80D to each other.

In addition, in the case of removing the sensitivity adjustment tool 150D from the detector body 80D, the sensitivity adjustment tool 150D can be easily removed from the detector body 80D by performing a reverse operation to an operation in the case of fixing the sensitivity adjustment tool 150D and the detector body 80D to each other.

Effect of Embodiment 4

As described above, according to Embodiment 4, since the first fixing portion 111D and the second fixing portion 112D for fixing the detector cover 70D and the detector body 80D to each other, and the first guide portion 121D and the second guide portion 122D for guiding the detector cover 70D to the first fixing portion 111D and the second fixing portion 112D at the time of fixing the detector cover 70D and the detector body 80D through the first fixing portion 111D and the second fixing portion 112D are included, it is possible to guide the detector cover 70D to the first fixing portion 111D and the second fixing portion 112D by the first guide portion 121D and the second guide portion 122D at the time of fixing the detector cover 70D and the detector body 80D through the first fixing portion 111D and the second fixing portion 112D, and it is possible to accurately and rapidly fix the detector cover 70D and the detector body 80D to each other when compared to a case in which the first guide portion 121D and the second guide portion 122D are not provided. Therefore, it is possible to efficiently perform the assembly operation of the detector cover 70D and the detector body 80D, and it is possible to improve manufacturability of the fire detection apparatus 1D. In particular, since it becomes easy to fix the detector cover 70D without the detector cover 70D touching a component (for example, a thermistor, etc.) protruding from the substrate 100D, etc., it becomes easy to efficiently perform the assembly operation of the detector cover 70D and the detector body 80D.

In addition, since the detector cover 70D, the detector body 80D, the first fixing portion 111D, the second fixing portion 112D, the first guide portion 121D, and the second guide portion 122D are configured such that the detector cover 70D or the detector body 80D can be detachably fixed to the first fixing portion 111D (or the second fixing portion 112D) by inserting the detector cover 70D or the detector body 80D through the first guide portion 121D (or the second guide portion 122D) and the first fixing portion 111D (or the second fixing portion 112D), it is possible to increase the contact area between the detector cover 70D and the first fixing portion 111D or the second fixing portion 112D, and it is possible to firmly fix the detector cover 70D to the first fixing portion 111D and the second fixing portion 112D. In addition, it is possible to easily attach and detach the detector cover 70D to and from the first fixing portion 111D and the second fixing portion 112D, and it is possible to easily perform the maintenance operation, etc.

In addition, since the longitudinal length of each of the first guide portion 121D and the second guide portion 122D is set to a length in which the detector cover 70D or the detector body 80D can be inhibited from touching the component when the detector cover 70D or the detector body 80D is inserted into the first guide portion 121D and the second guide portion 122D or is guided to the first fixing portion 111D and the second fixing portion 112D after insertion, it is possible to inhibit the detector cover 70D or the detector body 80D from touching the component at the time of insertion or at the time of guiding. Therefore, for example, it becomes easy to prevent the component from being damaged or falling off and the component (for example, the substrate 100D, etc.) to which the component is attached from being deformed or loaded during the assembly operation of the detector cover 70D and the detector body 80D.

In addition, since the first fixing portion 111D and the second fixing portion 112D are provided to be spaced apart from each other, when compared to a case in which only one of the first fixing portion 111D or the second fixing portion 112D is provided, it is possible to stably fix the detector cover 70D and the detector body 80D to each other, it is possible to easily perform positioning of the detector cover 70D and the detector body 80D, and it is possible to effectively fix the detector cover 70D and the detector body 80D to each other.

In addition, since the first fixing portion 111D and the second fixing portion 112D are disposed such that the substantially central portion of the detection space 60D is located on the straight line LD extending from one of the first fixing portion 111D or the second fixing portion 112D to the other one of the first fixing portion 111D or the second fixing portion 112D, centering (specifically, horizontal centering) of the detector cover 70D and the detector body 80D can be easily performed, and it becomes easy to accurately fix the detector cover 70D and the detector body 80D to each other.

In addition, since the first fixing portion 111D and the second fixing portion 112D are configured such that the sensitivity adjustment tool 150D can be fixed to the first fixing portion 111D and the second fixing portion 112D, it is possible to accurately and rapidly attach the sensitivity adjustment tool 150D, and it is possible to efficiently perform the sensitivity adjustment operation of the first light emitting unit, the second light emitting unit, and the light receiving unit. In addition, since it is unnecessary to separately provide a member for positioning of the sensitivity adjustment tool 150D in the detector cover 70D or the detector body 80D, it is possible to reduce the manufacturing cost of the fire detection apparatus 1D.

Embodiment 5

Next, a description will be given of a fire detection apparatus according to Embodiment 5. Embodiment 5 is a mode of including an inner accommodating unit described below and an outer accommodating unit described below.
(Configuration)

First, a description will be given of a configuration of the fire detection apparatus according to Embodiment 5. FIG. 26 is a side view illustrating an attachment state of the fire detection apparatus according to Embodiment 5. FIG. 27 is a bottom view illustrating the fire detection apparatus in a state of removing an attachment base described below. FIG. 28 is a side view of the fire detection apparatus of FIG. 27. FIG. 29 is a cross-sectional view taken along A-A line of FIG. 27. In the following description, an X direction of FIG. 26 is referred to as a left-right direction of the fire detection apparatus (a −X direction is a left direction of the fire detection apparatus and a +X direction is a right direction of the fire detection apparatus), a Y direction of FIG. 27 is referred to as a front-back direction of the fire detection apparatus (a +Y direction is a frontward direction of the fire detection apparatus and a −Y direction is a backward direction of the fire detection apparatus), and a Z direction of FIG. 26 is referred to as a vertical direction of the fire detection apparatus (a +Z direction is an upward direction of the fire detection apparatus and a −Z direction is a downward direction of the fire detection apparatus).

The fire detection apparatus 1E is an apparatus that detects heat in a monitored area and detects and reports a detection target (for example, smoke, etc.) contained in gas. The fire detection apparatus 1E is installed on an installation surface 2E on a lower surface of a ceiling portion of a building in an interior of the building, and includes an attachment base 10E, an outer cover 20E, an inner cover 30E, an inflow space 40E, an insect screen 50E, a detection space 60E, a detector cover 70E, a detector body 80E, a lower cover 90E, and a substrate 100E as illustrated in FIG. 26 to FIG. 29.

(Configuration—Attachment Base)

Returning to FIG. 26, the attachment base 10E is an attaching unit that attaches the outer cover 20E to the installation surface 2E. The attachment base 10E is configured using, for example, a known attachment base for the fire detection apparatus (as an example, a substantially plate-shaped attachment base made of resin), etc., and is fixed to the installation surface 2E by a fixing tool, etc. as illustrated in FIG. 26.

(Configuration—Outer Cover)

The outer cover 20E is an outer accommodating unit that accommodates the inner cover 30E, the inflow space 40E, the insect screen 50E, the detection space 60E, the detector cover 70E, the detector body 80E, the lower cover 90E, and the substrate 100E, and is an outer accommodating unit capable of allowing gas containing the detection target to flow in and out of the outer accommodating unit. The outer cover 20E is formed of, for example, a resin material having a light shielding property, and includes an outer cover body 21E and a top surface portion 22E as illustrated in FIG. 26 to FIG. 29.

Among these portions, the outer cover body 21E is a basic structure of the outer cover 20E. The outer cover body 21E is formed of, for example, a substantially hollow cylindrical body whose upper surface and lower surface are open, is disposed so that an upper end portion of the outer cover body 21E comes into contact with a lower surface of the attachment base 10E as illustrated in FIG. 26, and is fixed to the attachment base 10E by a fitting structure (or a fixing tool), etc.

In addition, the top surface portion 22E is a partition unit that partitions the inflow space 40E. The top surface portion 22E is formed of, for example, a substantially circular plate-shaped body, and is provided substantially horizontally below the outer cover body 21E as illustrated in FIG. 26 to FIG. 29. Details of a configuration of the outer cover 20E will be described below.

(Configuration—Inflow Space)

Returning to FIG. 26, the inflow space 40E is a space for guiding gas flowing into the outer cover 20E to an inflow portion of gas in the inner cover 30E (a first opening 30aE described below). As illustrated in FIG. 26 and FIG. 29, a gap between the top surface portion 22E and the inner cover 30E in an internal space of the outer cover 20E is formed as the inflow space 40E.

(Configuration—Inner Cover)

The inner cover 30E is an inner accommodating unit that accommodates the detection space 60E, the detector cover 70E, the detector body 80E, and the substrate 100E, is an inner accommodating unit capable of allowing gas containing the detection target to flow in and out of the inner accommodating unit, and is a partition unit that partitions the inflow space 40E. The inner cover 30E is, for example, a substantially hollow cylindrical body whose upper surface is opened, is formed of a resin material having a light shielding property, and is provided so that a lower side portion of the inner cover 30E faces the top surface portion 22E of the outer cover 20E through the inflow space 40E on the inside of the outer cover 20E as illustrated in FIG. 29. In addition, as illustrated in FIG. 29, the first opening 30aE is formed in the lower side portion of the inner cover 30E. The first opening 30aE is an opening for sending gas flowing into the inflow space 40E to the detection space 60E and is provided in a substantially central portion and a vicinity thereof in a lower side portion of the inner cover 30E as illustrated in FIG. 29.

(Configuration—Detection Space)

The detection space 60E is a space for detecting a detection target. As illustrated in FIG. 29, a space surrounded by the detector cover 70E and the detector body 80E in an internal space of the inner cover 30E is formed as the detection space 60E.

(Configuration—Detector Cover)

The detector cover 70E is a partition unit that partitions the detection space 60E and is an incidence suppressing unit that suppresses incidence of ambient light into the detection space 60E. The detector cover 70E is a substantially hollow cylindrical body whose upper surface is open, and is formed of a resin material having a light shielding property. In addition, as illustrated in FIG. 29, the detector cover 70E is disposed so that a lower side portion of the detector cover 70E faces the top surface portion 22E of the outer cover 20E through the first opening 30aE and the inflow space 40E on the inside of the inner cover 30E, and is fixed to the detector body 80E. In addition, as illustrated in FIG. 29, a second opening 70aE is formed in a lower side portion of the detector cover 70E. The second opening 70aE is an opening for allowing gas sent from the first opening 30aE to flow into the detection space 60E, and is provided in a portion corresponding to the first opening 30aE in the lower side portion of the detector cover 70E as illustrated in FIG. 29.

(Configuration—Insect Screen)

The insect screen 50E is a net for preventing insects present outside the fire detection apparatus 1E from intruding into the detection space 60E. The insect screen 50E is configured using a mesh-like and circular net, and is attached to the detector cover 70E as illustrated in FIG. 29.

(Configuration—Detector Body)

The detector body 80E is an attaching unit that attaches the detector cover 70E and is an incidence suppressing unit that suppresses incidence of ambient light into the detection space 60E. The detector body 80E is, for example, a thick plate-shaped body (as an example, a substantially circular plate-shaped body) formed of a resin material having a light shielding property, is provided on the substrate 100E side of the detector cover 70E (upper side in FIG. 29), specifically is disposed to cover an upper surface of the detector cover 70E as illustrated in FIG. 29, and is fixed to the substrate 100E by a fixing tool, etc.

(Configuration—Lower Cover)

The lower cover 90E is a cover unit that covers a side surface of the inner cover 30E on the installation surface 2E side. The lower cover 90E has a substantially hollow cylindrical shape whose lower surface is open, and is formed of, for example, a resin material having a light shielding property. In addition, as illustrated in FIG. 29, the lower cover 90E is provided to cover the inner cover 30E from above, is fixed to the outer cover 20E by a fitting structure, etc., and is fixed to the attachment base 10E by a fixing tool, etc. through a first attachment hole (not illustrated) formed in an attachment member 91E.

(Configuration—Substrate)

The substrate 100E is a mounting unit on which various electric circuits (not illustrated) are mounted. The substrate 100E is configured using, for example, a known flat plate-shaped circuit board, etc., is disposed substantially horizontally at intervals from an upper end portion and a lower end portion of the lower cover 90E in the lower cover 90E as illustrated in FIG. 29, and is fixed to the lower cover 90E by a fixing tool through an attachment hole (not illustrated) formed in the lower cover 90E and a second attachment hole (not illustrated) formed in the attachment member 91E.

Further, in addition to the fact that a known component (electronic component) used for the conventional fire detection apparatus 1E is mounted on the substrate 100E, the first light emitting unit (not illustrated), the second light emitting unit (not illustrated), the light receiving unit (not illustrated), a heat detection unit 101E, a display unit (not illustrated), a communication unit (not illustrated), a power supply unit (not illustrated), a control unit (not illustrated), and a storage unit (not illustrated) are mounted on the substrate 100E.

(Configuration—Substrate—First Light Emitting Unit, Second Light Emitting Unit, and Light Receiving Unit)

Among these units, the first light emitting unit is a first light emitting unit that irradiates the detection space 60E with detection light (hereinafter referred to as "first detection light"), and is configured using, for example, a known light emitting element (as an example, an infrared LED, etc.). In addition, the second light emitting unit is a second light emitting unit that irradiates the detection space 60E with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 5, installation is performed to be able to avoid direct reception of the first detection light or the second detection light irradiated from the first light emitting unit or the second light emitting unit through various optical path holes of the detector body 80E. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°.

(Configuration—Substrate—Heat Detection Unit, Display Unit, Communication Unit, and Power Supply Unit)

In addition, the heat detection unit 101E is a heat detection unit that detects a fire. The heat detection unit 101E is configured using, for example, a known heat detection element (as an example, a thermistor, etc.), and is disposed such that a part of the heat detection unit 101E is exposed to the outside of the fire detection apparatus 1E through an insertion hole 31E described below provided in each of the inner cover 30E, the detector cover 70E, and the detector body 80E and an insertion hole 120E of the outer cover 20E described below as illustrated in FIG. 27 and FIG. 29. In addition, the display unit is a display unit that displays various kinds of information (for example, information indicating the presence or absence of detection of a fire), and is configured using, for example, a known display unit (an LED, etc.). A light projection method of the display unit is arbitrary. Examples thereof include light projection by guiding light from the display unit toward the outside of the fire detection apparatus 1E through a light guide (not illustrated) inserted into an insertion hole 32E described below provided in each of the inner cover 30E, the detector cover 70E, and the detector body 80E and the insertion hole 120E of the outer cover 20E described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1E.

(Configuration—Substrate—Control Unit and Storage Unit)

In addition, the control unit is a control unit that controls the fire detection apparatus 1E. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1E. The storage unit is configured using a rewritable recording medium. For example, it is possible to use a non-volatile recording medium such as a flash memory.

(Configuration—Details of Configuration of Outer Cover)

Returning to FIG. 27, next, a description will be given of details of a configuration of the outer cover 20E. FIG. 30 is a plan view illustrating the outer cover 20E (partially not illustrated). However, the outer cover 20E can be manufactured in any shape using any method and material, unless otherwise specified.

In Embodiment 5, as illustrated in FIG. 27 and FIG. 30, a first rib 111E to an eighth rib 118E, an insertion hole 120E, and a guard portion 130E are provided in the outer cover 20E. Hereinafter, when it is unnecessary to particularly distinguish the first rib 111E to the eighth rib 118E, the ribs will be simply collectively referred to as "ribs 110E".

(Configuration—Details of Configuration of Outer Cover—Rib)

The first rib 111E to the eighth rib 118E are ribs for partitioning the inflow space 40E. Each of the first rib 111E to the eighth rib 118E is formed of a substantially plate-shaped body, provided substantially vertically between the top surface portion 22E of the outer cover 20E and the lower side portion of the inner cover 30E as illustrated in FIG. 30, and connected to the outer cover body 21E or the top surface portion 22E.

In addition, with regard to a specific configuration of the first rib 111E to the eighth rib 118E, in Embodiment 5, the first rib 111E to the eighth rib 118E are configured such that a plurality of inflow spaces is formed by partitioning the gap between the top surface portion 22E and the inner cover 30E using the first rib 111E to the eighth rib 118E.

Specifically, first, shapes and sizes of the first rib 111E to the eighth rib 118E are set as follows. That is, as illustrated in FIG. 30, the shapes of the first rib 111E to the eighth rib 118E are set to be rectangular. Further, widths (horizontal lengths) of the first rib 111E to the eighth rib 118E are set to a length substantially the same as or slightly shorter than a radius of the top surface portion 22E. Further, heights (vertical lengths) of the first rib 111E to the eighth rib 118E are set to be substantially the same as or shorter than a vertical length of the inflow space 40E.

Further, with regard to a method of installing the first rib 111E to the eighth rib 118E, the first rib 111E to the eighth rib 118E are installed (disposed) radially outward from a center side of the inner cover 30E. More specifically, as illustrated in FIG. 30, the first rib 111E to the fourth rib 114E are disposed in a cross shape. More specifically, the first rib 111E and the third rib 113E are arranged in parallel along the front-back direction and disposed to come into contact with each other, and the second rib 112E and the fourth rib 114E are arranged in parallel along the front-back direction and disposed to come into contact with a boundary between the first rib 111E and the third rib 113E. Further, the fifth rib 115E to the eighth rib 118E are disposed between the first rib 111E to the fourth rib 114E, respectively. More specifically, the fifth rib 115E is disposed between the first rib 111E and the second rib 112E, the sixth rib 116E is disposed between the second rib 112E and the third rib 113E, the seventh rib 117E is disposed between the third rib 113E and the fourth rib 114E, and the eighth rib 118E is disposed between the first rib 111E and the fourth rib 114E. According to such an installation method, it is possible to partition the inflow space 40E into eight parts, and it is possible to radially form these inflow spaces. Thus, it is possible to reduce direction dependency of gas flowing into the outer cover 20E.

(Configuration—Details of Configuration of Outer Cover—Insertion Hole)

Returning to FIG. 27, the insertion hole 120E is a through-hole for exposing a part of the heat detection unit 101E to the outside of the fire detection apparatus 1E and irradiating display light from the display unit to the outside of the fire detection apparatus 1E.

Here, a specific shape and size of the insertion hole 120E are arbitrary. In Embodiment 5, as illustrated in FIG. 30, a planar shape of the insertion hole 120E is set to a substantially elliptical shape (or may be set to a polygonal shape such as a quadrangular shape). In addition, a diameter of the insertion hole 120E is set to a size at which only a part of the heat detection unit 101E can be exposed to the outside and display light can be irradiated to the outside of the fire detection apparatus 1E. For example, the diameter is set to be longer than a sum of a diameter of the heat detection unit 101E and a diameter of the light guide.

(Configuration—Details of Configuration of Outer Cover—Guard Portion)

Returning to FIG. 26, the guard portion 130E is a guard unit that protects the heat detection unit, and includes a first guard-side rib 131E, a second guard-side rib 132E, a third guard-side rib 133E, a fourth guard-side rib 134E, and a guard-side connecting portion 135E as illustrated in FIG. 26 to FIG. 29.

Among these portions, the first guard-side rib 131E, the second guard-side rib 132E, the third guard-side rib 133E, and the fourth guard-side rib 134E correspond to a basic structure of the guard portion 130E. Each of the first guard-side rib 131E, the second guard-side rib 132E, the third guard-side rib 133E, and the fourth guard-side rib 134E is formed of a long plate-shaped body, and provided to cover a portion exposed to the outside of the fire detection apparatus 1E in the heat detection unit 101E and a periphery of the insertion hole 120E as illustrated in FIG. 26 to FIG. 29. Specifically, each of the first guard-side rib 131E, the second guard-side rib 132E, the third guard-side rib 133E, and the fourth guard-side rib 134E is provided such that a longitudinal direction of each of the guard-side ribs extends substantially along the vertical direction (slightly inclined in FIG. 29), and erected with respect to a lower surface of the top surface portion 22E.

In addition, the guard-side connecting portion 135E is a connection unit that connects the first guard-side rib 131E, the second guard-side rib 132E, the third guard-side rib 133E, and the fourth guard-side rib 134E. The guard-side connecting portion 135E is formed of, for example, the same material as that of the outer cover 20E, and connected to a vicinity of an upper end portion of each of the first guard-side rib 131E, the second guard-side rib 132E, the third guard-side rib 133E, and the fourth guard-side rib 134E as illustrated in FIG. 26 to FIG. 29.

(Configuration—Attachment Structure)

Next, a description will be given of an attachment structure of the inner cover 30E and the outer cover 20E. FIGS. 31A and 31B are diagrams illustrating the inner cover 30E, in which FIG. 31A is a bottom view and FIG. 31B is a side view. The fire detection apparatus 1E includes an attachment structure for enhancing an attaching property of the inner cover 30E and the outer cover 20E. In Embodiment 5, a feature of this attachment structure is as follows.

(Configuration—Attachment Structure—First Feature)

First, with regard to a first feature of the attachment structure, the fire detection apparatus 1E includes a positioning portion 140E. The positioning portion 140E is a positioning unit that aligns a relative position of the inner cover 30E and the outer cover 20E to a predetermined position at the time of attaching the inner cover 30E and the outer cover 20E to each other, and includes a protrusion 150E and a fitting portion 160E as illustrated in FIG. 28 to FIGS. 31A and 31B.

(Configuration—Attachment Structure—First Feature—Protrusion)

The protrusion 150E is fit into the fitting portion 160E. The protrusion 150E is formed of a hollow body and is provided on one of the inner cover 30E or the outer cover 20E. Specifically, as illustrated in FIGS. 31A and 31B, the protrusion 150E is disposed to protrude outward from a side portion (lower side portion in FIGS. 31A and 31B) on the opposite side from the installation surface 2E side of the inner cover 30E, and is connected to the inner cover 30E.

In addition, a specific shape and size of the protrusion 150E are arbitrary. In Embodiment 5, the shape and size are set as follows. That is, as illustrated in FIGS. 31A and 31B, an outer shape of the protrusion 150E is set to a substantially columnar shape. In addition, as illustrated in FIGS. 31A and 31B, a length of the protrusion 150E in the left-right direction is set to be shorter than a radius of the inner cover 30E. In addition, as illustrated in FIGS. 31A and 31B, a length of the protrusion 150E in the front-back direction is set to be shorter than the radius of the inner cover 30E. In addition, as illustrated in FIG. 28, a length of the protrusion 150E in the vertical direction is set to be substantially the same as a length of the inflow space 40E in the vertical direction.

(Configuration—Attachment Structure—First Feature—Fitting Portion) Returning to FIG. 30, the fitting portion 160E is used to fit the protrusion 150E, and includes a first fitting portion 161E and a second fitting portion 162E as illustrated in FIG. 30.

(Configuration—Attachment Structure—First Feature—Fitting Portion—First Fitting Portion)

The first fitting portion 161E is used to fit a part of the protrusion 150E (specifically, a side portion of the protrusion 150E). The first fitting portion 161E is configured as a notch portion obtained by cutting off a part of the other one of the inner cover 30E or the outer cover 20E, and specifically is provided in one of the ribs 110E of the outer cover 20E (the fourth rib 114E in FIG. 30) as illustrated in FIG. 30.

In addition, a specific shape and size of the first fitting portion 161E can be arbitrarily set as long as the side portion of the protrusion 150E can be fit. In Embodiment 5, the shape and size are set as follows. That is, as illustrated in FIG. 30, the shape of the first fitting portion 161E is set to a substantially rectangular shape. In addition, a length of the first fitting portion 161E in the left-right direction is set to be substantially the same as the length of the protrusion 150E in the left-right direction. In addition, a length of the first fitting portion 161E in the vertical direction is set to be substantially the same as the length of the protrusion 150E in the vertical direction.

A specific configuration of the protrusion 150E in a case in which such a first fitting portion 161E is provided is arbitrary. For example, as illustrated in FIGS. 31A and 31B, a guide portion 151E may be provided in the protrusion 150E. The guide portion 151E is a guide unit that guides the protrusion 150E when the protrusion 150E is fit to the first fitting portion 161E. The guide portion 151E is formed in a groove shape, and specifically is formed over substantially the entire vertical length of an end portion of the protrusion 150E facing the fourth rib 114E (an end portion of the protrusion 150E on an outer side in the left-right direction in FIGS. 31A and 31B). Such a guide portion 151E makes it easy to fit the protrusion 150E to the first fitting portion 161E, so that positioning between the inner cover 30E and the outer cover 20E can be easily performed.

(Configuration—Attachment Structure—First Feature—Fitting Portion-Second Fitting Portion)

Returning to FIG. 30, the second fitting portion 162E is used to fit another part of the protrusion 150E (specifically, an upper end portion of the protrusion 150E). The second fitting portion 162E is configured as a notch portion obtained by cutting off a part of the other one of the inner cover 30E or the outer cover 20E. Specifically, as illustrated in FIG. 30, the second fitting portion 162E is formed integrally with the insertion hole 120E of the outer cover 20E (specifically, the top surface portion 22E), and disposed at a portion facing the protrusion 150E in the top surface portion 22E of the outer cover 20E.

In addition, a specific shape and size of the second fitting portion 162E can be arbitrarily set as long as the protrusion 150E can be fit. In Embodiment 5, as illustrated in FIG. 30, a planar shape of the second fitting portion 162E is set to be substantially the same as a planar shape of the protrusion 150E. In addition, a diameter of the second fitting portion 162E is set to be substantially the same as a diameter of the upper end portion of the protrusion 150E.

(Configuration—Attachment Structure—First Feature—Other Configurations)

In addition, a method of forming the protrusion 150E and the fitting portion 160E is arbitrary. In Embodiment 5, the protrusion 150E or the fitting portion 160E is formed integrally with the inner cover 30E or the outer cover 20E. Specifically, as illustrated in FIGS. 31A and 31B, the protrusion 150E is formed integrally with the inner cover 30E. In addition, as illustrated in FIG. 30, the fitting portion 160E (the first fitting portion 161E and the second fitting portion 162E) is formed integrally with the outer cover 20E. In this way, when compared to a case in which each of the protrusion 150E and the fitting portion 160E is formed separately from the inner cover 30E and the outer cover 20E, it is possible to reduce an effort to attach the protrusion 150E or the fitting portion 160E, and it becomes easy to form the positioning portion 140E.

According to such a first feature, when compared to a case in which the positioning portion 140E is not provided, it is possible to easily and rapidly perform positioning of the inner cover 30E and the outer cover 20E at the time of assembling the fire detection apparatus 1E, and it is possible to enhance manufacturability of the fire detection apparatus 1E. In addition, since it becomes easy to avoid contact between the inner cover 30E or the outer cover 20E and another component (for example, the heat detection unit 101E, etc.) at the time of assembling the fire detection apparatus 1E, it is possible to prevent the other component from being damaged. In addition, since the positioning portion 140E includes the protrusion 150E and the fitting portion 160E, it is possible to simplify a configuration of the positioning portion 140E, and it becomes easy to form the positioning portion 140E.

(Configuration—Attachment Structure—Second Feature)

Returning to FIG. 28, first, with regard to a second feature of the attachment structure, the protrusion 150E or the fitting portion 160E is configured as at least a part of the rib 110E that partitions a gap between the inner cover 30E and the outer cover 20E (that is, the inflow space 40E).

Specifically, as illustrated in FIG. 28 to FIGS. 31A and 31B, only the protrusion 150E is configured as the part of the rib 110E. More specifically, as described above, the length of the protrusion 150E in the left-right direction is set to be shorter than the radius of the inner cover 30E, and the vertical length of the protrusion 150E is set to be substantially the same as the vertical length of the inflow space 40E. In addition, the first fitting portion 161E is provided in the fourth rib 114E, a length of the first fitting portion 161E in the left-right direction is set to be substantially the same as the length of the protrusion 150E in the left-right direction, and a vertical length of the first fitting portion 161E is set to be substantially the same as the vertical length of the protrusion 150E. Further, the second fitting portion 162E is provided in a portion facing the first fitting portion 161E in the top surface portion 22E.

According to such a second feature, when compared to a case in which each of the protrusion 150E or the fitting portion 160E and the rib 110E is provided, it is possible to prevent the configuration of the inner cover 30E or the outer cover 20E from being complicated, it becomes easy to enhance manufacturability of the fire detection apparatus 1E, and it becomes easy to make the fire detection apparatus 1E compact.

(Configuration—Attachment Structure—Third Feature)

First, with regard to a third feature of the attachment structure, the positioning portion 140E is configured to be able to guide light irradiated from the display unit provided in the inner cover 30E toward the outside of the outer cover 20E.

Specifically, as illustrated in FIGS. 31A and 31B, with regard to a shape of the protrusion 150E, each of an upper end and a lower end is set by a tubular body opened as the insertion hole 31E and the insertion hole 32E. In addition, with regard to a method of installing the protrusion 150E, the protrusion 150E is installed such that the upper end of the protrusion 150E faces the insertion hole 31E and the insertion hole 32E of the inner cover 30E, and the lower end of the protrusion 150E faces the insertion hole 120E of the top surface portion 22E (the second fitting portion 162E).

According to such a third feature, the positioning portion 140E can function as a light guide, and it is possible to prevent the configuration of the inner cover 30E or the outer cover 20E from being complicated when compared to a case in which each of the positioning portion 140E and the light guide is provided.

(Method of Assembling Fire Detection Apparatus)

A description will be given of a method of assembling the fire detection apparatus 1E configured as described above.

First, after the detector cover 70E and the detector body 80E are attached to the substrate 100E, the substrate 100E is attached to the lower cover 90E. Subsequently, after the insect screen 50E is attached to the inner cover 30E, the lower cover 90E and the inner cover 30E are attached to each other. Then, the inner cover 30E and the outer cover 20E are attached to each other. Specifically, since the inner cover 30E and the outer cover 20E are connected to each other after the inner cover 30E is accommodated in the outer cover 20E such that the protrusion 150E of the inner cover 30E is fit to the first fitting portion 161E and the second fitting portion 162E of the outer cover 20E, it is possible to easily and rapidly align the relative position of the inner cover 30E and the outer cover 20E to the predetermined position. In this way, assembly of the fire detection apparatus 1E is completed.

According to such an assembly method, when compared to a case in which the positioning portion 140E is not provided, it is possible to easily and rapidly perform positioning of the inner cover 30E and the outer cover 20E at the time of assembling the fire detection apparatus 1E, and it is possible to enhance manufacturability of the fire detection apparatus 1E. In addition, since it becomes easy to avoid contact between the inner cover 30E or the outer cover 20E and another component (for example, the heat detection unit 101E, etc.) at the time of assembling the fire detection apparatus 1E, it is possible to prevent the other component from being damaged.

Effect of Embodiment 5

As described above, according to Embodiment 5, since the positioning portion 140E for aligning the relative position of the inner cover 30E and the outer cover 20E to the predetermined position at the time of attaching the inner cover 30E and the outer cover 20E to each other is included, when compared to a case in which the positioning portion 140E is not provided, it is possible to easily and rapidly perform positioning of the inner cover 30E and the outer cover 20E at the time of assembling the fire detection apparatus 1E, and it is possible to enhance manufacturability of the fire detection apparatus 1E. In addition, since it becomes easy to avoid contact between the inner cover 30E or the outer cover 20E and another component (for example, the heat detection unit 101E, etc.) at the time of assembling the fire detection apparatus 1E, it is possible to prevent the other component from being damaged.

In addition since the positioning portion 140E includes the protrusion 150E provided on one of the inner cover 30E or the outer cover 20E, and the fitting portion 160E which is provided on the other one of the inner cover 30E or the outer cover 20E and can fit the protrusion 150E, it is possible to simplify a configuration of the positioning portion 140E, and it becomes easy to form the positioning portion 140E.

In addition, since the protrusion 150E or the fitting portion 160E is configured as at least a part of the rib 110E that partitions the gap between the inner cover 30E and the outer cover 20E, when compared to a case in which each of the protrusion 150E or the fitting portion 160E and the rib 110E is provided, it is possible to prevent the configuration of the inner cover 30E or the outer cover 20E from being complicated, it becomes easy to enhance manufacturability of the fire detection apparatus 1E, and it becomes easy to make the fire detection apparatus 1E compact.

In addition, since the protrusion 150E or the fitting portion 160E is formed integrally with the inner cover 30E or the outer cover 20E, when compared to a case in which each of the protrusion 150E and the fitting portion 160E is formed separately from the inner cover 30E and the outer cover 20E, it is possible to reduce an effort to attach the protrusion 150E or the fitting portion 160E, and it becomes easy to form the positioning portion 140E.

In addition, since the positioning portion 140E is configured to be able to guide light irradiated from the display unit provided in the inner cover 30E toward the outside of the outer cover 20E, the positioning portion 140E can function as a light guide, and it is possible to prevent the configuration of the inner cover 30E or the outer cover 20E from being complicated when compared to a case in which each of the positioning portion 140E and the light guide is provided.

Embodiment 6

Next, a description will be given of a fire detection apparatus according to Embodiment 6. Embodiment 6 is a mode in which a light shielding wall described below is provided to a surround incidence suppressing unit described below.

(Configuration)

First, a description will be given of a configuration of the fire detection apparatus according to Embodiment 6. FIG. 32 is a side view illustrating an attachment state of the fire detection apparatus according to Embodiment 6. FIG. 33 is a bottom view illustrating the fire detection apparatus in a state of removing an attachment base. FIG. 34 is a cross-sectional view taken along A-A line of FIG. 33. In the following description, an X direction of FIG. 32 is referred to as a left-right direction of the fire detection apparatus (a −X direction is a left direction of the fire detection apparatus and a +X direction is a right direction of the fire detection apparatus), a Y direction of FIG. 33 is referred to as a front-back direction of the fire detection apparatus (a +Y direction is a frontward direction of the fire detection apparatus and a −Y direction is a backward direction of the fire detection apparatus), and a Z direction of FIG. 32 is referred to as a vertical direction of the fire detection apparatus (a +Z direction is an upward direction of the fire detection apparatus and a −Z direction is a downward direction of the fire detection apparatus).

The fire detection apparatus 1F is an apparatus that detects heat in a monitored area and detects and reports a detection target (for example, smoke, etc.) contained in gas. The fire detection apparatus 1F is installed on an installation surface 2F on a lower surface of a ceiling portion of a building in an interior of the building, and includes an attachment base 10F, an outer cover 20F, an inner cover 30F, an inflow space 40F, an insect screen 50F, a detection space 60F, a detector cover 70F, a detector body 80F, a lower cover 90F, and a substrate 100F as illustrated in FIG. 32 to FIG. 34.

(Configuration—Attachment Base)

Returning to FIG. 32, the attachment base 10F is an attaching unit that attaches the outer cover 20F to the installation surface 2F. The attachment base 10F is configured using, for example, a known attachment base for the fire detection apparatus (as an example, a substantially plate-shaped attachment base made of resin), etc., and is fixed to the installation surface 2F by a fixing tool, etc. as illustrated in FIG. 32.

(Configuration—Outer Cover)

The outer cover 20F is an outer accommodating unit that accommodates the inner cover 30F, the inflow space 40F, the insect screen 50F, the detection space 60F, the detector cover 70F, the detector body 80F, the lower cover 90F, and the substrate 100F, and is an outer accommodating unit capable of allowing gas containing the detection target to flow in and out of the outer accommodating unit. The outer cover 20F is formed of, for example, a resin material having a light shielding property, and includes an outer cover body 21F, a top surface portion 22F, and a rib portion 23F as illustrated in FIG. 32 to FIG. 34.

Among these portions, the outer cover body 21F is a basic structure of the outer cover 20F. The outer cover body 21F is formed of, for example, a substantially hollow cylindrical body whose upper surface and lower surface are open, is disposed so that an upper end portion of the outer cover body 21F comes into contact with a lower surface of the attachment base 10F as illustrated in FIG. 32, and is fixed to the attachment base 10F by a fitting structure (or a fixing tool), etc.

In addition, the top surface portion 22F is a partition unit that partitions the inflow space 40F. The top surface portion 22F is formed of, for example, a substantially circular plate-shaped body, and is provided substantially horizontally below the outer cover body 21F as illustrated in FIG. 32 to FIG. 34.

In addition, the rib portion 23F is a partition unit that partitions the inflow space 40F. The rib portion 23F is formed of a substantially plate-shaped body, and is provided vertically between the outer cover body 21F and the top surface portion 22F. Specifically, as illustrated in FIG. 32 and FIG. 34, a plurality of rib portions 23F is provided radially from the vicinity of a center of the outer cover 20F, and is connected to the outer cover body 21F and the top surface portion 22F. Details of a configuration of the outer cover 20F will be described below.

(Configuration—Inflow Space)

Returning to FIG. 32, the inflow space 40F is a space for guiding gas flowing into the outer cover 20F to an inflow portion of gas in the inner cover 30F (a first opening 30aF described below). As illustrated in FIG. 32 and FIG. 34, a gap between the top surface portion 22F and the inner cover 30F in an internal space of the outer cover 20F is formed as the inflow space 40F.

(Configuration—Inner Cover)

The inner cover 30F is an inner accommodating unit that accommodates the detection space 60F, the detector cover 70F, the detector body 80F, and the substrate 100F, is an inner accommodating unit capable of allowing gas containing the detection target to flow in and out of the inner accommodating unit, and is a partition unit that partitions the inflow space 40F. The inner cover 30F is, for example, a substantially hollow cylindrical body whose upper surface is opened, is formed of a resin material having a light shielding property, and is provided so that a lower side portion of the inner cover 30F faces the top surface portion 22F of the outer cover 20F through the inflow space 40F on the inside of the outer cover 20F as illustrated in FIG. 34. In addition, as illustrated in FIG. 34, the first opening 30aF is formed in the lower side portion of the inner cover 30F. The first opening 30aF is an opening for allowing gas flowing into the outer cover 20F to flow into the inner cover 30F, and is provided in a substantially central portion and a vicinity thereof in a side portion on the opposite side from a side portion on the installation surface 2F side (a lower side portion of the inner cover 30F in FIG. 34) among side portions of the inner cover 30F as illustrated in FIG. 34. The "outer cover 20F", the "inner cover 30F", and the "lower cover 90F" described above correspond to an "accommodating unit" in the claims.

(Configuration—Detection Space)

The detection space 60F is a space for detecting a detection target. As illustrated in FIG. 34, a space surrounded by the detector cover 70F and the detector body 80F in an internal space of the inner cover 30F is formed as the detection space 60F.

(Configuration—Detector Cover)

The detector cover 70F is a first incidence suppressing unit that suppresses incidence of ambient light into the detection space 60F, is capable of allowing gas containing the detection target to flow into and out of the first incidence suppressing unit, and is the first incidence suppressing unit that covers a part of the detection space 60F. The detector cover 70F is a substantially hollow cylindrical body whose upper surface is open, and is formed of a resin material having a light shielding property. In addition, as illustrated in FIG. 34, the detector cover 70F is disposed so that a lower side portion of the detector cover 70F faces the top surface portion 22F of the outer cover 20F through the first opening 30aF and the inflow space 40F on the inside of the inner cover 30F, and is fixed to the detector body 80F. In addition, as illustrated in FIG. 34, a second opening 70aF is formed in a lower side portion of the detector cover 70F. The second opening 70aF is an opening for allowing gas flowing into the inner cover 30F to flow into the detection space 60F, and is provided in a portion corresponding to the first opening 30aF in a side portion on the opposite side from a side portion on the installation surface 2F side (a lower side portion in FIG. 34) among side portions of detector cover 70F as illustrated in FIG. 34.

(Configuration—Insect Screen)

The insect screen 50F is a net for preventing insects present outside the fire detection apparatus 1F from intruding into the detection space 60F. The insect screen 50F is configured using a mesh-like and circular net, and is attached to the detector cover 70F as illustrated in FIG. 34.

(Configuration—Detector Body)

The detector body 80F is a second incidence suppressing unit that suppresses incidence of ambient light into the detection space 60F, is capable of allowing gas containing the detection target to flow into and out of the second incidence suppressing unit, and is the second incidence suppressing unit that covers a part of the detection space 60F. The detector body 80F is, for example, a thick plate-shaped body (as an example, a substantially circular plate-shaped body) formed of a resin material having a light shielding property, is provided on the installation surface 2F side of the detector cover 70F (upper side in FIG. 34), specifically is disposed to cover an upper surface of the detector cover 70F as illustrated in FIG. 34, and is fixed to the substrate 100F by a fixing tool, etc. The "detector cover 70F" and the "detector body 80F" described above correspond to an "incidence suppressing unit" in the claims.

(Configuration—Lower Cover)

The lower cover 90F is a cover unit that covers a side surface of the inner cover 30F on the installation surface 2F side. The lower cover 90F has a substantially hollow cylindrical shape whose lower surface is open, and is formed of, for example, a resin material having a light shielding property. In addition, as illustrated in FIG. 34, the lower cover 90F is provided to cover the inner cover 30F from above, is fixed to the outer cover 20F by a fitting structure, etc., and is fixed to the attachment base 10F by a fixing tool, etc. through a first attachment hole (not illustrated) formed in an attachment member 91F.

(Configuration—Substrate) The substrate 100F is a mounting unit on which various electric circuits (not illustrated) are mounted. The substrate 100F is configured using, for example, a known flat plate-shaped circuit board, etc., is disposed substantially horizontally at intervals from an upper end portion and a lower end portion of the lower cover 90F in the lower cover 90F as illustrated in FIG. 34, and is fixed to the lower cover 90F by a fixing tool through an attachment hole (not illustrated) formed in the lower cover 90F and a second attachment hole (not illustrated) formed in the attachment member 91F.

Further, in addition to the fact that a known component (electric component) used for the conventional fire detection apparatus 1F is mounted on the substrate 100F, the first light emitting unit (not illustrated), the second light emitting unit (not illustrated), the light receiving unit (not illustrated), a heat detection unit 110F, a display unit (not illustrated), a communication unit (not illustrated), a power supply unit (not illustrated), a control unit (not illustrated), and a storage unit (not illustrated) are mounted on the substrate 100F.

(Configuration—Substrate—First Light Emitting Unit, Second Light Emitting Unit, and Light Receiving Unit)

Among these units, the first light emitting unit is a first light emitting unit that irradiates the detection space 60F with detection light (hereinafter referred to as "first detection light"), and is configured using, for example, a known light emitting element (as an example, an infrared LED, etc.). In addition, the second light emitting unit is a second light emitting unit that irradiates the detection space 60F with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 6, installation is performed to be able to avoid direct reception of the first detection light or the second detection light irradiated from the first light emitting unit or the second light emitting unit through various optical path holes of the detector body 80F. For example, the first light emitting unit and the light receiving unit are installed at positions at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at positions at which an angle between an optical axis of the second light emitting unit (hereinafter referred to as a "second light emitting-side optical axis") and the light receiving-side optical axis is about 90°.

(Configuration—Substrate—Heat Detection Unit, Display Unit, Communication Unit, and Power Supply Unit)

In addition, the heat detection unit 110F is a heat detection unit that detects a fire. The heat detection unit 110F is configured using, for example, a known heat detection element (as an example, a thermistor, etc.), and is disposed such that a part of the heat detection unit 110F is exposed to the outside of the fire detection apparatus 1F through an insertion hole (not illustrated) provided in each of the inner cover 30F, the detector cover 70F, and the detector body 80F and an insertion hole 120F of the outer cover 20F described below as illustrated in FIG. 32 to FIG. 34. In addition, the display unit is a display unit that displays various kinds of information (for example, information indicating the presence or absence of detection of a fire), and is configured using, for example, a known display unit (an LED, etc.). A light projection method of the display unit is arbitrary. Examples thereof include light projection by guiding light from the display unit toward the outside of the fire detection apparatus 1F through a light guide (not illustrated) inserted into an insertion hole provided in each of the inner cover 30F, the detector cover 70F, and the detector body 80F and the insertion hole 120F of the outer cover 20F described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1F.

(Configuration—Substrate—Control Unit and Storage Unit)

In addition, the control unit is a control unit that controls the fire detection apparatus 1F. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores a program and various data necessary for an operation of the fire detection apparatus 1F. The storage unit is configured using a rewritable recording medium. For example, it is possible to use a non-volatile recording medium such as a flash memory.

(Configuration—Details of Configuration of Outer Cover)

Returning to FIG. 32, next, a description will be given of details of a configuration of the outer cover 20F. However, the outer cover 20F can be manufactured in any shape using any method and material, unless otherwise specified.

In Embodiment 6, as illustrated in FIG. 32 to FIG. 34, the insertion hole 120F and a guard portion 130F are provided in the top surface portion 22F of the outer cover 20F.

(Configuration—Details of Configuration of Outer Cover—Insertion Hole)

Returning to FIG. 33, the insertion hole 120F is a through-hole for exposing a part of the heat detection unit 110F to the outside of the fire detection apparatus 1F and irradiating display light from the display unit to the outside of the fire detection apparatus 1F.

In addition, a specific shape and size of the insertion hole 120F are arbitrary. In Embodiment 6, as illustrated in FIG. 33, a planar shape of the insertion hole 120F is set to a substantially elliptical shape (or may be a polygonal shape such as a quadrangular shape). In addition, a diameter of the insertion hole 120F is set to a size at which only a part of the heat detection unit 110F can be exposed to the outside and display light can be irradiated to the outside of the fire detection apparatus 1F. For example, the diameter is set to be longer than a sum of a diameter of the heat detection unit 110F and a diameter of the light guide.

(Configuration—Details of Configuration of Outer Cover—Guard Portion)

Returning to FIG. 32, the guard portion 130F is a guard unit that protects the heat detection unit, and includes a first guard-side rib 131F, a second guard-side rib 132F, a third guard-side rib 133F, a fourth guard-side rib 134F, and a guard-side connecting portion 135F as illustrated in FIG. 32 to FIG. 34.

(Configuration—Details of Configuration of Outer Cover—Guard Portion—First Guard-Side Rib to Fourth Guard—Side Rib)

Returning to FIG. 33, the first guard-side rib 131F, the second guard-side rib 132F, the third guard-side rib 133F, and the fourth guard-side rib 134F correspond to a basic structure of the guard portion 130F. Each of the first guard-side rib 131F, the second guard-side rib 132F, the third guard-side rib 133F, and the fourth guard-side rib 134F is formed of a long plate-shaped body, and provided to cover a portion exposed to the outside of the fire detection apparatus 1F in the heat detection unit 110F and a periphery of the insertion hole 120F as illustrated in FIG. 33 and FIG. 34. Specifically, each of the first guard-side rib 131F, the second guard-side rib 132F, the third guard-side rib 133F, and the fourth guard-side rib 134F is provided such that a longitudinal direction of each of the guard-side ribs extends substantially along the vertical direction (slightly inclined in FIG. 34), and erected with respect to a lower surface of the top surface portion 22F.

(Configuration—Details of Configuration of Outer Cover—Guard Portion—Guard—Side Connecting Portion)

Returning to FIG. 33, the guard-side connecting portion 135F is a connection unit that connects the first guard-side rib 131F, the second guard-side rib 132F, the third guard-side rib 133F, and the fourth guard-side rib 134F. The guard-side connecting portion 135F is formed of, for example, the same material as that of the outer cover 20F, and connected to a vicinity of a distal end portion of each of the first guard-side rib 131F, the second guard-side rib 132F, the third guard-side rib 133F, and the fourth guard-side rib 134F as illustrated in FIG. 33 and FIG. 34.

(Configuration—Incidence Suppression Structure)

A description will be given of an incidence suppression structure of the fire detection apparatus 1F. FIG. 35 is a cross-sectional view taken along B-B line of FIG. 33. FIG. 36 is an enlarged view of a part around an area C of FIG. 35. In FIG. 35 and FIG. 36, a straight line LF extended in the left direction from a boundary 150F described below is indicated by a dotted line. The fire detection apparatus 1F includes an incidence suppression structure for suppressing incidence of ambient light into the detection space 60F. In Embodiment 6, a feature of this incidence suppression structure is described below.

(Configuration—Incidence Suppression Structure—First Feature)

First, with regard to a first feature of the incidence suppression structure, a light shielding wall 140F is included as illustrated in FIG. 35 and FIG. 36.

(Configuration—Incidence Suppression Structure—First Feature—Light Shielding Wall)

The light shielding wall 140F is used to suppress incidence of ambient light through the boundary 150F between the detector cover 70F and the detector body 80F. As illustrated in FIG. 35 and FIG. 36, the light shielding wall 140F is provided to surround the detector cover 70F and the detector body 80F inside the outer cover 20F, and includes a first light shielding wall 141F and a second light shielding wall 142F.

In these light shielding walls, the first light shielding wall 141F is a part of a basic structure of the light shielding wall 140F. The first light shielding wall 141F is formed in a cylindrical shape, and is provided on the lower cover 90F. Specifically, as illustrated in FIG. 36, the first light shielding wall 141F is disposed to protrude downward from the lower cover 90F and disposed to surround the detector cover 70F and the detector body 80F. In addition, the second light shielding wall 142F is another part of the basic structure of the light shielding wall 140F. The second light shielding wall 142F is formed in a cylindrical shape, and is provided on a side portion on the opposite side from the installation surface 2F side among the side portions of the inner cover 30F (lower side portion of the inner cover 30F in FIG. 36). Specifically, as illustrated in FIG. 36, the second light shielding wall 142F is disposed to protrude upward from the lower side portion of the inner cover 30F and disposed to surround the detector cover 70F and the detector body 80F.

In addition, a specific configuration of the light shielding wall 140F is arbitrary. In Embodiment 6, the light shielding wall 140F is configured such that the boundary 150F and the light shielding wall 140F (specifically, the first light shielding wall 141F and the second light shielding wall 142F) overlap each other when viewed from a direction orthogonal to the installation surface 2F (specifically, a side).

Specifically, the first light shielding wall 141F is configured such that the boundary 150F is located on the installation surface 2F side (upper side in FIG. 36) of a distal end of the first light shielding wall 141F. More specifically, a vertical length of the first light shielding wall 141F is set to be longer than a length from the lower cover 90F to the boundary 150F. In addition, the second light shielding wall 142F is configured such that the boundary 150F is located on the opposite side from the installation surface 2F side (lower side in FIG. 36) of a distal end of the second light shielding wall 142F. More specifically, a vertical length of the second light shielding wall 142F is set to be longer than a length from the lower side portion of the inner cover 30F to the boundary 150F. According to such a configuration, it is possible to suppress incidence of ambient light into the detection space 60F through the boundary 150F by the first light shielding wall 141F and the second light shielding wall 142F, and it is possible to inhibit internal light exiting to the outside through the boundary 150F from entering through the boundary 150F.

According to such a first feature, it is possible to inhibit ambient light from entering the detection space 60F through the boundary 150F by the light shielding wall 140F, it is possible to inhibit internal light exiting to the outside through the boundary 150F from entering through the boundary 150F, and it is possible to maintain detection accuracy of the fire detection apparatus 1F.

(Configuration—Incidence Suppression Structure—Second Feature)

Next, with regard to a second feature of the incidence suppression structure, the first light shielding wall 141F and the second light shielding wall 142F are configured such that the inner cover 30F and the lower cover 90F can be fit to each other through the first light shielding wall 141F and the second light shielding wall 142F.

Specifically, at least one or more first protrusions (not illustrated) are provided on an inner side surface of the second light shielding wall 142F, and at least one or more first notch portions (not illustrated) which are located at portions corresponding to the first protrusions on the first light shielding wall 141F and to which the first protrusions can be fit are provided. In addition, at least one or more second protrusions (not illustrated) are provided on an outer side surface of the first light shielding wall 141F, and at least one or more second notch portions (not illustrated) which are located at portions corresponding to the second protrusions on the inner side surface of the second light shielding wall 142F and to which the second protrusions can be fit are provided. However, the invention is not limited thereto. For example, the first protrusions and the first notch portions may be omitted, and the second protrusions and the second notch portions may be omitted.

According to such a second feature, it is possible to fit the inner cover 30F and the lower cover 90F to each other through the first light shielding wall 141F and the second light shielding wall 142F, and it is possible to firmly connect the inner cover 30F and the lower cover 90F to each other.

(Configuration—Incidence Suppression Structure—Third Feature)

Returning to FIG. 35, next, with regard to a third feature of the incidence suppression structure, as illustrated in FIG. 35, the detector cover 70F and the inner cover 30F are integrally formed such that a peripheral portion of the first opening 30aF in a side portion on the opposite side from the side portion on the installation surface 2F side (lower side portion of the inner cover 30F in FIG. 35) in the inner cover 30F and a peripheral portion of the second opening 70aF in a side portion on the opposite side from a side portion on the installation surface 2F side (lower side portion of the detector cover 70F in FIG. 35) in the detector cover 70F are continuous.

Specifically, the peripheral portion of the first opening 30aF in the lower side portion of the inner cover 30F and the peripheral portion of the second opening 70aF in the lower side portion of the detector cover 70F are formed to be continuous by injection-molding a resin having a light shielding property, etc. Meanwhile, another part other than the peripheral portion of the first opening 30aF in the lower side portion of the inner cover 30F and another part other than the peripheral portion of the second opening 70aF in the lower side portion of the detector cover 70F are formed to be discontinuous, and another side portion other than the lower side portion of the inner cover 30F and another side portion other than the lower side portion of the detector cover 70F are formed to be discontinuous.

According to such a third feature, it is possible to inhibit a gap from being formed between the peripheral portion of the first opening 30aF in the inner cover 30F and the peripheral portion of the second opening 70aF in the detector cover 70F, and it is possible to suppress incidence of ambient light or internal light into the detection space 60F.

(Configuration—Incidence Suppression Structure—Fourth Feature)

Next, with regard to a fourth feature of the incidence suppression structure, as illustrated in FIG. 35, an outer diameter of the detector cover 70F is set to increase toward the installation surface 2F.

Specifically, an inclination angle of a side portion on the side among side portions of the detector cover 70F is set to a size that is about 45 degrees. However, the invention is not limited thereto. For example, the inclination angle of the side portion on the side may be to a size that is an angle larger than 45 degrees and smaller than 90 degrees, or the inclination angle of the side portion on the side may be to a size that is an angle larger than 0 degree and smaller than 45 degrees.

According to such a fourth feature, the side portion on the side among the side portions of the detector cover 70F can be formed in a tapered shape, and ambient light or internal light entering the detector cover 70F can be effectively attenuated.

(With Regard to Action of Fire Detection Apparatus)

Next, a description will be given of an action of the fire detection apparatus 1F configured as described above.

That is, for example, when ambient light attempts to enter the detection space 60F through the boundary 150F between the detector cover 70F and the detector body 80F in a state in which the fire detection apparatus 1F is attached to the installation surface 2F, incidence of the ambient light is blocked by the first light shielding wall 141F or the second light shielding wall 142F, and the ambient light is inhibited from entering the detection space 60F through the boundary 150F.

In addition, when internal light exiting to the outside through the boundary 150F attempts to enter the detection space 60F through the boundary 150F, incidence of the internal light is blocked by the first light shielding wall 141F or the second light shielding wall 142F, and the internal light is inhibited from entering the detection space 60F through the boundary 150F.

Effect of Embodiment 6

As described above, according to Embodiment 6, since the accommodating unit which accommodates the incidence suppressing unit and can allow gas to flow in and out of the accommodating unit, and the light shielding wall 140F provided to surround the incidence suppressing unit on the inside of the accommodating unit are included, the incidence suppressing unit includes the detector cover 70F that covers a part of the detection space 60F and the detector body 80F provided on the installation surface 2F side of the detector cover 70F to cover another part of the detection space 60F, and the light shielding wall 140F is configured such that the boundary 150F between the detector cover 70F and the detector body 80F and the light shielding wall 140F overlap each other when viewed from the direction orthogonal to the installation surface 2F, it is possible to suppress incidence of ambient light into the detection space 60F through the boundary 150F by the light shielding wall 140F, it is possible to inhibit internal light exiting to the outside through the boundary 150F from entering through the boundary 150F, and it is possible to maintain the detection accuracy of the fire detection apparatus 1F.

In addition, since the light shielding wall 140F includes the first light shielding wall 141F provided on the lower cover 90F and configured such that the boundary 150F is located on the installation surface 2F side of the distal end of the first light shielding wall 141F, it is possible to suppress incidence of ambient light into the detection space 60F through the boundary 150F by the first light shielding wall 141F, it is possible to inhibit internal light exiting to the outside through the boundary 150F from entering through the boundary 150F, and it becomes easy to maintain the detection accuracy of the fire detection apparatus 1F.

In addition, since the light shielding wall 140F includes the second light shielding wall 142F provided on the side portion on the opposite side from the installation surface 2F side among the side portions of the inner cover 30F and configured such that the boundary 150F is located on the opposite side from the installation surface 2F side of the distal end of the second light shielding wall 142F, it is possible to suppress incidence of ambient light into the detection space 60F through the boundary 150F by the second light shielding wall 142F, it is possible to inhibit internal light exiting to the outside through the boundary 150F from entering through the boundary 150F, and it becomes easy to maintain the detection accuracy of the fire detection apparatus 1F.

In addition, since the light shielding wall 140F includes the first light shielding wall 141F provided on the lower cover 90F and the second light shielding wall 142F provided on the side portion on the opposite side from the installation surface 2F side among the side portions of the inner cover 30F, and the first light shielding wall 141F and the second light shielding wall 142F are configured such that the inner cover 30F and the lower cover 90F can be fit to each other through the first light shielding wall 141F and the second light shielding wall 142F, it is possible to fit the inner cover 30F and the lower cover 90F to each other through the first light shielding wall 141F and the second light shielding wall 142F, and it is possible to firmly connect the inner cover 30F and the lower cover 90F to each other.

In addition, since the incidence suppressing unit and the inner cover 30F are integrally formed such that the peripheral portion of the first opening 30aF in the side portion on the opposite side from the side portion on the installation surface 2F side in the inner cover 30F and the peripheral portion of the second opening 70aF in the side portion on the opposite side from the side portion on the installation surface 2F side in the incidence suppressing unit are continuous, it is possible to inhibit a gap from being formed between the peripheral portion of the first opening 30aF in the inner cover 30F and the peripheral portion of the second opening 70aF in the incidence suppressing unit, and it is possible to suppress incidence of ambient light or internal light into the detection space 60F.

In addition, since the outer diameter of the incidence suppressing unit is set to increase toward the installation surface 2F, the side portion on the side among the side portions of the incidence suppressing unit can be formed in a tapered shape, and ambient light or internal light entering the incidence suppressing unit can be effectively attenuated.

[III] Modifications to Embodiments

As mentioned above, even though Embodiment 1 to Embodiment 6 according to the invention have been described, a specific structure and the units of the invention can be arbitrarily modified and improved within the range of the technical idea of each invention described in the claims. Hereinafter, such a modification will be described.

Modification to Embodiment 1

First, a modification of Embodiment 1 will be described.
(With Regard to Problems to be Solved and Effects of Invention)

First, problems to be solved by the invention and effects of the invention are not limited to the above contents, and may differ depending on the details of the implementation environment and configuration of the invention, and only some of the problems described above may be solved and only some of the effects described above may be achieved.
(With Regard to Insect Screen)

Embodiment 1 describes that the insect screen 50A is formed in the circular shape. However, the invention is not limited thereto. For example, the insect screen 50A may be formed in a polygonal shape such as a quadrangular shape or an elliptical shape. In this case, the first opening 30aA or the second opening 70aA may be formed in a shape corresponding to the insect screen 50A.

In addition, Embodiment 1 describes that the insect screen 50A is provided on the detector cover 70A. However, the invention is not limited thereto. For example, the insect screen 50A may be provided on the outer cover 20A in addition to the detector cover 70A (as described below, this description is applied to a case in which the insect screen 50A is provided on the inner cover 30A of FIGS. 5A and 5B). Here, a specific configuration of the insect screen 50A provided on the outer cover 20A is arbitrary. For example, the insect screen 50A may be formed of a cylindrical body which can cover a periphery of the outer cover 20A. In addition, a hole diameter of the insect screen 50A may be set to be larger than or equal to a hole diameter of the insect screen 50A of the detector cover 70A.
(With Regard to Attachment Structure of Insect Screen)

Embodiment 1 describes that the insect screen 50A, the first opening 30aA, and the detector cover 70A are configured such that the insect screen 50A can be attached to and detached from the detector cover 70A through the first opening 30aA. However, the invention is not limited thereto. For example, the portions may be configured such that the insect screen 50A may not be attached to and detached from the detector cover 70A through the first opening 30aA. As an example, the insect screen 50A may be installed to cover the entire second opening 70aA from the inside of the detector cover 70A in the lower end portion of the detector cover 70A. In this case, a maintenance method of the insect screen 50A may be carried out by the same method as a method in a case in which the insect screen 50A is fit to the extent that the insect screen 50A does not fall off the recess 110A.

In addition, Embodiment 1 describes that the insect screen 50A is provided to substantially cover the entire second opening 70aA in the detector cover 70A (specifically, the recess 110A). However, the invention is not limited thereto. FIGS. 5A and 5B are diagrams illustrating a modification of the inner cover 30A, in which FIG. 5A is a bottom view and FIG. 5B is a cross-sectional view taken along B-B line of FIG. 5A. FIG. 6 is a diagram illustrating an enlarged view of an area of the first opening 30aA of FIGS. 5A and 5B. For example, as illustrated in FIGS. 5A and 5B and FIG. 6, the insect screen 50A may be provided to substantially cover the entire first opening 30aA in the inner cover 30A. In this case, for example, the insect screen 50A and the inner cover 30A may be configured such that the insect screen 50A can be attached to and detached from the inner cover 30A.

Here, a specific configuration of the inner cover 30A is arbitrary. As an example, as illustrated in FIGS. 5A and 5B and FIG. 6, a recess 130A, a first pinching portion 131A, and a second pinching portion 132A may be provided in a peripheral portion of the first opening 30aA in the lower side portion of the inner cover 30A (such a configuration may be applied to a configuration of the detector cover 70A at the time of providing the insect screen 50A on the detector cover 70A). Among these portions, the recess 130A is a recess which accommodates the insect screen 50A and to and from which an entire edge end portion of the insect screen 50A can be attached and detached by the recess 130A, configured substantially similarly to the recess 110A, and formed in the peripheral portion of the first opening 30aA. In addition, the first pinching portion 131A is a pinching unit that detachably pinches a part of the edge end portion (left side part in FIGS. 5A and 5B) of the insect screen 50A and configured by forming a part of the lower side portion (left side part in FIGS. 5A and 5B) of the inner cover 30A such that a cross section along an X-Z plane has a U-shape. In addition, the second pinching portion 132A is a pinching unit that detachably pinches another part of the edge end portion of the insect screen 50A and configured by forming another part of the lower side portion (right side part in FIGS. 5A and 5B) of the inner cover 30A such that a cross section along the X-Z plane has a U-shape. In addition, a specific configuration of the second pinching portion 132A is arbitrary. For example, the portion may be configured such that a pinching amount of the insect screen 50A by the second pinching portion 132A is larger than a pinching amount of the insect screen 50A by the first pinching portion 131A. As an example, as illustrated in FIG. 5A, a size of a planar shape of the second pinching portion 132A may be set to be larger than a size of a planar shape of the first pinching portion 131A. Alternatively, as illustrated in FIG. 6, a depth of a recess part of the second pinching portion 132A may be set to be larger than a depth of a recess part of the first pinching portion 131A. In addition, a specific configuration of the insect screen 50A is arbitrary. For example, the diameter of the insect screen 50A is slightly larger than the diameter of the first opening 30aA so that the insect screen 50A is easily attached to the first pinching portion 131A and the second pinching portion 132A, the insect screen 50A is flexible, and the insect screen 50A may be configured using a thin known insect screen. According to the above configuration, when the insect screen 50A is attached to the inner cover 30A, as illustrated in FIG. 6, after the insect screen 50A (a part corresponding to an imaginary line in FIG. 6) is pinched in the second pinching portion 132A while being curved from an outside (lower side in FIGS. 5A and 5B) of the inner cover 30A, the insect screen 50A may be pinched in the first pinching portion 131A (however, the invention is not limited thereto, and after the insect screen 50A is pinched in the second pinching portion 132A from an inside (upper side in FIGS. 5A and 5B) of the inner cover 30A, the insect screen 50A may be pinched in the first pinching portion 131A). Therefore, since the insect screen 50A can be attached to and detached from the inner cover 30A without removing the inner cover 30A, it is possible to easily perform a maintenance operation of the insect screen 50A, and it is possible to further improve efficiency of the maintenance operation of the insect screen 50A. In addition, since the insect screen 50A is pinched by the first pinching portion 131A and the second pinching portion 132A, it is possible to easily attach and detach the insect screen 50A to and from the inner cover 30A while firmly attaching the insect screen 50A to the inner cover 30A. In addition, since each of the insect screen 50A and the first opening 30aA is formed in a circular shape, it is possible to enhance manufacturability of the insect screen 50A and the inner cover 30A while processing accuracy of the insect screen 50A and the first opening 30aA is easily ensured when compared to another shape. In addition, the dependency of the inflow direction of the detection target can be relatively reduced. In particular, it becomes easy to allow the detection target to flow into the detection space in almost the same manner and at almost the same timing from any direction in the circumferential direction. In this case, the fall prevention portion 120A may be configured such that the insect screen 50A can prevent falling off from the inner cover 30A. For example, a vertical length of the fall prevention portion 120A may be set to a length in which the upper end portion of the fall prevention portion 120A can come into contact with the insect screen 50A.

In addition, Embodiment 1 describes that the fall prevention portion 120A is formed of the second rib portion 24A. However, the invention is not limited thereto. For example, the fall prevention portion 120A may be formed of a portion other than the second rib portion 24A in a portion of the outer cover 20A. As an example, the fall prevention portion 120A may be formed of the first rib portion 23A. Alternatively, the fall prevention portion 120A may be formed of another member other than the outer cover 20A. As an example, the fall prevention portion 120A may be formed of a resin material attached to the outer cover 20A.

In addition, Embodiment 1 describes that the fall prevention portion 120A is provided. However, the invention is not limited thereto. For example, in a case in which the insect screen 50A is fit to the recess 110A so as not to fall off, the fall prevention portion 120A may be omitted.

Modification to Embodiment 2

Next, a description will be given of a modification of Embodiment 2.
(With Regard to Problems to be Solved and Effects of Invention)

First, problems to be solved by the invention and effects of the invention are not limited to the above contents, and may differ depending on the details of the implementation environment and configuration of the invention, and only some of the problems described above may be solved and only some of the effects described above may be achieved.
(With Regard to Inflow Structure of Gas)

Embodiment 2 describes that the inflow structure of gas is applied to the fire detection apparatus 1B in which the detection space 60B and the inflow space 40B are arranged in parallel in the vertical direction. However, the invention is not limited thereto. For example, the inflow structure of gas may be applied to the fire detection apparatus 1B in which the detection space 60B and the inflow space 40B are arranged in parallel in the horizontal direction.
(With Regard to Rib)

Embodiment 2 describes that the number of installed ribs 110B is eight. However, the invention is not limited thereto. For example, the number may be two or more and fewer than eight or may be nine or more.

In addition, Embodiment 2 describes that the first rib 111B to the fourth rib 114B are provided. However, the invention is not limited thereto. For example, at least one or more of the first rib 111B to the fourth rib 114B may be omitted. In addition, Embodiment 2 describes that the fifth rib 115B to the eighth rib 118B are provided. However, the invention is not limited thereto. For example, at least one or more of the fifth rib 115B to the eighth rib 118B may be omitted.

In addition, Embodiment 2 describes that some of the first rib 111B to the eighth rib 118B are disposed not to come into contact with another rib 110B. However, the invention is not limited thereto. FIG. 11 and FIG. 12 are perspective views illustrating a modification of the outer cover 20B. For example, as illustrated in FIG. 11 and FIG. 12, all the first rib 111B to the eighth rib 118B may be disposed not to come into contact with another rib 110B. In this way, when compared to a case in which each of the plurality of ribs 110B is disposed to come into contact with another rib 110B, it is possible to suppress an excessive increase in pressure of gas in the inflow portion in the inner cover 30B, and it becomes easy to ensure the inflow property of gas into the inner cover 30B.

In addition, Embodiment 2 describes that some of the first rib 111B to the eighth rib 118B are disposed to come into contact with another rib 110B. However, the invention is not limited thereto. FIG. 13 is a perspective view illustrating a modification of the outer cover 20B. For example, as illustrated in FIG. 13, all the first rib 111B to the eighth rib 118B may be disposed to come into contact with another rib 110B.

In addition, Embodiment 2 describes that the first rib 111B to the eighth rib 118B are configured such that gas flowing into the inflow space partitioned by the first rib 111B to the fourth rib 114B does not directly flow out to another inflow space. However, the invention is not limited thereto. For example, the first rib 111B to the eighth rib 118B may be configured such that gas flowing into the inflow space partitioned by the first rib 111B to the fourth rib 114B directly flows out to another inflow space (however, an outflow amount is extremely little) (that is, the portions may be configured such that a gap is formed between the rib 110B and the lower side portion of the inner cover 30B or the top surface portion 22B of the outer cover 20B). In this case, heights of the first rib 111B to the fourth rib 114B may be set to be shorter than the vertical length of the inflow space 40B. Alternatively, the first rib 111B to the fourth rib 114B may be disposed such that the upper end portion or the lower end portion of each of the first rib 111B to the fourth rib 114B does not come into contact with the lower side portion of the inner cover 30B or the top surface portion 22B of the outer cover 20B.

In addition, Embodiment 2 describes that the first rib 111B to the eighth rib 118B are formed integrally with the outer cover 20B. However, the invention is not limited thereto. For example, the first rib 111B to the eighth rib 118B may be formed integrally with the inner cover 30B. Alternatively, some ribs of the first rib 111B to the eighth rib 118B may be formed integrally with one of the outer cover 20B or the inner cover 30B, and some other ribs of the first rib 111B to the eighth rib 118B may be formed integrally with the other one of the outer cover 20B or the inner cover 30B. Alternatively, the first rib 111B to the eighth rib 118B may be formed separately from the outer cover 20B.

Modification to Embodiment 3

Next, a description will be given of a modification of Embodiment 3.
(With Regard to Problems to be Solved and Effects of Invention)
First, problems to be solved by the invention and effects of the invention are not limited to the above contents, and may differ depending on the details of the implementation environment and configuration of the invention, and only some of the problems described above may be solved and only some of the effects described above may be achieved.
(With Regard to Fire Detection Apparatus)
Embodiment 3 describes that the outer cover 20C, the inner cover 30C, and the terminal board 90C are separately formed. However, the invention is not limited thereto. For example, at least two of the outer cover 20C, the inner cover 30C, or the terminal board 90C may be integrally formed.

In addition, Embodiment 3 describes that the fire detection apparatus 1C includes the inner cover 30C. However, the invention is not limited thereto. For example, the inner cover 30C may be omitted.
(With Regard to Terminal Board)
Embodiment 3 describes that the nameplate seal 95C is provided on the terminal board 90C. However, the invention is not limited thereto. For example, the nameplate seal 95C may be omitted.

In addition, Embodiment 3 describes that the number of installed connection terminal portions 91C is three. However, the invention is not limited thereto. For example, the number may be only one or only two, or may be four or more.
(With Regard to Drainage Structure)
Embodiment 3 describes that a part of the installation surface-side side portion 96C is formed in the non-horizontal shape. However, the invention is not limited thereto. For example, the entire installation surface-side side portion 96C may be formed in the non-horizontal shape.

In addition, Embodiment 3 describes that the inflow prevention portion 98C is provided on the installation surface-side side portion 96C. However, the invention is not limited thereto. For example, in a case in which even when water droplets accumulated on the nameplate seal 95C flow out to the outside, there is no concern that the water droplets that have flowed out may flow into the first connection terminal portion 92C, the second connection terminal portion 93C, and the third connection terminal portion 94C, the inflow prevention portion 98C may be omitted.

In addition, Embodiment 3 describes that the inclination angle θ1C of the part corresponding to the inside of the installation surface-side side portion 96C in the non-horizontal portion 97C is set to be different from the inclination angle θ2C of the part corresponding to the outside of the installation surface-side side portion 96C in the non-horizontal portion 97C. However, the invention is not limited thereto. FIG. 19 is a diagram illustrating a modification of the terminal board 90C and is a diagram illustrating an area corresponding to FIG. 18. For example, as illustrated in FIG. 19, the inclination angle θ1C of the part corresponding to the inside of the installation surface-side side portion 96C in the non-horizontal portion 97C, the inclination angle θ2C of the part corresponding to the outside of the installation surface-side side portion 96C in the non-horizontal portion 97C, and an inclination angle θ4C of a part located between the part corresponding to the inside and the part corresponding to the outside may be set to be different from one another. As an example, the inclination angle θ1C may be set to be smaller than the inclination angle θ2C, and the inclination angle θ4C may be set to be smaller than the inclination angle θ1C (an angle almost close to 0° in FIG. 19). According to such a configuration, a drainage speed may be reduced when compared to the terminal board 90C of FIG. 18.

In addition, Embodiment 3 describes that the non-horizontal portion 97C is formed such that the non-horizontal portion 97C is inclined in one direction (specifically, a direction from an end portion of the non-horizontal portion 97C on the nameplate seal 95C side to an end portion thereof on the outer cover 20C side). However, the invention is not limited thereto. For example, the non-horizontal portion 97C may be formed such that the non-horizontal portion 97C is inclined in a plurality of directions. As an example, the non-horizontal portion 97C may be formed such that the non-horizontal portion 97C is inclined in the direction from the end portion of the non-horizontal portion 97C on the nameplate seal 95C side to the end portion thereof on the outer cover 20C side and additionally in a direction orthogonal to the direction and directed from an end portion of the first connection terminal portion 92C of the non-horizontal portion 97C to the end portion on the outer cover 20C side. In this way, it is possible to disperse and drain water accumulated on the non-horizontal portion 97C in a plurality of directions, and it is possible to enhance a drainage amount.

Modification to Embodiment 4

Next, a description will be given of a modification of Embodiment 4.
(With Regard to Problems to be Solved and Effects of Invention)
First, problems to be solved by the invention and effects of the invention are not limited to the above contents, and may differ depending on the details of the implementation environment and configuration of the invention, and only some of the problems described above may be solved and only some of the effects described above may be achieved.
(With Regard to Fire Detection Apparatus)
Embodiment 4 describes that the fire detection apparatus 1D includes the inner cover 30D. However, the invention is not limited thereto. For example, the inner cover 30D may be omitted.
In addition, Embodiment 4 describes that the fire detection apparatus 1D includes the first light emitting unit and the second light emitting unit. However, the invention is not limited thereto. For example, one of the first light emitting unit or the second light emitting unit may be omitted.
(With Regard to Fixing Structure)
Embodiment 4 describes that the first fixing portion 111D and the second fixing portion 112D are provided on the detector body 80D, and the first insertion hole 131D and the second insertion hole 132D are provided in the detector cover 70D. However, the invention is not limited thereto. For example, the first fixing portion 111D and the second fixing portion 112D may be provided on the detector cover 70D, and the first insertion hole 131D and the second insertion hole 132D may be provided in the detector body 80D. In this case, the first guide portion 121D and the second guide portion 122D guide the detector body 80D to the first fixing portion 111D or the second fixing portion 112D.
In addition, Embodiment 4 describes that the first fixing portion 111D and the second fixing portion 112D are provided at an interval therebetween. However, the invention is not limited thereto. For example, the portions may be provided adjacent to each other.
In addition, Embodiment 4 describes that the first fixing portion 111D and the second fixing portion 112D are disposed such that the substantially central portion of the detection space 60D is located on the straight line LD. However, the invention is not limited thereto. For example, the portions may be disposed such that the substantially central portion of the detection space 60D is not located on the straight line LD.
In addition, Embodiment 4 describes that the first fixing portion 111D and the second fixing portion 112D are configured such that the sensitivity adjustment tool 150D can be fixed to the first fixing portion 111D and the second fixing portion 112D. However, the invention is not limited thereto. For example, the first fixing portion 111D and the second fixing portion 112D may be configured such that the sensitivity adjustment tool 150D may not be fixed to the first fixing portion 111D and the second fixing portion 112D.
(With Regard to Fixing Unit)
Embodiment 4 describes that the number of installed fixing units such as the first fixing portions 111D is two. However, the invention is not limited thereto. For example, the number may be one or may be three or more. In this case, the number of installed guide units such as the first guide portions 121D and the number of installed insertion holes such as the first insertion holes 131D are set to the number according to the number of installed fixing units.
(With Regard to Guide Unit)
Embodiment 4 describes that the first guide portion 121D is formed separately from the first fixing portion 111D. However, the invention is not limited thereto. For example, the first guide portion 121D may be formed integrally with the first fixing portion 111D (this description is applied to the second guide portion 122D).
In addition, Embodiment 4 describes that each of the first guide portion 121D and the second guide portion 122D is formed of a hollow and substantially cylindrical body. However, the invention is not limited thereto. For example, the portion may be formed of a hollow conical body or prismatic body. Alternatively, the portion may be formed of a solid or tubular body.
In addition, Embodiment 4 describes that the first guide portion 121D and the second guide portion 122D are provided in the detector body 80D at all times. However, the invention is not limited thereto. For example, in a case in which the longitudinal length of each of the first guide portion 121D and the second guide portion 122D is set to a length in which the inner cover 30D may not be accommodated, the first guide portion 121D and the second guide portion 122D may be removed after the detector cover 70D and the detector body 80D are fixed to each other.

Modification to Embodiment 5

Next, a description will be given of a modification of Embodiment 5.
(With Regard to Problems to be Solved and Effects of Invention)
First, problems to be solved by the invention and effects of the invention are not limited to the above contents, and may differ depending on the details of the implementation environment and configuration of the invention, and only some of the problems described above may be solved and only some of the effects described above may be achieved.
(Application Target of Fire Detection Apparatus)
Embodiment 5 describes that the fire detection apparatus 1E corresponds to the thermal and optical fire detector. However, the invention is not limited thereto. For example, the fire detection apparatus 1E may correspond to an optical fire detector. In this case, it is possible to omit the heat detection unit 101E, the guard portion 130E, and a second fit portion.
(With Regard to Rib)
Embodiment 5 describes that the number of installed ribs 110E is eight. However, the invention is not limited thereto. For example, the number may be fewer than eight or may be nine or more.
(With Regard to Attachment Structure)
Embodiment 5 describes that the attachment structure includes one positioning portion 140E (specifically, the positioning portion 140E capable of guiding light). However, the invention is not limited thereto. For example, the attachment structure may include a plurality of positioning portions 140E. In this case, a display unit corresponding to each of the plurality of positioning portions 140E may be provided.

In addition, Embodiment 5 describes that the protrusion 150E is provided on the inner cover 30E, and the fitting portion 160E is provided on the outer cover 20E. However, the invention is not limited thereto. For example, the protrusion 150E may be provided on the outer cover 20E, and the fitting portion 160E may be provided on the inner cover 30E.

In addition, Embodiment 5 describes that the protrusion 150E is configured as a part of the rib 110E. However, the invention is not limited thereto. For example, the protrusion 150E may be configured as the entire rib 110E. Alternatively, the protrusion 150E may be configured as a member other than the rib 110E (as an example, the protrusion 150E may be simply configured as the protrusion 150E).

In addition, Embodiment 5 describes that the positioning portion 140E is configured to be able to guide light irradiated from the display unit toward the outside of the outer cover 20E. However, the invention is not limited thereto. For example, the positioning portion 140E may be configured not to be able to guide light irradiated from the display unit toward the outside of the outer cover 20E. In addition, a plurality of such positioning portions 140E (specifically, positioning portions 140E incapable of guiding light) may be provided.

In addition, Embodiment 5 describes that the protrusion 150E is formed integrally with the inner cover 30E, and the fitting portion 160E is formed integrally with the outer side cover. However, the invention is not limited thereto. For example, the protrusion 150E or the fitting portion 160E may be formed separately from the protrusion 150E or the fitting portion 160E.

(With Regard to Protrusion)

Embodiment 5 describes that the protrusion 150E has a cylindrical or hollow shape. However, the invention is not limited thereto. For example, the protrusion 150E may have a solid shape such as a plate or rod shape.

Embodiment 5 describes that the fitting portion 160E includes the first fitting portion 161E and the second fitting portion 162E. However, the invention is not limited thereto. For example, the fitting portion 160E may include only one of the first fitting portion 161E or the second fitting portion 162E.

(With Regard to Fitting Portion)

Embodiment 5 describes that the fitting portion 160E (the first fitting portion 161E and the second fitting portion 162E) corresponds to the notch portion. However, the invention is not limited thereto. For example, the fitting portion 160E may have a tubular shape or an annular shape. In this case, the fitting portion 160E may be configured as at least a part of the rib 110E.

Embodiment 5 describes that the second fitting portion 162E is formed integrally with the insertion hole 120E of the top surface portion 22E. However, the invention is not limited thereto. For example, the second fitting portion 162E may be formed separately from the insertion hole 120E of the top surface portion 22E.

Modification to Embodiment 6

Next, a description will be given of a modification of Embodiment 6.

(With Regard to Problems to be Solved and Effects of Invention)

First, problems to be solved by the invention and effects of the invention are not limited to the above contents, and may differ depending on the details of the implementation environment and configuration of the invention, and only some of the problems described above may be solved and only some of the effects described above may be achieved.

(Application Target of Fire Detection Apparatus)

Embodiment 6 describes that the fire detection apparatus 1F corresponds to the thermal and optical fire detector. However, the invention is not limited thereto. For example, the fire detection apparatus 1F may correspond to an optical fire detector. In this case, it is possible to omit the heat detection unit 110F and the guard portion 130F.

(With Regard to Accommodating Unit)

Embodiment 6 describes that the accommodating unit includes the inner cover 30F. However, the invention is not limited thereto. For example, the inner cover 30F may be omitted. In this case, the second light shielding wall 142F may be omitted.

(With Regard to Incidence Suppression Structure)

Embodiment 6 describes that the incidence suppression structure includes the first light shielding wall 141F and the second light shielding wall 142F. However, the invention is not limited thereto. For example, the incidence suppression structure may include only one of the first light shielding wall 141F or the second light shielding wall 142F.

In addition, Embodiment 6 describes that the first light shielding wall 141F and the second light shielding wall 142F are configured such that the inner cover 30F and the lower cover 90F can be fit to each other through the first light shielding wall 141F and the second light shielding wall 142F. However, the invention is not limited thereto. For example, the first light shielding wall 141F and the second light shielding wall 142F may be configured such that the inner cover 30F and the lower cover 90F may not be fit to each other through the first light shielding wall 141F and the second light shielding wall 142F.

In addition, Embodiment 6 describes that the detector cover 70F and the inner cover 30F are integrally formed. However, the invention is not limited thereto. For example, the detector cover 70F and the inner cover 30F may be separately formed.

In addition, Embodiment 6 describes that the outer diameter of the detector cover 70F is set to increase toward the installation surface 2F. However, the invention is not limited thereto. For example, the outer diameter may be set to decrease toward the installation surface 2F or may be uniformly set.

One embodiment of the present invention provides a fire detection apparatus for detecting a fire in a monitored area, wherein a unit or a space used for detection of the fire is provided on an inside of the fire detection apparatus.

According to the fire detection apparatus of note 1, since a unit or a space used for detection of the fire is provided, detection of the fire is less likely to be influenced by external factors, and it becomes easier to accurately detect the occurrence of the fire.

Another embodiment of the present invention provides the alarm apparatus according to the above embodiment, the fire detection apparatus being attached to an installation surface of an installation object, the fire detection apparatus comprising: a detection space in which detection of a detection target is performed: an incidence suppressing unit that inhibits ambient light from entering the detection space and provided to cover an outer periphery of the detection space: an inner accommodating unit that accommodates the detection space and the incidence suppressing unit: an outer accommodating unit that accommodates the inner accommodating unit, the outer accommodating unit being able to allow a gas containing the detection target to flow in and out of the outer accommodating unit: a first opening provided in a side portion on an opposite side from a side portion on an installation surface side among side portions of the inner accommodating unit and used to allow the gas flowing into the outer accommodating unit to flow into the inner accommodating unit: a second opening provided in a side portion on an opposite side from a side portion on an installation surface side among side portions of the incidence suppressing unit and used to allow the gas flowing into the inner accommodating unit to flow into the detection space; and a flat plate-shaped insect screen provided on the inner accommodating unit or the incidence suppressing unit and configured to substantially cover the entire first opening or the entire second opening.

According to the fire detection apparatus of note 2, since an inner accommodating unit that accommodates the detection space and the incidence suppressing unit, an outer accommodating unit that accommodates the inner accommodating unit, a first opening provided in a side portion on an opposite side from a side portion on an installation surface side among side portions of the inner accommodating unit, a second opening provided in a side portion on an opposite side from a side portion on an installation surface side among side portions of the incidence suppressing unit, and a flat plate-shaped insect screen provided on the inner accommodating unit or the incidence suppressing unit and configured to substantially cover the entire first opening or the entire second opening are included, it is sufficient to attach the flat plate-shaped insect screen to the inner accommodating unit or the incidence suppressing unit to substantially cover the entire first opening or the entire second opening as the installation operation of the insect screen. Thus, when compared to the conventional technology (the technology of providing the cylindrical insect screen to cover the outer periphery of the detection unit on the inside of the inner cover), it is possible to easily attach the insect screen, and to improve efficiency of the attachment operation. In addition, since the insect screen has the flat plate shape, when compared to a case in which the insect screen is formed in the cylindrical shape, it is possible to easily manufacture the insect screen, make the insect screen compact, reduce the manufacturing cost of the fire detection apparatus, and reduce an environmental load at the time of manufacture.

Another embodiment of the present invention provides the alarm apparatus according to the above embodiment, wherein the first opening is configured such that the substantially entire insect screen is exposed to an outside of the inner accommodating unit through the first opening.

According to the fire detection apparatus of note 3, since the first opening is configured such that the substantially entire insect screen is exposed to an outside of the inner accommodating unit through the first opening, when the inner accommodating unit and the outer accommodating unit are provided, it is possible to perform the maintenance operation (for example, cleaning work, washing work, etc.) of the insect screen without removing the inner accommodating unit, and to improve the efficiency of the maintenance operation.

Another embodiment of the present invention provides the alarm apparatus according to the above embodiment, wherein the insect screen is provided to substantially cover the entire second opening in the incidence suppressing unit, and the insect screen, the first opening, and the incidence suppressing unit are configured such that the insect screen is attachable to and detachable from the incidence suppressing unit through the first opening.

According to the fire detection apparatus of note 4, since the insect screen, the first opening, and the incidence suppressing unit are configured such that the insect screen is attachable to and detachable from the incidence suppressing unit through the first opening, it is possible to attach and detach the insect screen to and from the incidence suppressing unit without removing the inner accommodating unit. Therefore, it is possible to easily perform the maintenance operation of the insect screen, and to further improve the efficiency of the maintenance operation of the insect screen.

Another embodiment of the present invention provides the alarm apparatus according to the above embodiment, wherein the insect screen is provided to substantially cover the entire first opening in the inner accommodating unit, and the insect screen and the inner accommodating unit are configured such that the insect screen is attachable to and detachable from the inner accommodating unit.

According to the fire detection apparatus of note 5, since the insect screen and the inner accommodating unit are configured such that the insect screen is attachable to and detachable from the inner accommodating unit, it is possible to attach and detach the insect screen to and from the inner accommodating unit without removing the inner accommodating unit. Therefore, it is possible to easily perform the maintenance operation of the insect screen, and to further improve the efficiency of the maintenance operation of the insect screen.

Another embodiment of the present invention provides the alarm apparatus according to the above embodiment, wherein a part of the outer accommodating unit is formed as a fall prevention unit that prevents the insect screen from falling off the inner accommodating unit or the incidence suppressing unit.

According to the fire detection apparatus of note 6, since a part of the outer accommodating unit is formed as a fall prevention unit that prevents the insect screen from falling off the inner accommodating unit or the incidence suppressing unit, it is possible to prevent the insect screen from falling off the inner accommodating unit or the incidence suppressing unit, and it is possible to improve the attaching property of the insect screen. Moreover, since it is unnecessary to separately provide the member for the fall prevention unit, the installation property of the fall prevention unit can be improved.

Another embodiment of the present invention provides the alarm apparatus according to the above embodiment, the fire detection apparatus being attached to an installation surface of an installation object, the fire detection apparatus comprising: a detection space in which detection of a detection target is performed: an incidence suppressing unit capable of allowing a gas containing the detection target to flow in and out while inhibiting ambient light from entering the detection space, the incidence suppressing unit being provided to cover an outer periphery of the detection space: an inner accommodating unit that accommodates the detection space and the incidence suppressing unit: an outer accommodating unit that accommodates the inner accommodating unit, the outer accommodating unit being able to allow the gas containing the detection target to flow in and out of the outer accommodating unit: an opening provided in a side portion on an opposite side from a side portion on the installation surface side among side portions of the inner accommodating unit and used to allow the gas flowing into the outer accommodating unit to flow into the inner accommodating unit; and a flat plate-shaped insect screen provided on the inner accommodating unit and configured to substantially cover the entire opening, wherein the insect screen and the inner accommodating unit are configured such that the insect screen is attachable to and detachable from the inner accommodating unit.

According to the fire detection apparatus of note 7, since an inner accommodating unit that accommodates the detection space and the incidence suppressing unit, an outer accommodating unit that accommodates the inner accommodating unit, an opening provided in a side portion on an opposite side from a side portion on the installation surface side among side portions of the inner accommodating unit, and a flat plate-shaped insect screen provided on the inner accommodating unit are included, it is sufficient to attach the flat plate-shaped insect screen to the inner accommodating unit to substantially cover the entire opening as the installation operation of the insect screen. Thus, when compared to the conventional technology (the technology of providing the cylindrical insect screen to cover the outer periphery of the detection unit on the inside of the inner cover), it is possible to easily attach the insect screen, and to improve efficiency of the attachment operation. In addition, since the insect screen has the flat plate shape, when compared to a case in which the insect screen is formed in the cylindrical shape, it is possible to easily manufacture the insect screen, make the insect screen compact, reduce the manufacturing cost of the fire detection apparatus, and reduce an environmental load at the time of manufacture. Further, since the insect screen and the inner accommodating unit are configured such that the insect screen is attachable to and detachable from the inner accommodating unit, it is possible to attach and detach the insect screen to and from the inner accommodating unit without removing the inner accommodating unit. Therefore, it is possible to perform the maintenance operation (e.g. cleaning work, washing work and so on) of the insect screen, and to improve the efficiency of the maintenance operation.

Another embodiment of the present invention provides the alarm apparatus according to the above embodiment, wherein the inner accommodating unit includes a pinching unit provided on the side portion on the opposite side from the side portion on the installation surface side among the side portions of the inner accommodating unit and used to detachably pinch the insect screen.

According to the fire detection apparatus of note 8, since a pinching unit provided on the side portion on the opposite side from the side portion on the installation surface side among the side portions of the inner accommodating unit and used to detachably pinch the insect screen is included, it is possible to easily attach and detach the insect screen to and from the inner accommodating unit while firmly attaching the insect screen to the inner accommodating unit, and to improve the efficiency of the maintenance operation of the insect screen.

Another embodiment of the present invention provides the alarm apparatus according to the above embodiment, wherein the insect screen and the first opening, the second opening, or the opening are formed in a circular shape.

According to the fire detection apparatus of note 9, since the insect screen and the first opening, the second opening, or the opening are formed in a circular shape, it is easily ensure processing accuracy of the insect screen, the first opening, the second opening, or the opening when compared to another shape, and it is possible to enhance manufacturability of the insect screen, the inner accommodating unit, or the incidence suppressing unit. Further, the dependency of the inflow direction of the detection target can be relatively reduced. In particular, it becomes easy to allow the detection target to flow into the detection space in almost the same manner and at almost the same timing from any direction in the circumferential direction.

Another embodiment of the present invention provides the alarm apparatus according to the above embodiment, comprising: a detection space in which detection of a detection target is performed: an inner accommodating unit that accommodates the detection space, the inner accommodating unit being able to allow a gas containing the detection target to flow in and out of the inner accommodating unit: an outer accommodating unit that accommodates the inner accommodating unit, the outer accommodating unit being able to allow the gas to flow in and out of the outer accommodating unit; and a plurality of ribs provided in a gap between the inner accommodating unit and the outer accommodating unit, wherein the plurality of ribs is configured such that a plurality of inflow spaces for guiding the gas flowing into the outer accommodating unit to an inflow portion of the gas in the inner accommodating unit is formed by partitioning the gap using the plurality of ribs.

According to the fire detection apparatus of note 10, since the plurality of ribs is configured such that a plurality of inflow spaces for guiding the gas flowing into the outer accommodating unit to an inflow portion of the gas in the inner accommodating unit is formed by partitioning the gap using the plurality of ribs, it is possible to reliably guide gas flowing into the outer accommodating unit to the inflow portion of gas in the inner accommodating unit by the plurality of inflow spaces, and it is possible to inhibit gas flowing into the outer accommodating unit from flowing out to the outside without flowing into the inner accommodating unit. Therefore, when compared to the conventional technology (the technology of covering the detection space with the labyrinth on the inside of the cover member), it is possible to enhance the inflow property of gas into the inner accommodating unit, and it is possible to improve detection accuracy of the fire detection apparatus.

Another embodiment of the present invention provides the alarm apparatus according to the above embodiment, wherein the plurality of ribs is radially disposed outward from a center side of the inner accommodating unit.

According to the fire detection apparatus of note 11, since the plurality of ribs is radially disposed outward from a center side of the inner accommodating unit, it is possible to radially form the plurality of inflow spaces, and it is possible to reduce the direction dependency of gas flowing into the outer accommodating unit.

Another embodiment of the present invention provides the alarm apparatus according to the above embodiment, wherein some ribs of the plurality of ribs are disposed in a cross shape, and some other ribs of the plurality of ribs are disposed not to come into contact with another rib between the ribs disposed in the cross shape.

According to the fire detection apparatus of note 12, since some other ribs of the plurality of ribs are disposed not to come into contact with another rib between the ribs disposed in the cross shape, it is possible to suppress an excessive increase in pressure of gas in the inflow portion in the inner accommodating unit, and it is possible to ensure the inflow property of gas into the inner accommodating unit.

Another embodiment of the present invention provides the alarm apparatus according to the above embodiment, wherein the plurality of ribs is configured such that the gas flowing into the inflow spaces partitioned by the ribs disposed in the cross shape does not directly flow out to another inflow space.

According to the fire detection apparatus of note 13, since the plurality of ribs is configured such that the gas flowing into the inflow spaces partitioned by the ribs disposed in the cross shape does not directly flow out to another inflow space, it is possible to prevent gas flowing into the inflow space partitioned by the ribs disposed in the cross shape from flowing into another inflow space, and it is possible to further inhibit gas flowing into the outer accommodating unit from flowing out to the outside without flowing into the inner accommodating unit.

Another embodiment of the present invention provides the alarm apparatus according to the above embodiment, wherein the plurality of ribs is disposed such that at least some of the plurality of ribs do not come into contact with another rib.

According to the fire detection apparatus of note 14, since the plurality of ribs is disposed such that at least some of the plurality of ribs do not come into contact with another rib, when compared to a case in which each of the plurality of ribs is disposed to come into contact with another rib, it is possible to suppress an excessive increase in pressure of gas in the inflow portion in the inner accommodating unit, and it becomes easy to ensure the inflow property of gas into the inner accommodating unit.

Another embodiment of the present invention provides the alarm apparatus according to the above embodiment, wherein the plurality of ribs is formed integrally with the inner accommodating unit or the outer accommodating unit.

According to the fire detection apparatus of note 15, since the plurality of ribs is formed integrally with the inner accommodating unit or the outer accommodating unit, it is possible to easily form the plurality of ribs, and it is possible to improve manufacturability of the fire detection apparatus.

Another embodiment of the present invention provides the alarm apparatus according to the above embodiment, the fire detection apparatus being attached to an installation surface of an installation object, the fire detection apparatus comprising a casing for accommodating an electronic component, wherein at least a part of an installation surface-side side portion corresponding to a side portion on an installation surface side among side portions of the casing is formed in a non-horizontal shape.

According to the fire detection apparatus of note 16, since at least a part of an installation surface-side side portion of the casing for accommodating the electronic component is formed in a non-horizontal shape, in a case in which condensation occurs on the installation surface, even when water droplets attached to the installation surface drip to the installation surface-side side portion, it is possible to inhibit water droplets from accumulating on at least the part of the installation surface-side side portion when compared to a case in which the entire installation surface-side side portion has a horizontal shape. Therefore, for example, it is possible to prevent an electronic component or a peripheral component thereof (for example, a wiring, a terminal, etc.) from being damaged by water droplets, and to improve usability of the fire detection apparatus.

Another embodiment of the present invention provides the alarm apparatus according to the above embodiment, further comprising a connection terminal portion provided on a side surface on an installation surface side among side surfaces of the installation surface-side side portion and used to electrically connect the electronic component and an external wiring to each other, wherein a vicinity of the connection terminal portion in a portion of the installation surface-side side portion is formed in a non-horizontal shape.

According to the fire detection apparatus of note 17, since a vicinity of the connection terminal portion in a portion of the installation surface-side side portion is formed in a non-horizontal shape, it is possible to inhibit water droplets from accumulating on the connection terminal portion or the vicinity thereof, and it is possible to avoid short circuit of the connection terminal portion due to water droplets.

Another embodiment of the present invention provides the alarm apparatus according to the above embodiment, further comprising an inflow prevention unit provided on the side surface on the side of the installation surface among the side surfaces of the installation surface-side side portion and used to prevent water droplets present on a side surface of the installation surface from flowing into the connection terminal portion.

According to the fire detection apparatus of note 18, since an inflow prevention unit provided on the side surface on the side of the installation surface among the side surfaces of the installation surface-side side portion and used to prevent water droplets present on a side surface of the installation surface from flowing into the connection terminal portion is included, it is possible to prevent water droplets present on the side surface on the installation surface side among the side surfaces of the installation surface-side side portion from flowing into the connection terminal portion using the inflow prevention portion, and it is possible to further avoid short circuit of the connection terminal portion due to water droplets.

Another embodiment of the present invention provides the alarm apparatus according to the above embodiment, further comprising a substrate provided on an inside of the casing, the electronic component being mounted on the substrate, wherein a portion other than a portion corresponding to the substrate in a portion of the installation surface-side side portion is formed in a non-horizontal shape.

According to the fire detection apparatus of note 19, since a portion other than a portion corresponding to the substrate in a portion of the installation surface-side side portion is formed in a non-horizontal shape, it is possible to reliably ensure the space for accommodating the electronic component mounted on the substrate on the inside of the casing while inhibiting water droplets from accumulating on the portion other than the portion corresponding to the substrate, and it is possible to maintain the accommodating property for the electronic component while having the draining property.

Another embodiment of the present invention provides the alarm apparatus according to the above embodiment, further comprising a nameplate seal affixed to the side surface on the side of the installation surface among the side surfaces of the installation surface-side side portion, wherein a vicinity of the nameplate seal in a portion of the installation surface-side side portion is formed in a non-horizontal shape.

According to the fire detection apparatus of note 20, since a vicinity of the nameplate seal in a portion of the installation surface-side side portion is formed in a non-horizontal shape, it is possible to efficiently drain water droplets accumulating on the nameplate seal, and it is possible to further avoid short circuit of the connection terminal portion. In addition, when compared to a case in which a part of the portion corresponding to the nameplate seal in the portion of the installation surface-side side portion is formed a non-horizontal shape, it is possible to suppress occurrence of peeling off of the nameplate seal due to water droplets, and it becomes easy to maintain the affixing property of the nameplate seal.

Another embodiment of the present invention provides the alarm apparatus according to the above embodiment, wherein a portion corresponding to the non-horizontal shape in the installation surface-side side portion is formed such that the portion corresponding to the non-horizontal shape is away from the installation surface as approaching an outside of the installation surface-side side portion.

According to the fire detection apparatus of note 21, since a portion corresponding to the non-horizontal shape in the installation surface-side side portion is formed such that the portion corresponding to the non-horizontal shape is away from the installation surface as approaching an outside of the installation surface-side side portion, it becomes easy to ensure the space for accommodating the electronic component in the inner part inside the casing while inhibiting water droplets from accumulating on the installation surface-side side portion, and thus it becomes easy to maintain the accommodating property for the electronic component while having the draining property.

Another embodiment of the present invention provides the alarm apparatus according to the above embodiment, wherein an inclination angle of a part of the portion corresponding to the non-horizontal shape is set to be different from an inclination angle of another part of the portion corresponding to the non-horizontal shape.

According to the fire detection apparatus of note 22, since an inclination angle of a part of the portion corresponding to the non-horizontal shape is set to be different from an inclination angle of another part of the portion corresponding to the non-horizontal shape, it is possible to change a degree of an influence of surface tension acting on water droplets flowing in the non-horizontal portion according to the sizes of these inclination angles, and it is possible to perform drainage according to the installation situation.

Another embodiment of the present invention provides the alarm apparatus according to the above embodiment, wherein an inclined portion which is the part of the portion corresponding to the non-horizontal shape and an inclined portion which is the other part of the portion corresponding to the non-horizontal shape are continuously formed.

According to the fire detection apparatus of note 23, since an inclined portion which is the part of the portion corresponding to the non-horizontal shape and an inclined portion which is the other part of the portion corresponding to the non-horizontal shape are continuously formed, when compared to a case in which these inclined portions are formed discontinuously, it is possible to inhibit water droplets from accumulating on the non-horizontal portion, and it is possible to further avoid short circuit of the connection terminal portion due to water droplets.

Another embodiment of the present invention provides the alarm apparatus according to the above embodiment, wherein a boundary portion between the inclined portion which is the part of the portion corresponding to the non-horizontal shape and the inclined portion which is the other part of the portion corresponding to the non-horizontal shape is formed in a round shape.

According to the fire detection apparatus of note 24, since a boundary portion between the inclined portion which is the part of the portion corresponding to the non-horizontal shape and the inclined portion which is the other part of the portion corresponding to the non-horizontal shape is formed in a round shape, it is possible to reduce the influence of surface tension acting on water droplets flowing through the boundary, and it is possible to further inhibit water droplets from accumulating on the non-horizontal portion.

Another embodiment of the present invention provides the alarm apparatus according to the above embodiment, wherein the portion corresponding to the non-horizontal shape is formed such that the portion corresponding to the non-horizontal shape is inclined in a plurality of directions.

According to the fire detection apparatus of note 25, since the portion corresponding to the non-horizontal shape is formed such that the portion corresponding to the non-horizontal shape is inclined in a plurality of directions, it is possible to disperse and drain water accumulated on the non-horizontal portion in a plurality of directions, and it is possible to enhance a drainage amount.

Another embodiment of the present invention provides the alarm apparatus according to the above embodiment, comprising: a detection space in which detection of a detection target is performed; and an incidence suppressing unit that inhibits ambient light from entering the detection space, wherein the incidence suppressing unit includes a first incidence suppressing unit that covers a part of the outer periphery of the detection space, a second incidence suppressing unit that covers another part of the outer periphery of the detection space, a fixing unit that fixes the first incidence suppressing unit and the second incidence suppressing unit to each other, and a guide unit that guides the first incidence suppressing unit or the second incidence suppressing unit to the fixing unit when the first incidence suppressing unit and the second incidence suppressing unit are fixed through the fixing unit.

According to the fire detection apparatus of note 26, since a fixing unit that fixes the first incidence suppressing unit and the second incidence suppressing unit, and a guide unit that guides the first incidence suppressing unit or the second incidence suppressing unit to the fixing unit when the first incidence suppressing unit and the second incidence suppressing unit are fixed through the fixing unit are included, it is possible to guide the first incidence suppressing unit or the second incidence suppressing unit to the fixing unit by the guide unit at the time of fixing the first incidence suppressing unit and the second incidence suppressing unit through the fixing unit, and it is possible to accurately and rapidly fix the first incidence suppressing unit and the second incidence suppressing unit when compared to a case in which the guide unit is not provided. Therefore, it is possible to efficiently perform the assembly operation of the incidence suppressing unit, and it is possible to improve manufacturability of the fire detection apparatus. In particular, since it becomes easy to fix the first incidence suppressing unit or the second incidence suppressing unit without the first incidence suppressing unit or the second incidence suppressing unit touching a component (for example, a thermistor, etc.) protruding from the substrate, etc., it becomes easy to efficiently perform the assembly operation of the incidence suppressing unit.

Another embodiment of the present invention provides the alarm apparatus according to the above embodiment, wherein the guide unit is formed in a long hollow or solid shape, and the first incidence suppressing unit, the second incidence suppressing unit, the fixing unit, and the guide unit are configured such that the first incidence suppressing unit or the second incidence suppressing unit is allowed to be inserted through the guide unit and the fixing unit and detachably fixed to the fixing unit.

According to the fire detection apparatus of note 27, since the first incidence suppressing unit, the second incidence suppressing unit, the fixing unit, and the guide unit are configured such that the first incidence suppressing unit or the second incidence suppressing unit is allowed to be inserted through the guide unit and the fixing unit and detachably fixed to the fixing unit, it is possible to increase the contact area between the first incidence suppressing unit or the second incidence suppressing unit and the fixing unit, and it is possible to firmly fix the first incidence suppressing unit or the second incidence suppressing unit to the fixing unit. In addition, it is possible to easily attach and detach the first incidence suppressing unit or the second incidence suppressing unit to and from the fixing unit, and it is possible to easily perform the maintenance operation, etc.

Another embodiment of the present invention provides the alarm apparatus according to the above embodiment, wherein a longitudinal length of the guide unit is set to a length that allows suppression of contact between the first incidence suppressing unit or the second incidence suppressing unit and a component provided in the detection space or a vicinity of the detection space when the first incidence suppressing unit or the second incidence suppressing unit is inserted into the guide unit or when the first incidence suppressing unit or the second incidence suppressing unit is guided to the fixing unit after the insertion.

According to the fire detection apparatus of note 28, since a longitudinal length of the guide unit is set to a length that allows suppression of contact between the first incidence suppressing unit or the second incidence suppressing unit and a component provided in the detection space or a vicinity of the detection space when the first incidence suppressing unit or the second incidence suppressing unit is inserted into the guide unit or when the first incidence suppressing unit or the second incidence suppressing unit is guided to the fixing unit after the insertion, it is possible to inhibit the first incidence suppressing unit or the second incidence suppressing unit from touching the component at the time of insertion or at the time of guiding. Therefore, for example, it becomes easy to prevent the component from being damaged or falling off and the component (for example, the substrate, etc.) to which the component is attached from being deformed or loaded during the assembly operation of the first incidence suppressing unit or the second incidence suppressing unit.

Another embodiment of the present invention provides the alarm apparatus according to the above embodiment, wherein a pair of fixing units is provided at an interval therebetween.

According to the fire detection apparatus of note 29, since a pair of fixing units is provided at an interval therebetween, when compared to a case in which only one of the pair of fixing units is provided, it is possible to stably fix the first incidence suppressing unit and the second incidence suppressing unit, it is possible to easily perform positioning of the first incidence suppressing unit and the second incidence suppressing unit, and it is possible to effectively fix the first incidence suppressing unit and the second incidence suppressing unit.

Another embodiment of the present invention provides the alarm apparatus according to the above embodiment, wherein the pair of fixing units is disposed such that a substantially central portion of the detection space is located on a straight line from one of the pair of fixing units to the other one of the pair of fixing units.

According to the fire detection apparatus of note 30, since the pair of fixing units is disposed such that a substantially central portion of the detection space is located on a straight line from one of the pair of fixing units to the other one of the pair of fixing units, centering of the first incidence suppressing unit and the second incidence suppressing unit can be easily performed, and it becomes easy to accurately fix the first incidence suppressing unit and the second incidence suppressing unit.

Another embodiment of the present invention provides the alarm apparatus according to the above embodiment, further comprising a detection unit that detects the detection target by irradiating and receiving detection light in the detection space, wherein the fixing unit is configured to be able to fix a tool used when sensitivity of the detection unit is adjusted to the fixing unit.

According to the fire detection apparatus of note 31, since the fixing unit is configured to be able to fix a tool used when sensitivity of the detection unit is adjusted to the fixing unit, it is possible to accurately and rapidly attach the tool, and it is possible to efficiently perform the sensitivity adjustment operation of the detection unit. In addition, since it is unnecessary to separately provide a member for positioning of the tool in the first incidence suppressing unit and the second incidence suppressing unit, it is possible to reduce the manufacturing cost of the fire detection apparatus.

Another embodiment of the present invention provides the alarm apparatus according to the above embodiment, comprising: a detection space in which detection of a detection target is performed: an inner accommodating unit that accommodates the detection space, the inner accommodating unit being able to allow a gas containing the detection target to flow in and out of the inner accommodating unit: an outer accommodating unit that accommodates the inner accommodating unit, the outer accommodating unit being able to allow the gas to flow in and out of the outer accommodating unit; and a positioning unit that aligns a relative position of the inner accommodating unit and the outer accommodating unit to a predetermined position when the inner accommodating unit and the outer accommodating unit are attached to each other.

According to the fire detection apparatus of note 32, since a positioning unit that aligns a relative position of the inner accommodating unit and the outer accommodating unit to a predetermined position when the inner accommodating unit and the outer accommodating unit are attached to each other is included, when compared to a case in which the positioning unit is not provided, it is possible to easily and rapidly perform positioning of the inner accommodating unit and the outer accommodating unit at the time of assembling the fire detection apparatus, and it is possible to enhance manufacturability of the fire detection apparatus. In addition, since it becomes easy to avoid contact between the inner accommodating unit or the outer accommodating unit and another component (for example, the heat detection uni, etc.) at the time of assembling the fire detection apparatus, it is possible to prevent the other component from being damaged.

Another embodiment of the present invention provides the alarm apparatus according to the above embodiment, wherein the positioning unit includes a protrusion provided on one of the inner accommodating unit or the outer accommodating unit, and a fitting portion provided on the other one of the inner accommodating unit or the outer accommodating unit, the protrusion being allowed to fit to the fitting portion.

According to the fire detection apparatus of note 33, since the positioning unit includes a protrusion provided on one of the inner accommodating unit or the outer accommodating unit, and a fitting portion provided on the other one of the inner accommodating unit or the outer accommodating unit, and the protrusion is allowed to fit to the fitting portion, it is possible to simplify a configuration of the positioning unit, and it becomes easy to form the positioning unit.

Another embodiment of the present invention provides the alarm apparatus according to the above embodiment, wherein the protrusion or the fitting portion is configured as at least a part of a rib partitioning a gap between the inner accommodating unit and the outer accommodating unit.

According to the fire detection apparatus of note 34, since the protrusion or the fitting portion is configured as at least a part of a rib partitioning a gap between the inner accommodating unit and the outer accommodating unit, when compared to a case in which each of the protrusion or the fitting portion and the rib is provided, it is possible to prevent the configuration of the inner accommodating unit or the outer accommodating unit from being complicated, it becomes easy to enhance manufacturability of the fire detection apparatus, and it becomes easy to make the fire detection apparatus compact.

Another embodiment of the present invention provides the alarm apparatus according to the above embodiment, wherein the protrusion or the fitting portion is formed integrally with the inner accommodating unit or the outer accommodating unit.

According to the fire detection apparatus of note 35, since the protrusion or the fitting portion is formed integrally with the inner accommodating unit or the outer accommodating unit, when compared to a case in which each of the protrusion and the fitting portion is formed separately from the inner accommodating unit or the outer accommodating unit, it is possible to reduce an effort to attach the protrusion or the fitting portion, and it becomes easy to form the positioning unit.

Another embodiment of the present invention provides the alarm apparatus according to the above embodiment, wherein the positioning unit is configured to be able to guide light irradiated from a display unit provided on an inside of the inner accommodating unit to an outside of the outer accommodating unit.

According to the fire detection apparatus of note 36, since the positioning unit is configured to be able to guide light irradiated from a display unit provided on an inside of the inner accommodating unit to an outside of the outer accommodating unit, the positioning unit can function as a light guide, and it is possible to prevent the configuration of the inner accommodating unit or the outer accommodating unit from being complicated when compared to a case in which each of the positioning unit and the light guide is provided.

Another embodiment of the present invention provides the alarm apparatus according to the above embodiment, the fire detection apparatus being attached to an installation surface of an installation object, the fire detection apparatus comprising: a detection space in which detection of a detection target is performed: an incidence suppressing unit that inhibits ambient light from entering the detection space, the incidence suppressing unit being able to allow a gas containing the detection target to flow into and out of the incidence suppressing unit: an accommodating unit that accommodates the incidence suppressing unit, the accommodating unit being able to allow the gas to flow into and out of the accommodating unit; and a light shielding wall provided to surround the incidence suppressing unit on an inside of the accommodating unit, wherein the incidence suppressing unit includes a first incidence suppressing unit that covers a part of the detection space, and a second incidence suppressing unit provided on an installation surface side of the first incidence suppressing unit, the second incidence suppressing unit covering another part of the detection space, and the light shielding wall is configured such that the light shielding wall overlaps a boundary between the first incidence suppressing unit and the second incidence suppressing unit when viewed in a direction orthogonal to the installation surface.

According to the fire detection apparatus of note 37, since an accommodating unit that accommodates the incidence suppressing unit, the accommodating unit being able to allow the gas to flow into and out of the accommodating unit; and a light shielding wall provided to surround the incidence suppressing unit on an inside of the accommodating unit are included, and the incidence suppressing unit includes a first incidence suppressing unit that covers a part of the detection space, and a second incidence suppressing unit provided on an installation surface side of the first incidence suppressing unit, the second incidence suppressing unit covering another part of the detection space, and the light shielding wall is configured such that the light shielding wall overlaps a boundary between the first incidence suppressing unit and the second incidence suppressing unit when viewed in a direction orthogonal to the installation surface, it is possible to suppress incidence of ambient light into the detection space through the boundary by the light shielding wall, it is possible to inhibit internal light exiting to the outside through the boundary from entering through the boundary, and it is possible to maintain the detection accuracy of the fire detection apparatus.

Another embodiment of the present invention provides the alarm apparatus according to the above embodiment, wherein the accommodating unit includes a cover unit that covers a side surface of the incidence suppressing unit on the installation surface side, and the light shielding wall includes a first light shielding wall provided on the cover unit and configured such that the boundary is located on the installation surface side of a distal end of the first light shielding wall.

According to the fire detection apparatus of note 38, since the light shielding wall includes a first light shielding wall provided on the cover unit and configured such that the boundary is located on the installation surface side of a distal end of the first light shielding wall, it is possible to inhibit internal light exiting to the outside through the boundary from entering through the boundary, and it becomes easy to maintain the detection accuracy of the fire detection apparatus.

Another embodiment of the present invention provides the alarm apparatus according to the above embodiment wherein the accommodating unit includes an inner accommodating unit that accommodates the incidence suppressing unit, and an outer accommodating unit that accommodates the inner accommodating unit, and the light shielding wall includes a second light shielding wall provided on a side portion on an opposite side from the installation surface side among side portions of the inner accommodating unit and configured such that the boundary is located on an opposite side from the installation surface side of a distal end of the second light shielding wall.

According to the fire detection apparatus of note 39, since the light shielding wall includes a second light shielding wall provided on a side portion on an opposite side from the installation surface side among side portions of the inner accommodating unit and configured such that the boundary is located on an opposite side from the installation surface side of a distal end of the second light shielding wall, it is possible to suppress incidence of ambient light into the detection space through the boundary by the second light shielding wall, it is possible to inhibit internal light exiting to the outside through the boundary from entering through the boundary, and it becomes easy to maintain the detection accuracy of the fire detection apparatus.

Another embodiment of the present invention provides the alarm apparatus according to the above embodiment, wherein the accommodating unit includes an inner accommodating unit that accommodates the incidence suppressing unit, an outer accommodating unit that accommodates the inner accommodating unit, and a cover unit provided on the installation surface side of the inner accommodating unit, the cover unit covering a side surface of the incidence suppressing unit on the installation surface side, the light shielding wall includes a first light shielding wall provided on the cover unit, and a second light shielding wall provided on a side portion on an opposite side from the installation surface side among side portions of the inner accommodating unit, and the first light shielding wall and the second light shielding wall are configured such that the inner accommodating unit and the cover unit are fittable to each other through the first light shielding wall and the second light shielding wall.

According to the fire detection apparatus of note 40, since the light shielding wall includes a first light shielding wall provided on the cover unit, and a second light shielding wall provided on a side portion on an opposite side from the installation surface side among side portions of the inner accommodating unit, and the first light shielding wall and the second light shielding wall are configured such that the inner accommodating unit and the cover unit are fittable to each other through the first light shielding wall and the second light shielding wall, it is possible to fit the inner accommodating unit and the cover unit to each other through the first light shielding wall and the second light shielding wall, and it is possible to firmly connect the inner accommodating unit and the cover unit to each other.

Another embodiment of the present invention provides the alarm apparatus according to the above embodiment, wherein the accommodating unit includes an inner accommodating unit that accommodates the incidence suppressing unit, an outer accommodating unit that accommodates the inner accommodating unit, a first opening provided in a side portion on an opposite side from a side portion on an installation surface side among side portions of the inner accommodating unit and used to allow the gas flowing into the outer accommodating unit to flow into the inner accommodating unit, and a second opening provided in a side portion on an opposite side from a side portion on an installation surface side among side portions of the incidence suppressing unit and used to allow the gas flowing into the inner accommodating unit to flow into the detection space, and the incidence suppressing unit and the inner accommodating unit are integrally formed such that a peripheral portion of the first opening in a side portion on an opposite side from a side portion on an installation surface side in the inner accommodating unit and a peripheral portion of the second opening in a side portion on an opposite side from a side portion on an installation surface side in the incidence suppressing unit are continuous.

According to the fire detection apparatus of note 41, since the incidence suppressing unit and the inner accommodating unit are integrally formed such that a peripheral portion of the first opening in a side portion on an opposite side from a side portion on an installation surface side in the inner accommodating unit and a peripheral portion of the second opening in a side portion on an opposite side from a side portion on an installation surface side in the incidence suppressing unit are continuous, it is possible to inhibit a gap from being formed between the peripheral portion of the first opening in the inner accommodating unit and the peripheral portion of the second opening in the incidence suppressing unit, and it is possible to suppress incidence of ambient light or internal light into the detection space.

Another embodiment of the present invention provides the alarm apparatus according to the above embodiment, wherein an outer diameter of the incidence suppressing unit is increased as approaching the installation surface.

According to the fire detection apparatus of note 42, since an outer diameter of the incidence suppressing unit is increased as approaching the installation surface, the side portion on the side among the side portions of the incidence suppressing unit can be formed in a tapered shape, and ambient light or internal light entering the incidence suppressing unit can be effectively attenuated.

REFERENCE SIGNS LIST

1A Fire detection apparatus
2A Installation surface
10A Attachment base
20A Outer cover
21A Outer cover body
22A Top surface portion
22aA Display hole
23A First rib portion
24A Second rib portion
30A Inner cover
30aA First opening
40A Inflow space
50A Insect screen
60A Detection space
70A Detector cover
70aA Second opening
80A Detector body
90A Terminal board
91A Attachment member
100A Substrate
104aA Light guide
110A Recess
120A Fall prevention portion
130A Recess
131A First pinching portion
132A Second pinching portion
1B Fire detection apparatus
2B Installation surface
10B Attachment base
20B Outer cover
21B Outer cover body
22B Top surface portion
22aB Display hole
30B Inner cover
30aB First opening
40B Inflow space
41B First inflow space 42B Second inflow space
43B Third inflow space
44B Fourth inflow space
45B Fifth inflow space
46B Sixth inflow space
47B Seventh inflow space
48B Eighth inflow space
50B Insect screen
60B Detection space
70B Detector cover
70aB Second opening
80B Detector body
90B Terminal board
91B Attachment member
100B Substrate
104aB Light guide
110B Rib
111B First rib
112B Second rib
113B Third rib
114B Fourth rib
115B Fifth rib
116B Sixth rib
117B Seventh rib
118B Eighth rib
1C Fire detection apparatus
2C Installation surface
10C Attachment base
20C Outer cover
21C Outer cover body
22C Top surface portion
22aC Display hole
23C First rib portion
24C Second rib portion
30C Inner cover
30aC First opening
40C Inflow space
50C Insect screen
60C Detection space
70C Detector cover
70aC Second opening
80C Detector body
90C Terminal board
91C Connection terminal portion
91aC First attachment hole
91bC Second attachment hole
92C First connection terminal portion
93C Second connection terminal portion
94C Third connection terminal portion
95C Nameplate seal
96C Installation surface-side side portion
97C Non-horizontal portion
98C Inflow prevention portion
100C Substrate
104aC Light guide
01C Inclination angle
02C Inclination angle
03C Inclination angle
04C Inclination angle
1D Fire detection apparatus
2D Installation surface
10D Attachment base
20D Outer cover
21D Outer cover body
22D Top surface portion
22aD Display hole
23D First rib portion
24D Second rib portion
30D Inner cover
30aD First opening
40D Inflow space
50D Insect screen
60D Detection space
70D Detector cover
70aD Second opening
80D Detector body
90D Terminal board
91D Attachment member
100D Substrate
104aD Light guide
111D First fixing portion
111aD First fitting hole
112D Second fixing portion
112aD Second fitting hole
121D First guide portion
122D Second guide portion
131D First insertion hole
132D Second insertion hole
150D Sensitivity adjustment tool
160D Sensitivity adjustment portion
170D Support
171D Support body
172D First leg portion
173D Second leg portion
LD Straight line
1E Fire detection apparatus
2E Installation surface
10E Attachment base
20E Outer cover
21E Outer cover body
22E Top surface portion
30E Inner cover
30aE First opening
31E Insertion hole
32E Insertion hole
40E Inflow space
50E Insect screen
60E Detection space
70E Detector cover
70aE Second opening
80E Detector body
90E Lower cover
91E Attachment member
100E Substrate
101E Heat detection unit
110E Rib
111E First rib
112E Second rib
113E Third rib
114E Fourth rib
115E Fifth rib
116E Sixth rib
117E Seventh rib
118E Eighth rib
120E Insertion hole
130E Guard portion
131E First guard-side rib
132E Second guard-side rib
133E Third guard-side rib
134E Fourth guard-side rib
135E Guard-side connecting portion
140E Positioning portion
150E Protrusion
151E Guide portion 160E Fitting portion
161E First fitting portion
162E Second fitting portion
1F Fire detection apparatus
2F Installation surface
10F Attachment base
20F Outer cover
21F Outer cover body
22F Top surface portion
23F Rib portion
30F Inner cover
30aF First opening
40F Inflow space
50F Insect screen
60F Detection space
70F Detector cover
70aF Second opening
80F Detector body
90F Lower cover
91F Attachment member
100F Substrate
110F Heat detection unit
120F Insertion hole
130F Guard portion
131F First guard-side rib
132F Second guard-side rib
133F Third guard-side rib
134F Fourth guard-side rib
135F Guard-side connecting portion
140F Light shielding wall
141F First light shielding wall
142F Second light shielding wall
150F Boundary
LF Straight line extended in left direction from boundary That which is claimed:

1. A fire detection apparatus for detecting a fire in a monitored area, the fire detection apparatus being attached to an installation surface of an installation object, the fire detection apparatus comprising:
a detection space in which detection of a detection target is performed;
a detector cover that inhibits ambient light from entering the detection space and covers part of the detection space, wherein the detector cover is configured to allow a gas containing the detection target to flow into and out of the detector cover;
an outer cover coupled to an inner cover, wherein the detector cover is integral to the inner cover or is attached to the inner cover, wherein the gas containing the detection target is flowable into and out of the outer cover and the inner cover;
a light shielding wall inside the inner cover provided to surround the detector cover;
a first opening for allowing gas flowing into the outer cover to flow into the inner cover;
a second opening for allowing gas flowing into the inner cover to flow into the detection space;
an insect screen having a flat plate shape configured to substantially cover an entirety of the second opening; and
a detector body inside the inner cover, provided on an installation surface side of the detector cover, the detector body covering another part of the detection space,
wherein the light shielding wall overlaps a boundary between the detector cover and the detector body when viewed in a direction orthogonal to the installation surface, and
wherein the insect screen, the first opening, and the detector cover are configured such that the insect screen is attachable to and detachable from the detector cover through the first opening when the outer cover is removed from the fire detection apparatus and while the inner cover remains attached to the fire detection apparatus.

2. The fire detection apparatus according to claim 1, further comprising a lower cover that covers a side surface of the detector cover on the installation surface side, wherein the light shielding wall includes,
a first light shielding wall provided on the lower cover and configured such that the boundary is located on the installation surface side of a distal end of the first light shielding wall.

3. The fire detection apparatus according to claim 1, wherein the light shielding wall includes a second light shielding wall provided on a side portion on an opposite side from the installation surface side among side portions of the inner cover and configured such that the boundary is located on an opposite side from the installation surface side of a distal end of the second light shielding wall.

4. The fire detection apparatus according to claim 1, further comprising a lower cover that covers a side surface of the detector cover on the installation surface side, wherein the light shielding wall includes,
a first light shielding wall provided on the lower cover, and
a second light shielding wall provided on a side portion on an opposite side from the installation surface side among side portions of the inner cover,
wherein the first light shielding wall and the second light shielding wall are configured such that the inner cover and the lower cover are fittable to each other through the first light shielding wall and the second light shielding wall.

5. The fire detection apparatus according to claim 1, wherein the first opening is provided in a side portion on an opposite side from a side portion on an installation surface side among side portions of the inner cover to allow the gas flowing into the outer cover to flow into the inner cover,
wherein the second opening is provided in a side portion on an opposite side from a side portion on an installation surface side among side portions of the detector cover and to allow the gas flowing into the inner cover to flow into the detection space, and wherein the detector cover and the inner cover are integrally formed such that a peripheral portion of the first opening in a side portion on an opposite side from a side portion on an installation surface side in the inner cover and a peripheral portion of the second-opening in a side portion on an opposite side from a side portion on an installation surface side in the detector cover are continuous.

6. The fire detection apparatus according to claim 1, wherein the detector cover angles inward in a top to bottom direction from an upper end closer to the installation surface side to a lower end inside the outer cover.

7. A fire detection apparatus for detecting a fire in a monitored area, the fire detection apparatus being attached to an installation surface of an installation object, the fire detection apparatus comprising:

a detection space for a detection target;

a detector cover that inhibits ambient light from entering the detection space, wherein the detector cover comprises an opening that is in fluid communication with the detection space and is configured to allow a gas containing the detection target to flow into and out of the detector cover;

an outer cover coupled to an inner cover, wherein the outer cover surrounds the inner cover, wherein the detector cover is integral to the inner cover or is coupled to the inner cover, and wherein the gas containing the detection target is flowable in and out of at least one gas flow path provided by the outer cover, the inner cover and the detector cover to the detection space;

a detector body inside the inner cover and in communication with the detection space;

an insect screen configured to cover the opening in the detector cover; and a light shielding wall inside the outer cover provided to at least partially surround the detector cover, wherein the insect screen and the detector cover are configured such that the insect screen is attachable to and detachable from the detector cover through the opening of the detector cover when the outer cover is removed from the fire detection apparatus and while the inner cover remains attached to the fire detection apparatus.

8. The fire detection apparatus of claim 7, wherein the detector cover angles inward in a top to bottom direction from an upper end closer to the installation surface side to a lower end inside the outer cover.

9. The fire detection apparatus of claim 7, wherein the insect screen is a flat screen.

* * * * *